United States Patent
Muraoka

(10) Patent No.: US 12,483,811 B2
(45) Date of Patent: Nov. 25, 2025

(54) SOLID-STATE IMAGING ELEMENT AND ELECTRONIC APPARATUS

(71) Applicant: SONY SEMICONDUCTOR SOLUTIONS CORPORATION, Kanagawa (JP)

(72) Inventor: Kazuhiko Muraoka, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/724,337

(22) PCT Filed: Dec. 20, 2022

(86) PCT No.: PCT/JP2022/046904
§ 371 (c)(1),
(2) Date: Jun. 26, 2024

(87) PCT Pub. No.: WO2023/132232
PCT Pub. Date: Jul. 13, 2023

(65) Prior Publication Data
US 2025/0071446 A1      Feb. 27, 2025

(30) Foreign Application Priority Data
Jan. 5, 2022   (JP) .................................. 2022-000710

(51) Int. Cl.
H04N 25/772        (2023.01)

(52) U.S. Cl.
CPC .................................. *H04N 25/772* (2023.01)

(58) Field of Classification Search
CPC ..... H04N 25/772; H04N 25/671; H04N 25/78
See application file for complete search history.

(56) References Cited

U.S. PATENT DOCUMENTS

| | | | |
|---|---|---|---|
| 8,570,417 B2* | 10/2013 | Oike | H04N 25/78 |
| | | | 348/308 |
| 2019/0104260 A1* | 4/2019 | Izuhara | H04N 25/77 |

(Continued)

FOREIGN PATENT DOCUMENTS

| | | |
|---|---|---|
| JP | 2015-062264 A | 4/2015 |
| JP | 2019-193184 A | 10/2019 |
| WO | 2019/087612 A1 | 5/2019 |

OTHER PUBLICATIONS

International Search Report and Written Opinion of PCT Application No. PCT/JP2022/046904, issued on Mar. 7, 2023, 8 pages of ISRWO.

*Primary Examiner* — Michael E Teitelbaum
(74) *Attorney, Agent, or Firm* — CHIP LAW GROUP

(57) ABSTRACT

Provided are a solid-state imaging element and an electronic apparatus capable of generating difference information between pixels at high speed while suppressing an increase in circuit scale. The solid-state imaging element includes a first analog-to-digital conversion unit including first and second analog-to-digital conversion circuits, and a second analog-to-digital conversion unit including a third analog-to-digital conversion circuit, in which the first analog-to-digital conversion circuit is connected to first and second vertical signal lines via a first switch circuit, the second analog-to-digital conversion circuit is connected to third and fourth vertical signal lines via a second switch circuit, the third analog-to-digital conversion circuit is connected to the second vertical signal line and a different signal line other than the first, second, and fourth vertical signal lines via a third switch circuit, the first and second switch circuits are connected to a first selection drive line, the third switch circuit is connected to a second selection drive line, and the first and second analog-to-digital conversion units are arranged on the same end side of a pixel array unit.

19 Claims, 46 Drawing Sheets

(56) References Cited

U.S. PATENT DOCUMENTS

2019/0104267 A1\* 4/2019 Kobayashi ................ G06T 7/55
2020/0059619 A1\* 2/2020 Totsuka ............... H04N 25/767
2020/0280692 A1\* 9/2020 Akahane .............. H04N 25/618

\* cited by examiner

SOLID-STATE IMAGING ELEMENT AND ELECTRONIC APPARATUS

CROSS REFERENCE TO RELATED APPLICATIONS

This application is a U.S. National Phase of International Patent Application No. PCT/JP2022/046904 filed on Dec. 20, 2022, which claims priority benefit of Japanese Patent Application No. JP 2022-000710 filed in the Japan Patent Office on Jan. 5, 2022. Each of the above-referenced applications is hereby incorporated herein by reference in its entirety.

TECHNICAL FIELD

The present disclosure relates to a solid-state imaging element and an electronic apparatus that capture an image of a subject.

BACKGROUND ART

In image recognition, contour information of an object can be calculated as difference information between pixels. Such contour information is information important for object shape recognition and the like. Furthermore, the contour information is generally generated by means of an arithmetic operation performed by a digital circuit or software. An image data size, however, is large, so that the digital circuit increases in circuit scale, which causes an increase in chip area or power consumption of a solid-state imaging element. Furthermore, in the implementation by means of software, a frame rate drops due to a delay in operation, or a high-speed processor is required, which causes an increase in power consumption.

CITATION LIST

Patent Document

Patent Document 1: Japanese Patent Application Laid-Open No. 2015-62264

SUMMARY OF THE INVENTION

Problems to be Solved by the Invention

It is therefore an object of the present disclosure to provide a solid-state imaging element and an electronic apparatus capable of generating difference information between pixels at high speed while suppressing an increase in circuit scale.

Solutions to Problems

In order to solve the above-described problems, according to the present disclosure, provided is a solid-state imaging element including:
a first analog-to-digital conversion unit including a first analog-to-digital conversion circuit and a second analog-to-digital conversion circuit; and
a second analog-to-digital conversion unit including a third analog-to-digital conversion circuit, in which
the first analog-to-digital conversion circuit is connected to a first vertical signal line and a second vertical signal line via a first switch circuit,
the second analog-to-digital conversion circuit is connected to a third vertical signal line and a fourth vertical signal line via a second switch circuit,
the third analog-to-digital conversion circuit is connected to the second vertical signal line and a different signal line other than the first vertical signal line, the second vertical signal line, and the fourth vertical signal line via a third switch circuit,
the first switch circuit and the second switch circuit are connected to a first selection drive line,
the third switch circuit is connected to a second selection drive line, and
the first analog-to-digital conversion unit and the second analog-to-digital conversion unit are arranged on a same end side of a pixel array unit.

The different signal line may correspond to the third vertical signal line.

The different signal line may correspond to a signal line through which a predetermined signal value is supplied.

A first selection unit connected to the first selection drive line and
a second selection unit connected to the second selection drive line may be further included, in which
the first selection unit may include a plurality of switch circuits including the first switch circuit and the second switch circuit,
the second selection unit may include a plurality of switch circuits including the third switch circuit,
the first analog-to-digital conversion unit may include a plurality of analog-to-digital conversion circuits including the first analog-to-digital conversion circuit and the second analog-to-digital conversion circuit, the plurality of analog-to-digital conversion circuits corresponding to the plurality of switch circuits included in the first selection circuit, and
the second analog-to-digital conversion unit may include a plurality of analog-to-digital conversion circuits including the third analog-to-digital conversion circuit, the plurality of analog-to-digital conversion circuits corresponding to the plurality of switch circuits included in the second selection circuit.

Regarding a plurality of vertical signal lines including the first to fourth vertical signal lines and connected to the first selection circuit and the second selection circuit,
each of the plurality of switch circuits included in the first selection unit may be connected to two of the plurality of vertical signal lines in a predetermined order in accordance with an arrangement order of the plurality of switch circuits,
each of the plurality of switch circuits included in the second selection unit may be connected to two of the plurality of vertical signal lines in a predetermined order in accordance with an arrangement order of the plurality of switch circuits,
a left vertical signal line of the two vertical signal lines may be a right vertical signal line of the two vertical signal lines of any one of the plurality of switch circuits included in the first selection circuit, and
a right vertical signal line of the two vertical signal lines may be a left vertical signal line of the two vertical signal lines of any one of the plurality of switch circuits included in the first selection circuit.

Each of the plurality of switch circuits included in the first selection unit may be connected to two vertical signal lines including a $(2n-1)$ ($n$ is 1 to $M/2$, and $M$ is an even number)-th vertical signal line and a $(2n)$-th vertical signal line from left in accordance with the arrangement order of the plurality of switch circuits, and each of the plurality of switch circuits included in the second selection unit may be connected to two vertical signal lines including the (2n)-th vertical signal line and a (2n+1)-th vertical signal line from left in accordance with the arrangement order of the plurality of switch circuits.

Each of the plurality of switch circuits included in the first selection unit may be connected to two vertical signal lines including a ((n−1)×8+m) ((n is 1 to M/4, M is a multiple of 8, and m is 1 to 4)-th vertical signal line and a ((n−1)×8+m+4)-th vertical signal line from left in accordance with the arrangement order of the plurality of switch circuits, and each of the plurality of switch circuits included in the second selection unit may be connected to two vertical signal lines including the ((n−1)×8+m+4)-th vertical signal line and a (n×8+m)-th vertical signal line from left in accordance with the arrangement order of the plurality of switch circuits.

Each of the plurality of switch circuits included in the first selection unit may be connected to two vertical signal lines including a ((n−1)×4+m) ((n is 1 to M/4, M is a multiple of 4, and m is 1 or 2)-th vertical signal line and a ((n−1)×4+m+2)-th vertical signal line from left in accordance with the arrangement order of the plurality of switch circuits, and each of the plurality of switch circuits included in the second selection unit may be connected to two vertical signal lines including the ((n−1)×4+m+2)-th vertical signal line and a (n×4+m)-th vertical signal line from left in accordance with the arrangement order of the plurality of switch circuits.

In a case where a difference image is captured, each of the switch circuits included in the first selection unit may alternately select the left vertical signal line or the right vertical signal line of the two vertical signal lines, and each of the switch circuits included in the second selection unit may alternately select the right vertical signal line or the left vertical signal line of the two vertical signal lines.

In a case where a normal image is captured, each of the switch circuits included in the first selection unit may select either the left vertical signal line or the right vertical signal line of the two vertical signal lines, and each of the switch circuits included in the second selection unit may select a vertical signal line of the two vertical signal lines on a same side as the vertical signal line selected by the switch circuit included in the first selection circuit.

The pixel array unit may include a plurality of pixels arranged in a matrix, in a case where the left vertical signal line of the two signal lines of each of the plurality of switch circuits included in the first selection unit is selected, a pixel in a first row may be electrically connected, and in a case where the right vertical signal line of the two signal lines is selected, a pixel in a second row different from the first row may be electrically connected.

The pixel array unit may include a plurality of pixels arranged in a matrix, in a case where the left vertical signal line of the two signal lines of each of the plurality of switch circuits included in the first selection unit is selected, a pixel in a first row and a pixel in a second row different from the first row may be electrically connected, and in a case where the right vertical signal line of the two signal lines is selected, a pixel in a third row different from the first row and the second row and a pixel in a fourth row different from the first row, the second row, and the third row may be electrically connected.

The pixel array unit may include a plurality of pixels arranged in a matrix, in a case where the left vertical signal line of the two signal lines of each of the plurality of switch circuits included in the first selection unit is selected, a pixel in a first row may be electrically connected, in a case where the right vertical signal line of the two signal lines is selected, a pixel in a third row spaced one row apart from the first row may be electrically connected, then, in a case where the left vertical signal line of the two signal lines is selected, a pixel in a second row adjacent to the first row may be electrically connected, and then, in a case where the right vertical signal line of the two signal lines is selected, a pixel in a fourth row spaced one row apart from the second row may be electrically connected.

The pixel array unit may include a plurality of pixels arranged in a matrix, in a case where the left vertical signal line of the two signal lines of each of the plurality of switch circuits included in the first selection unit is selected, pixels in first to fourth rows may be electrically connected, and in a case where the right vertical signal line of the two signal lines is selected, pixels in fifth to eighth rows different from the first to fourth rows may be electrically connected.

The pixel array unit may include a plurality of pixels arranged in a matrix, in a case where the left vertical signal line of the two signal lines of each of the plurality of switch circuits included in the first selection unit is selected, a pixel in a predetermined row among first to fourth rows may be electrically connected, and in a case where the right vertical signal line of the two signal lines is selected, a pixel in a predetermined row among fifth to eighth rows different from the first to fourth rows may be electrically connected.

The pixel array unit may include pixels arranged in a Bayer array.

The pixel array unit may include a plurality of pixels arranged in a matrix, and each of the plurality of pixels may include:

a photoelectric conversion element unit configured to generate a current corresponding to an amount of received light by means of photoelectric conversion;

a transfer transistor having a drain connected to a cathode of the photoelectric conversion element unit;

a reset transistor having a source connected to a source of the transfer transistor;

an amplification transistor having a gate connected to the source of the transfer transistor;

a floating diffusion connected to the gate of the amplification transistor; and a selection transistor having a drain connected to a source of the amplification transistor and having a source connected to any one of the first to fourth vertical signal lines.

The pixel array unit may include pixels arranged in a Bayer array, and the vertical signal lines may be each electrically connected to a floating diffusion connected to four pixels constituting the Bayer array.

Provided is an electronic apparatus including:
the solid-state solid-state imaging element according to claim 1; and
an optical system configured to cause light to enter the pixel array unit.

MODE FOR CARRYING OUT THE INVENTION

Hereinafter, embodiments of a solid-state imaging element and an electronic apparatus will be described with reference to the drawings. Although principal components of the solid-state imaging element and the electronic apparatus will be mainly described below, the solid-state imaging element and the electronic apparatus may include components and functions that are not illustrated or described. The following description does not exclude components and functions that are not illustrated or described.

First Embodiment

Figure 1:
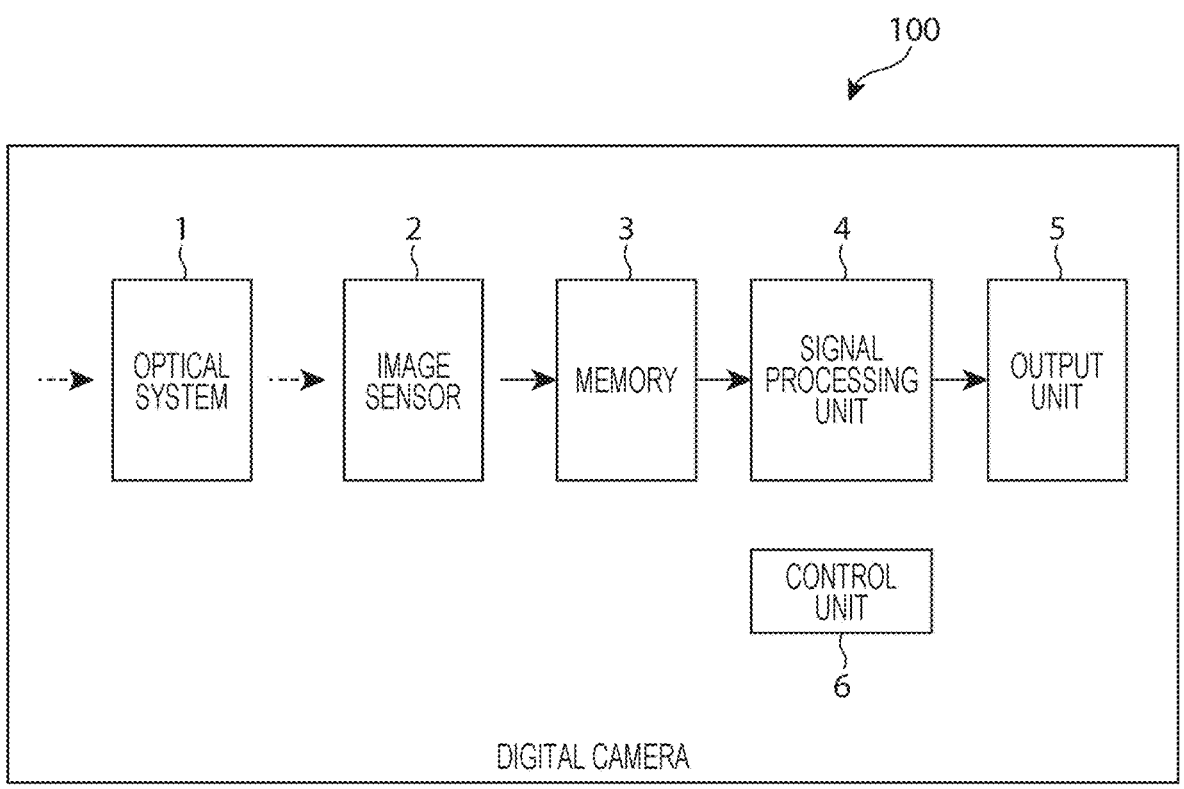
FIG. 1 is a block diagram illustrating a configuration example of an embodiment of a digital camera to which the present technology is applied.

FIG. 1 is a block diagram illustrating a configuration example of an embodiment of a digital camera to which the present technology is applied. Note that the digital camera 100 is capable of capturing both a still image and a moving image.

As illustrated in FIG. 1, the digital camera 100 includes an optical system 1, an image sensor 2, a memory 3, a signal processing unit 4, an output unit 5, and a control unit 6. Note that the digital camera according to the present embodiment corresponds to the electronic apparatus.

The optical system 1 includes, for example, a zoom lens, a focus lens, a diaphragm, and the like (not illustrated) and causes external light to enter the image sensor 2. The image sensor 2 is, for example, a solid-state imaging element such as a complementary metal oxide semiconductor (CMOS) image sensor, and the image sensor 2 receives light incident from the optical system 1, performs photoelectric conversion, and outputs image data corresponding to the light incident from the optical system 1. The memory 3 temporarily stores the image data output from the image sensor 2.

Figure 2C:
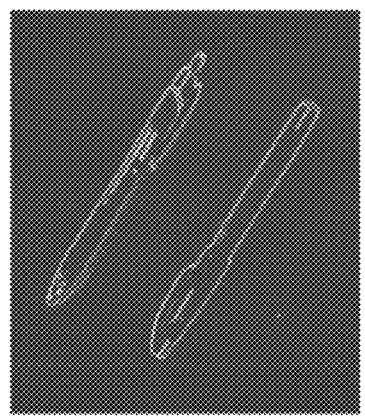
FIGS. 2A, 2B, and 2C are diagrams illustrating an example of an image captured by the digital camera.
Figure 2B:
Figure 2A:
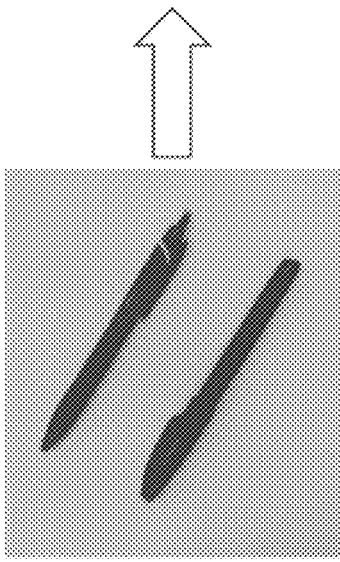

FIGS. 2A, 2B, and 2C are diagrams illustrating an example of an image captured by the digital camera 100. FIG. 2A is a general captured image that can be captured as a color image or a monochrome image. FIG. 2B is a difference image obtained by generating difference information between pixels in FIG. 2A as contour information. FIG. 2C is a binary image obtained by performing threshold processing on the pixel values in FIG. 2B to binary-convert the pixel values. Note that, in the present embodiment, the difference image may be referred to as contour image.

The difference image in FIG. 2B represents the amount of difference in a multi-valued form. Therefore, the image gives a thin impression. The binary image in FIG. 2C is generated by setting a value larger than the threshold to 1 and a value smaller than the threshold to 0. This gives a more visually emphasized impression.

For example, it is typical for an object recognition algorithm to add processing of extracting an edge to a pre-stage to extract only an important contour for recognition. Therefore, in the object recognition algorithm, the use of a binary image such as the binary image in FIG. 2C reduces processing for unimportant information to lighten a recognition computation processing load. The same applies to a case where AI or the like is used, and recognition can be performed with smaller computation resources.

The signal processing unit 4 performs processing such as noise removal and white balance adjustment as signal processing using the image data stored in the memory 3, and supplies the processed image data to the output unit 5. The output unit 5 outputs the image data received from the signal processing unit 4. Furthermore, the signal processing unit 4 can also perform object recognition using an object recognition algorithm. This object recognition algorithm can use a binary image indicating a contour of an object. In this case, since the binary image has a smaller data size as a result of binary conversion, it is possible to slim down the processing based on the object recognition algorithm performed by the signal processing unit 4.

As described above, a shape is important for the contour information in the object recognition algorithm, and the importance of the multi-valued information amount is relatively low, so that even if the granularity of quantization is lowered, the recognition is not greatly affected. Therefore, as illustrated in FIG. 2C, the binary conversion allows a reduction in bit depth to $\frac{1}{12}$, $\frac{1}{10}$, (corresponding to, for example, cases where the bit depth of the captured image are 12 bits and 10 bits, respectively), or the like, which is smaller than the bit depth of the image. Furthermore, it is also possible to reduce, by reducing a bit depth during AD conversion as compared with a bit depth of an image for viewing, a circuit scale or a processing time of AD conversion.

The output unit 5 outputs the result of recognition performed by the signal processing unit 4. Furthermore, the output unit 5 includes, for example, a display (not illustrated) including liquid crystal or the like, and displays an image corresponding to the image data from the signal processing unit 4 as a so-called through image. Moreover, the output unit 5 further includes a driver (not illustrated) that drives a recording medium such as a semiconductor memory, a magnetic disk, or an optical disc and records the image data from the signal processing unit 4 in the recording medium.

The control unit 6 can control the digital camera 100 to cause the digital camera 100 to capture a general captured image or capture a difference image. The control unit 6 controls each block constituting the digital camera in accordance with user's operation or the like. In the digital camera configured as described above, the image sensor 2 receives incident light from the optical system 1, and outputs image data captured in a general manner (see FIG. 2A) or difference image data (see FIG. 2B) based on the incident light. Furthermore, the image sensor 2 can also output a binary image (see FIG. 2C).

The image data, the difference image data, and the binary image data output from the image sensor 2 are supplied to and stored in the memory 3. At least one of the image data, the difference image data, or the binary image data stored in the memory 3 is subjected to signal processing by the signal processing unit 4, and the resultant image data is supplied to the output unit 5 and output.

Figure 3:
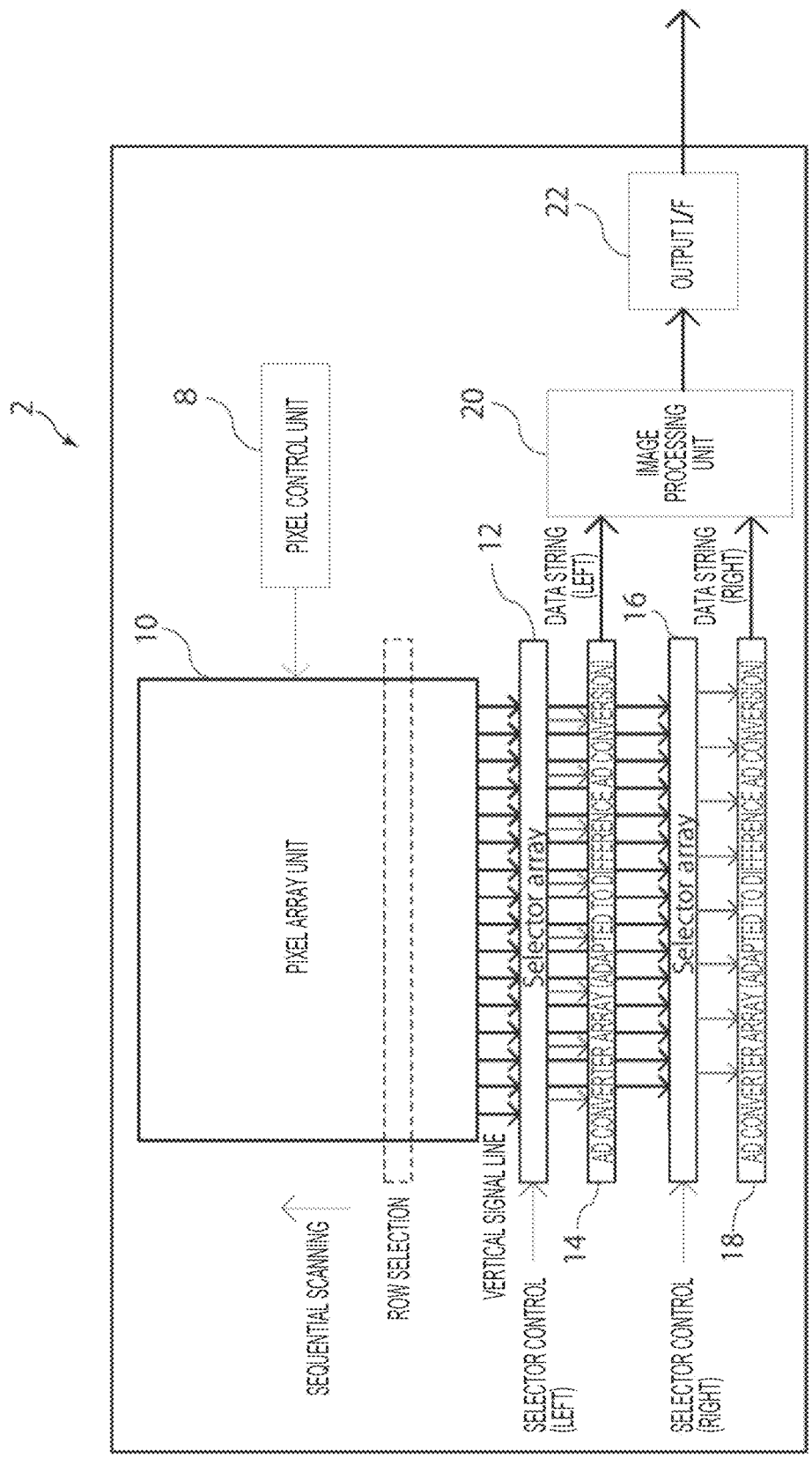
FIG. 3 is a block diagram illustrating a configuration example of an image sensor in FIG. 1.

FIG. 3 is a block diagram illustrating a configuration example of the image sensor 2 in FIG. 1. As illustrated in FIG. 3, the image sensor 2 includes a pixel control unit 8, a pixel array unit 10, a first selection unit 12, a first AD conversion unit 14, a second selection unit 16, a second AD conversion unit 18, an image processing unit 20, and an output interface 22.

The pixel control unit 8 controls the image sensor 2 under the control of the control unit 6 (see FIG. 1). The pixel control unit 8 controls to sequentially scan the pixel array unit 10 in a row direction and capture an image. Furthermore, the first selection unit 12, the first AD conversion unit 14, the second selection unit 16, and the second AD conversion unit 18 are controlled to generate image data captured in a general manner or difference image data. A first selection drive line Sel_L (see FIG. 5 to be described later) is connected between the first selection unit 12 and the pixel control unit 8, and a second selection drive line Sel_R (see FIG. 5 to be described later) is connected between the second selection unit 16 and the pixel control unit 8. The pixel control unit 8 outputs a selector control signal (left)

(SEL_L) via the first selection drive line Sel_L, and outputs a selector control signal (right) (SEL_R) via the second selection drive line Sel_R. Note that, in the present embodiment, the selector control signal (left) and the selector control signal (right) may be referred to as selection control signal.

In the present embodiment, SEL_L set to "0" means a signal for selecting the left vertical signal line, and SEL_L set to "1" means a signal for selecting the right vertical signal line. Similarly, SEL_R set to "0" means a signal for selecting the left vertical signal line, and SEL_L set to "1" means a signal for selecting the right vertical signal line. For example, in difference processing, SEL_L and SEL_R are controlled to have different values. On the other hand, in general imaging, SEL_L and SEL_R are controlled to have the same value. Note that, since SEL_L and SEL_R indicate the selection of the left or right vertical signal line with their respective values, SEL_L and SEL_R have left-right directivity, for example.

Figure 4:
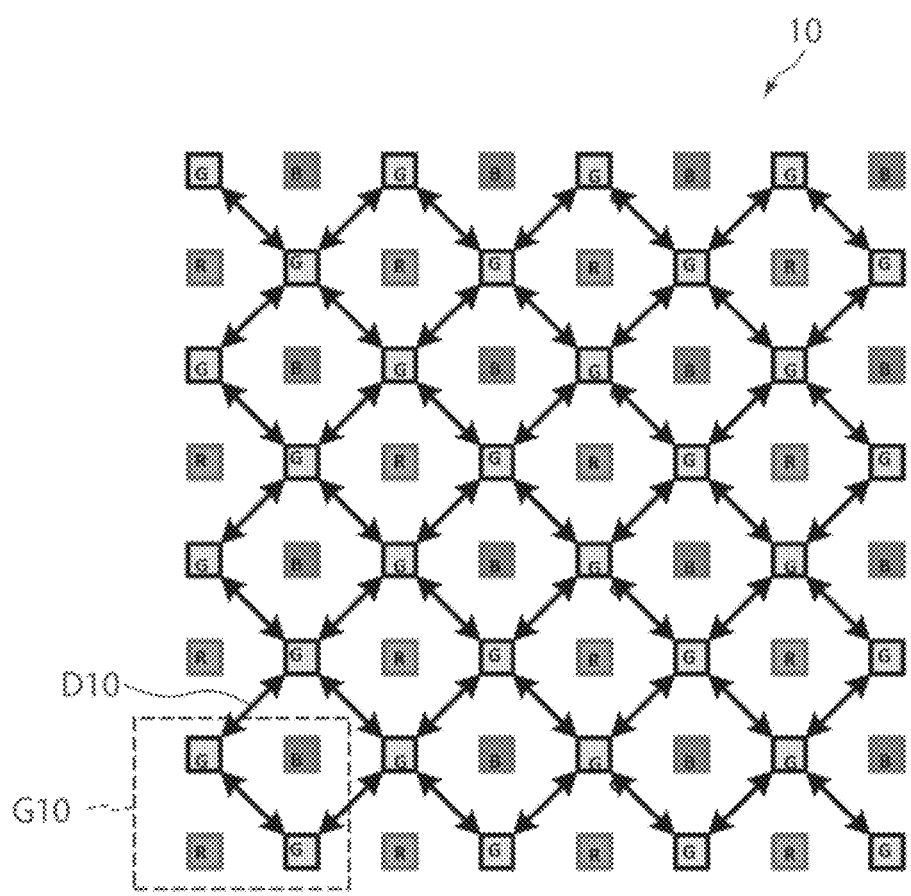
FIG. 4 is a diagram illustrating a configuration example of a pixel array unit.

FIG. 4 is a diagram illustrating a configuration example of the pixel array unit 10. As illustrated in FIG. 4, in the pixel array unit 10 according to the present embodiment, pixels including a red filter (R), a green filter (G), and a blue filter (B) are arranged in a grid pattern. That is, a pixel base unit G10 is a Bayer array and includes a pixel having the red filter (R), two pixels each having the green filter (G), and a pixel having the blue filter (B). As described above, the pixel array unit 10 includes N×M (N and M are integers of 1 or more) photoelectric conversion elements that perform photoelectric conversion, and functions as a solid-state imaging element that captures an image. Note that, in the following description, the pixel having the red filter (R) may be simply referred to as red pixel, the pixel having the green filter (G) may be simply referred to as green pixel, and the pixel having the blue filter (B) may be simply referred to as blue pixel.

Furthermore, as illustrated in FIG. 4, the image sensor 2 according to the present embodiment is capable of not only performing normal color imaging but also calculating a difference in pixel value between green pixels diagonally adjacent to each other as indicated by a bidirectional arrow D10. Note that a detailed configuration example of the pixel array unit 10 will be described later. Furthermore, the image sensor 2 according to the present embodiment will be described with reference to a configuration including red, green, and blue pixels as an example, but is not limited to such a configuration. For example, it is also possible to extract a difference using monochrome pixels or red pixels, green pixels, blue pixels, and white pixels (RGB-White pixels) in a similar manner.

The Bayer array that is a color filter array of a general image sensor has a configuration where green is emphasized, and the number of red and blue pixels is smaller than the number of green pixels. This is because human vision is highly sensitive to green, so that a greater number of green pixels is arranged. Therefore, when a human views the image captured by the image sensor 2, the image is viewed as a high-quality image. Furthermore, since green is positioned in the center of the visible light spectrum, green is contained in many cases when confirming the shape of an object. Therefore, in the image sensor 2 according to the present embodiment, the green pixels diagonally adjacent to each other are used to extract the contour of the object. In the present embodiment, this difference value is referred to as contour information. That is, in the present embodiment, a difference image is obtained by acquiring a difference value between a green pixel and another green pixel located in the upper left diagonal of the green pixel and a difference value between the green pixel and another green pixel located in the upper right diagonal of the green pixel.

As illustrated in FIG. 3 again, the first selection unit 12 selects one of a pair of signal lines adjacent to each other ((2n−1), (2n)) (n is 1 to M/2) among a plurality of vertical signals of the pixel array unit 10, and outputs a signal of the selected signal line to the first AD conversion unit 14. Here, the number of the plurality of vertical signals of the pixel array unit 10 is, for example, 1 to M (for example, M is an even number).

In a case where the difference image is generated, the first selection unit 12 selects the even-numbered vertical signal in a case where the selector control signal (left) (SEL_L) is "1", that is, a high level. Furthermore, the odd-numbered vertical signal is selected in a case where the selector control signal (left) (SEL_L) is "0", that is, a low level. As described above, in a case where the difference image is generated, the first selection unit 12 alternately selects one of the signals of the vertical signals adjacent to each other.

On the other hand, in a case where the normal image is generated, the first selection unit 12 always selects the (2n−1) (n is 1 to M/2)-th signal line of the pair of signal lines adjacent to each other ((2n−1), (2n)) (n is 1 to M/2). Note that a detailed configuration example of the first selection unit 12 will be described later. That is, in a case where the normal image is generated, the selector control signal (left) (SEL_L) is always "0", that is, the low level.

The first AD conversion unit 14 performs difference processing using the two image signals supplied in time series from the first selection unit 12, and converts the two image signals into digital image data. That is, in a case where the difference image is generated, the first AD conversion unit 14 converts a difference value between the signal of the signal line (2n−1) (n is 1 to M/2) and the signal of the signal line (2n) (n is 1 to M/2) into a digital signal.

On the other hand, in a case where the normal image is generated, the first AD conversion unit 14 generates a difference between the signal lines of (2n−1) (n is 1 to M/2)-th signal line. That is, in a case where the normal image is generated, the first AD conversion unit 14 converts a difference value between an offset component signal transmitted in time series and a pixel signal into a digital signal. Note that a detailed configuration example of the first AD conversion unit 14 will also be described later.

The second selection unit 16 selects one of a pair of signal lines adjacent to each other ((2n), (2n+1)) (n is 1 to (M/2)) among the plurality of vertical signals of the pixel array unit 10, and outputs a signal of the selected signal line to the second AD conversion unit 18. The second selection unit 16 selects the even-numbered vertical signal in a case where the selector control signal (right) (SEL_R) is "0", that is, the low level, and selects the odd-numbered vertical signal (VSL) in a case where the selector control signal (right) (SEL_R) is "1", that is, the high level.

On the other hand, in a case where the normal image is generated, the second selection unit 16 always selects the (2n) (n is 1 to M/2)-th signal line of the pair of signal lines adjacent to each other ((2n), (2n+1)) (n is 1 to M/2). Note that a detailed configuration example of the second selection unit 16 will be described later. That is, in a case where the normal image is generated, the rector control (left) (SEL_R) is always the "0" selection signal.

The second AD conversion unit 18 performs difference processing using the two image signals supplied in time series from the second selection unit 16, and converts the two image signals into digital image data. That is, in a case where the difference image is generated, the second AD conversion unit 18 converts a difference value between the signal of the signal line (2n) (n is 1 to M/2) and the signal of the signal line (2n+1) (n is 1 to M/2) into a digital signal.

On the other hand, in a case where the normal image is generated, the second AD conversion unit 18 generates a difference between the signal lines of (2n) (n is 1 to M/2)-th signal lines. That is, in a case where the normal image is generated, the second AD conversion unit 18 converts a difference value between an offset component signal transmitted in time series and a pixel signal into a digital signal. Note that a detailed configuration example of the second AD conversion unit 18 will also be described later.

As described above, the AD conversion unit is divided into two, that is, the first AD conversion unit 14 and the second AD conversion unit 18. Furthermore, the total number of AD converters is equal to the number of vertical signal lines VSL. Therefore, the number of AD converters is the same as in the general sensor configuration, and it is therefore possible to calculate a difference in pixel value between pixels adjacent to the vertical signal lines in addition to normal color imaging (or monochrome imaging) while suppressing an increase in circuit scale. In particular, in the present embodiment, a difference in pixel value between green pixels diagonally adjacent to each other is calculated.

The image processing unit 20 can perform general image processing such as noise reduction processing on the image data subjected to the AD conversion performed by the first AD conversion unit 14 and the second AD conversion unit 18. Note that since the AD conversion unit is divided into two AD conversion units, the first AD conversion unit 14 and the second AD conversion unit 18, the image processing unit 20 can add, in a case where the difference processing is performed, processing of alternately rearranging a data string (left) and a data string (right) in order to adapt to the conventional image output and format. Furthermore, the image processing unit 20 performs threshold processing on the difference image to generate a binary image. This threshold may be set in advance, or may be set in accordance with user's operation or the like. The output interface 22 supplies the image data supplied from the image processing unit 20 to, for example, the memory 3 (see FIG. 1).

Figure 5:
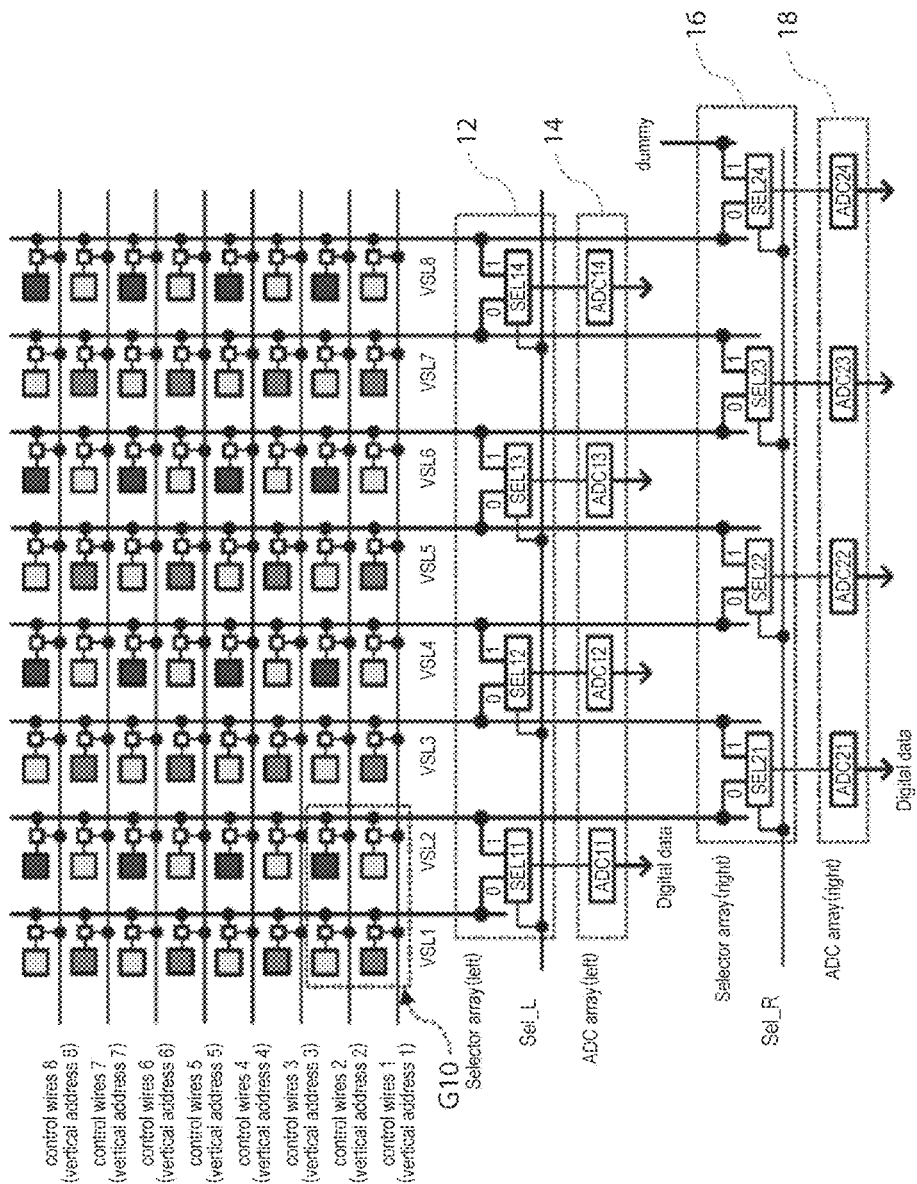
FIG. 5 is a diagram illustrating an example of a circuit of the pixel array unit.

FIG. 5 is a diagram illustrating an example of a circuit including the pixel array unit 10, the selector array (the first selection unit 12 and the second selection unit 16), and the AD conversion unit (the first AD conversion unit 14 and the second AD conversion unit 18). Note that the description will be given on the assumption that the number of pixels is 8×8 for the sake of simplicity, but the number of pixels is not limited to 8×8.

As described above, each pixel of the pixel array unit 10 is exposed to light via a corresponding one of the R/G/B color filters. The pixel control unit 8 (see FIG. 3) performs shutter/floating diffusion (FD) transfer/read control on the pixels via control lines (control wires) wired in the horizontal direction of the pixel array unit 10. Each control line used for control is shared in the horizontal direction, and is assigned with a corresponding vertical address from the bottom to the top.

On the other hand, the vertical signal lines VSL wired in the vertical direction connect each pixel arranged in the column direction of the pixel array unit 10 to the first AD conversion unit 14 and the second AD conversion unit 18 via the first selection unit 12 and the second selection unit 16. As described above, either the first AD conversion unit 14 or the second AD conversion unit 18 is electrically connected to each of the vertical signal lines VSL via the first selection unit 12 and the second selection unit 16. Here, "electrically connected" means a state where a signal can be transmitted.

As described above, the first selection unit 12 and the second selection unit 16 select one of the vertical signal lines VSL adjacent to each other. That is, the first selection unit 12 includes a plurality of selectors SEL11 to 14. The two signal lines adjacent to each other ((2n−1), (2n)) (n is 1 to M/2) are sequentially connected to each of the selectors SEL11 to 14. The second selection unit 16 includes a plurality of selectors SEL21 to 24. The two signal lines adjacent to each other ((2n), (2n+1)) (n is 1 to M/2) are sequentially connected to each of the selectors SEL21 to 24.

The first AD conversion unit 14 includes a plurality of AD converters ADC11 to 14. Each of the plurality of AD converters ADC11 to 14 is connected to a corresponding one of the selectors SEL11 to 14. Similarly, the second AD conversion unit 18 includes a plurality of AD converters ADC21 to 24. Each of the plurality of AD converters ADC21 to 24 is connected to a corresponding one of the selectors SEL21 to 24. Note that the AD converter according to the present embodiment corresponds to an analog-to-digital conversion circuit. Furthermore, the first AD conversion unit 14 corresponds to a first analog-to-digital conversion unit, and the second AD conversion unit 18 corresponds to a second analog-to-digital conversion unit.

In a case of normal imaging, the pixel control unit 8 maintains SEL_L and SEL_R, which are selection control signals, at the low level, that is, the value of 0, for example. Therefore, the first selection unit 12 and the second selection unit 16 each selects the left vertical signal lines VSL. More specifically, the signal of a vertical signal line VSL1 is input to ADC11, the signal of a vertical signal line VSL2 is input to ADC21, the signal of a vertical signal line VSL3 is input to ADC12, the signal of a vertical signal line VSL4 is input to ADC22, the signal of a vertical signal line VSL5 is input to ADC13, the signal of a vertical signal line VSL6 is input to ADC23, the signal of a vertical signal line VSL7 is input to ADC14, and the signal of a vertical signal line VSL8 is input to ADC28.

As described above, one AD converter is provided for one vertical signal line. As can be understood from the above, the case where SEL_L and SEL_R are maintained at the low level, that is, the value of 0, serves as a configuration similar to the configuration of the normal image sensor. As described above, in a case where SEL_L and SEL_R are set to the same value "0", the selectors SEL11 to 14 and the selectors SEL 21 to 24 select the vertical signal lines in the same direction, that is, the left vertical signal lines. It is therefore possible to acquire the general captured image by driving pixels row by row and performing normal AD conversion. As described above, one of the features is that the general captured image can be acquired. The selectors SEL11 to 14 and the selectors SEL21 to 24 according to the present embodiment each correspond to a switch circuit.

Figure 6:
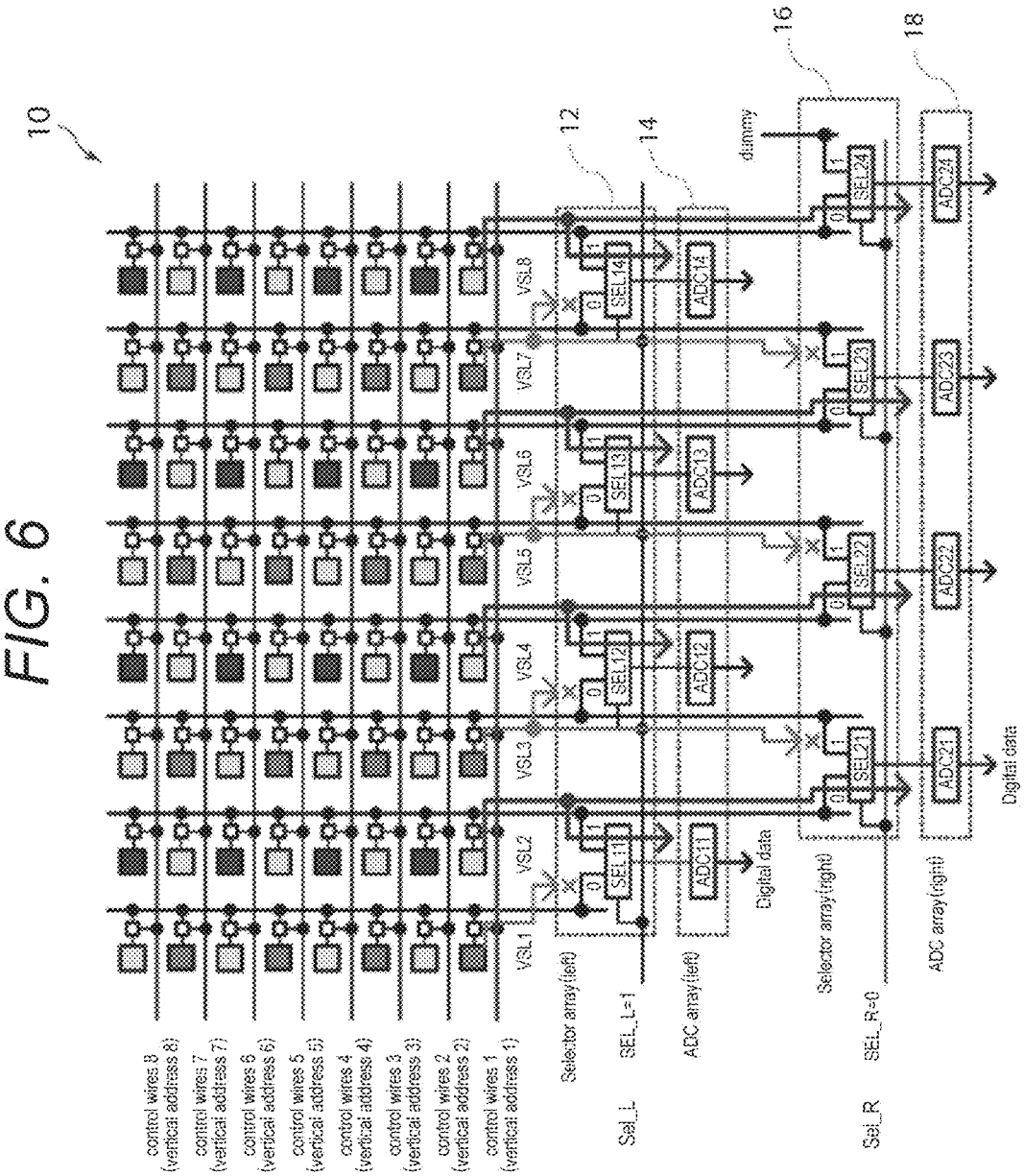
FIG. 6 is a diagram illustrating a state where signals of green pixels in a first row are acquired.
Figure 7:
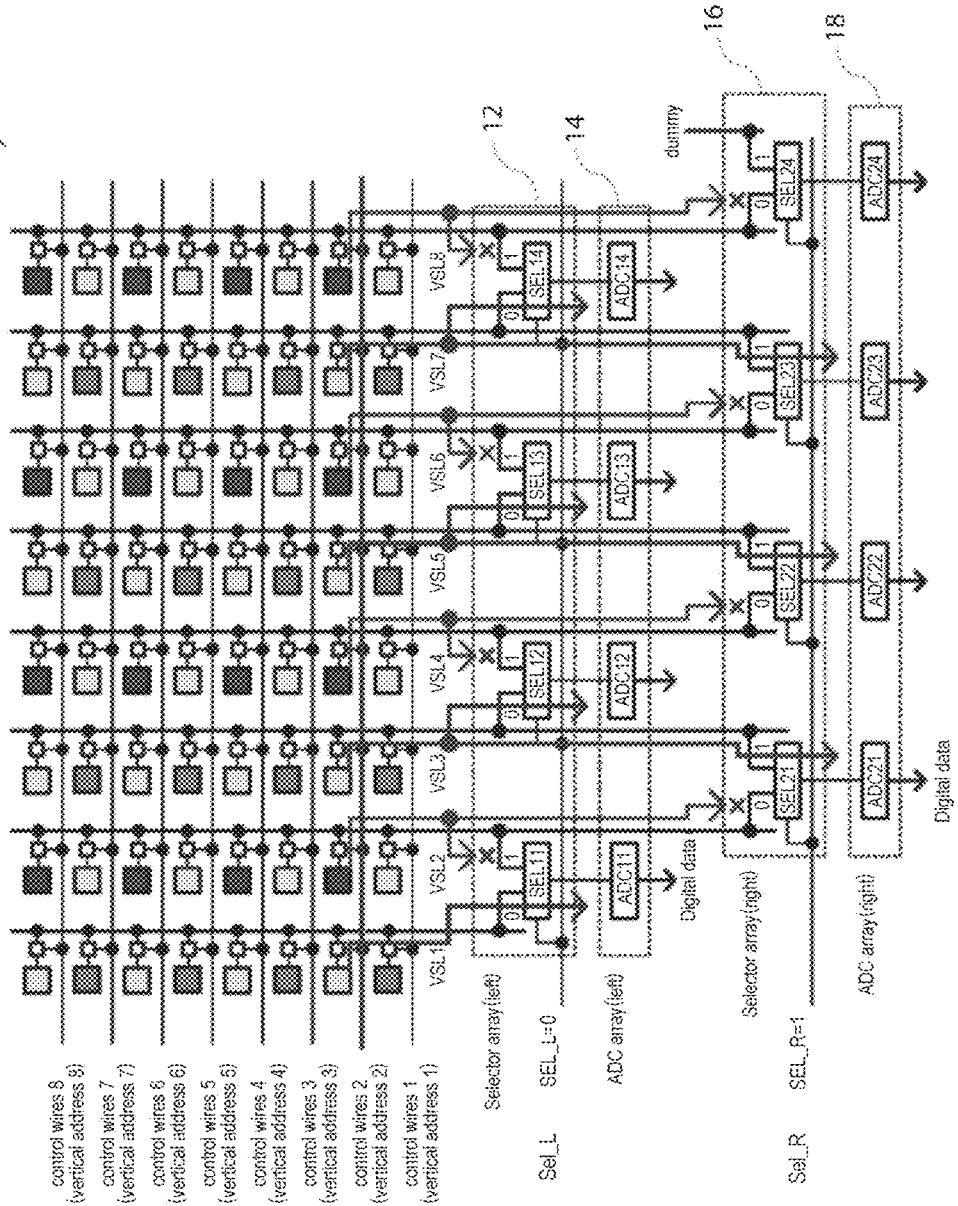
FIG. 7 is a diagram illustrating a state where signals of green pixels in a second row are acquired.
Figure 8:
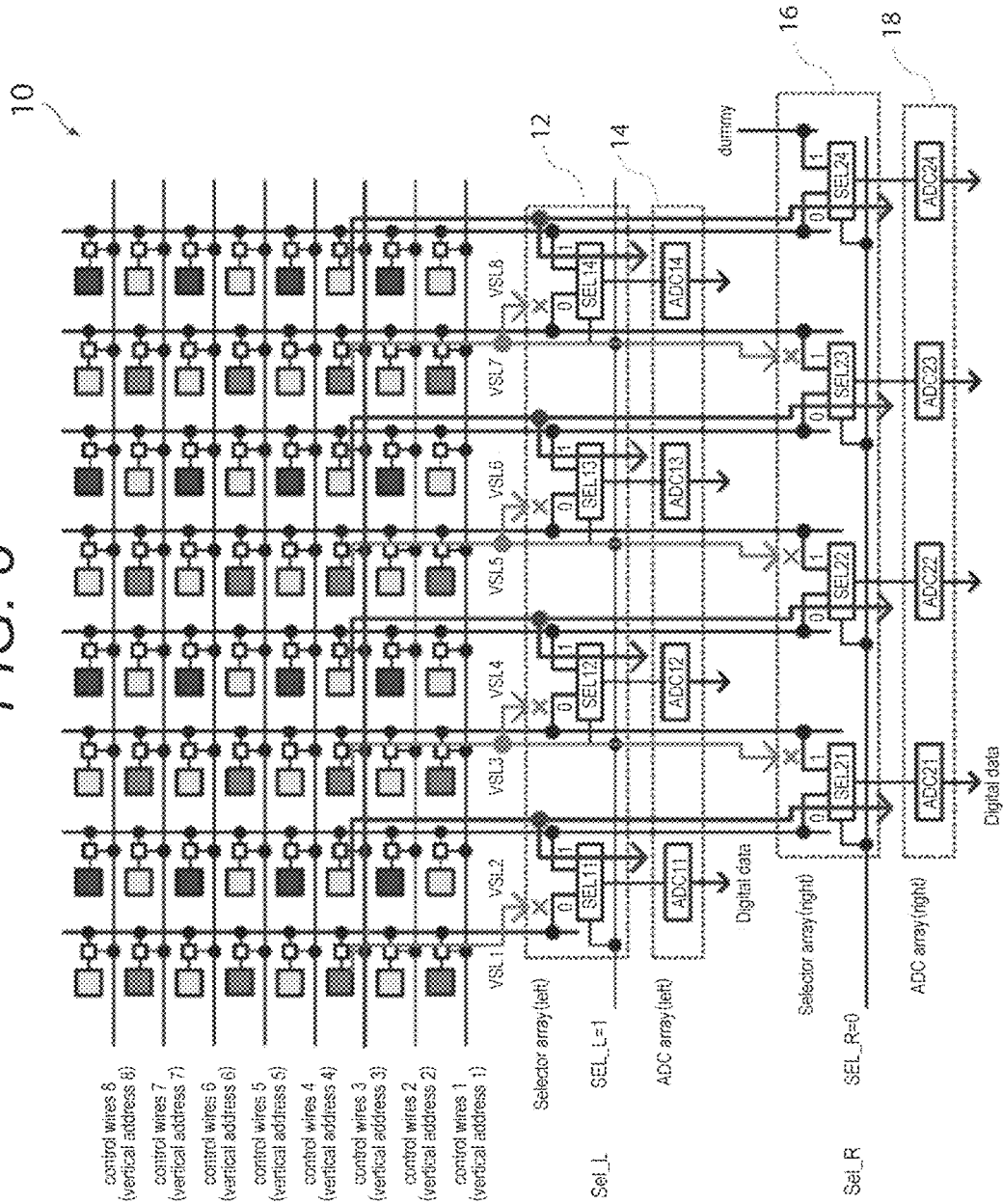
FIG. 8 is a diagram illustrating a state where signals of green pixels in a third row are acquired.

Next, an example of how to generate the difference image will be described with reference to FIGS. 6 to 8. FIG. 6 is a diagram illustrating a state where signals of green pixels in the first row are acquired. FIG. 7 is a diagram illustrating a state where signals of green pixels in the second row are acquired. FIG. 8 is a diagram illustrating a state where signals of green pixels in the third row are acquired.

in a case where the difference image is generated, in the present embodiment, a difference value between the green pixels is used as described above, for example. As illustrated in FIG. 6, the image control unit 8 selects only a control line 1 (control wires 1) and does not select control lines 2 to 8

(control wires 2 to 8). As a result, only the pixels in the row of the control line 1 are electrically connected to the corresponding vertical signal lines VSL.

Subsequently, the image control unit 8 sets the selection control signals to SEL_L=1 and SEL_R=0. Therefore, since SEL_L is 1, all the selectors SEL11 to 14 of the first selection unit 12 select VSL lines indicated by 1 (right) and output the signals of the selected vertical signal lines VSL to the first AD conversion unit 14. On the other hand, since SEL_R is 0, all the selectors SEL21 to 24 of the second selection unit 16 select VSL lines indicated by 0 (left) and output the signals of the selected vertical signal lines to the second AD conversion unit 18.

Therefore, data of the green pixel (first green pixel from left) of the control line 1 connected to the signal line VSL2 is input to the AD converter ADC11 and the AD converter ADC21. Furthermore, data of the green pixel (second green pixel from left) of the control line 1 connected to the signal line VSL4 is input to the AD converter ADC12 and the AD converter ADC22. Similarly, data of the green pixel connected to the signal line VSL6 is input to the AD converter ADC13 and the AD converter ADC23. Similarly, data of the green pixel connected to the signal line VSL8 is input to the AD converter ADC14 and the AD converter ADC24. The AD converters ADC11 to 14 and ADC21 to 24 are subjected to auto-zero (details will be described later), so that the level of the signal value of the green pixel input first is set to a reference value of each ADC, that is, the value of 0.

Next, as illustrated in FIG. 7, the image control unit 8 selects only the control line 2 and does not select the control lines 1 and 3 to 8. As a result, only the data of the pixels in the row of the control line 2 is electrically connected to the corresponding vertical signal lines VSL.

Subsequently, the image control unit 8 sets the selection control signal SEL_L=0 and the selection control signal SEL_R=1. Therefore, since SEL_L is 0, all the selectors SEL11 to 14 of the first selection unit 12 select vertical signal lines VSL indicated by 0 (left) and output the signals of the selected vertical signal lines VSL to the first AD conversion unit 14. On the other hand, since SEL_R is 1, all the selectors SEL21 to 24 of the second selection unit 1 select VSL line indicated by 1 (right) and output the signals of the selected vertical signal lines to the second AD conversion unit 18.

Therefore, data of the green pixel (first green pixel from left) of the control line 2 connected to the signal line VSL1 is input to the AD converter ADC11. Furthermore, data of the green pixel (second green pixel from left) of the control line 2 connected to the signal line VSL3 is input to the AD converter ADC12 and the AD converter ADC21. Similarly, data of the green pixel connected to the signal line VSL5 is input to the AD converter ADC13 and the AD converter ADC23. Similarly, data of the green pixel connected to the signal line VSL7 is input to the AD converter ADC14 and the AD converter ADC24.

In this state, the AD converters ADC11 to 14 and the AD converters ADC21 to 24 perform AD conversion. As described above, the data of the green images in the first row and the second row is read. As can be understood from the above-described processing, the AD converters ADC11 to 14 each convert a difference value between the green pixel in the first row and the green pixel in the second row located in the upper left diagonal of the green pixel in the first row into a digital signal. Similarly, the AD converters ADC21 to 24 each convert a difference value between the green pixel in the first row and the green pixel in the second row located in the upper right diagonal of the green pixel in the first row into a digital signal. Note that, for example, the green pixel connected to the vertical signal line VSL8 located at the right end can be also subjected to similar processing. Although a difference value from the upper left can be acquired from the AD converter ADC14, there is, however, no right signal line VSL, so that a dummy signal is input from the image control unit 8 (see FIG. 3) via a dummy signal line to avoid the circuit from becoming complicated. At this time, the data is invalid data, so that the AD converter ADC24 may discard the data. For example, the AD converter ADC24 during the difference processing may be connected to the ground (GND) or the like. Note that the dummy signal has, for example, a predetermined signal value, but is not limited thereto.

Next, how to perform the difference processing on the green pixels in the second and third rows will be described. After the difference AD conversion of the green pixels in the first row and the second row is completed, difference AD conversion of the green pixels in the second row and the third row is performed without interruption.

The difference AD conversion of the green pixels in the second row and the third row can be started in a state where the difference AD conversion of the green pixels in the first row and the second row is completed. That is, as illustrated in FIG. 7, the first green pixel from left in the second row is input to ADC11, and the second green pixel is input to ADC12, ADC21, and the like. In this state, auto-zero (AZ) is performed to store the pixel value in each ADC as a reference value.

Next, the image control unit 8 selects only the control line 3 (vertical address 3) and does not select the control lines 1, 2, and 4 to 8. As a result, only the data of the pixels in the row of the control line 3 are each electrically connected to the corresponding vertical signal lines VSL. Note that, in the present embodiment, the signal output from each pixel may be referred to as pixel data.

Subsequently, as illustrated in FIG. 8, the image control unit 8 sets the selection control signals to SEL_L=1 and SEL_R=0. Therefore, since SEL_L is 1 (right), all the selectors SEL11 to 14 of the first selection unit 12 select VSL lines indicated by 1 (right) and output the signals of the selected vertical signal lines to the first AD conversion unit 14. On the other hand, since SEL_R is 0 (left), all the selectors SEL21 to 24 of the second selection unit 16 select VSL lines indicated by 0 (left) and output the signals of the selected vertical signal lines to the second AD conversion unit 18.

In this state, the AD converters ADC11 to 14 and the AD converters ADC21 to 24 perform AD conversion. As described above, the data of the green images in the second row and the third row is read. As can be understood from the above-described processing, the AD converters ADC11 to 14 each convert a difference value between the green pixel in the second row and the green pixel in the third row located in the upper right diagonal of the green pixel in the second row into a digital signal. Similarly, the AD converters ADC21 to 24 each convert a difference value between the green pixel in the second row and the green pixel in the third row located in the upper left diagonal of the green pixel in the second row into a digital signal. Sequentially repeating such difference AD conversion processing for each row of the pixel array unit 10 makes it possible to calculate the difference in pixel value between the green pixels diagonally adjacent to each other as indicated by the bidirectional arrow D10 (see FIG. 4).

Figure 9:
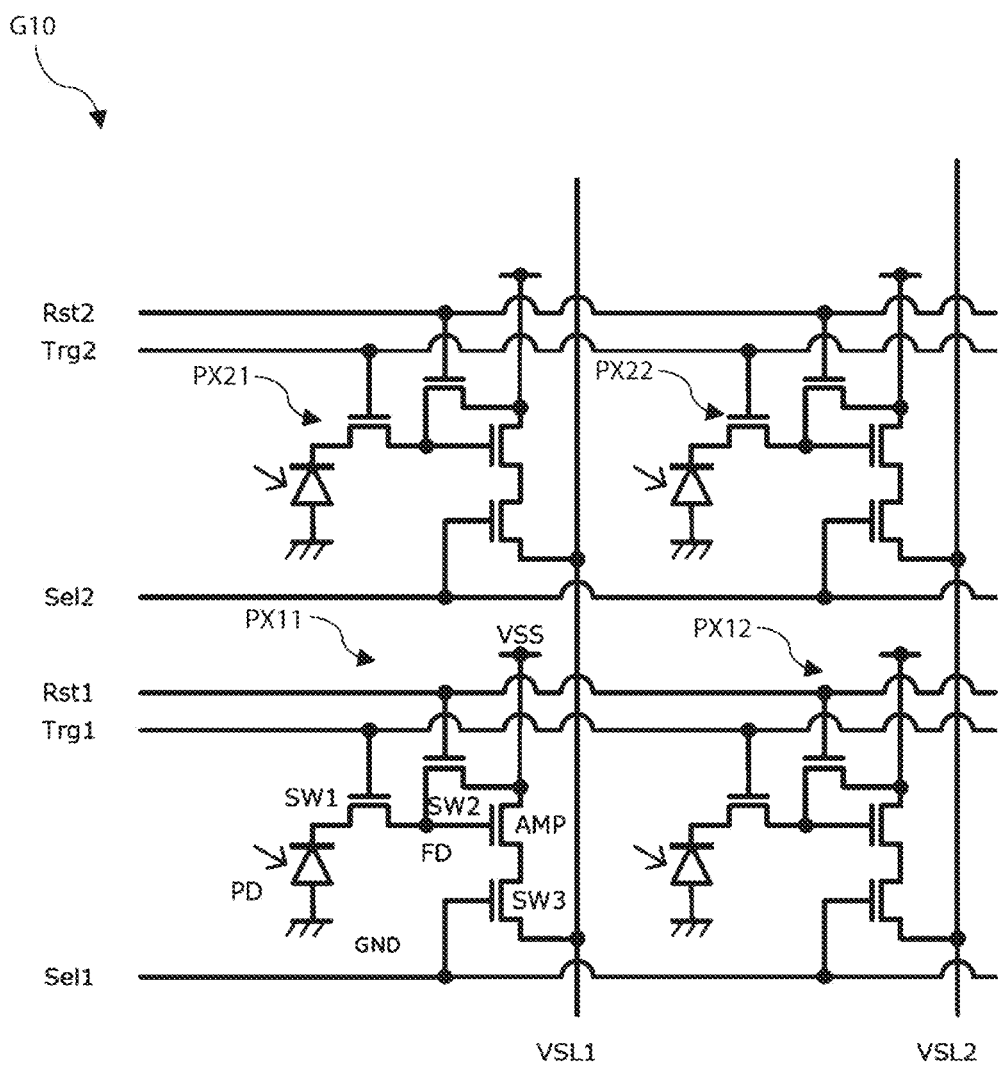
FIG. 9 is a diagram illustrating a circuit configuration example of a pixel base unit.

FIG. 9 is a diagram illustrating a circuit configuration example of the pixel base unit G10. As illustrated in FIG. 9, the pixel base unit G10 includes four pixels PX11, 12, 21, and 22. The pixel PX11 includes a photodiode PD, a transfer transistor SW1, a reset transistor SW2, an amplification transistor AMP, a selection transistor SW3, and a roating diffusion FD. In the pixel base unit G10, the pixel PX11 is a red pixel, the pixels PX12 and 21 are green pixels, and the pixel PX22 is a blue pixel.

The photodiode (photoelectric conversion element unit) PD generates a current corresponding to the amount of received light by means of photoelectric conversion. The photodiode PD has an anode connected to the ground (GND) and has a cathode connected to a drain of the transfer transistor SW1.

Various control signals are input from the image control unit 8 to the pixel PX11 via signal lines Trg1, Rst1, and Sell. That is, a bundle of the signal lines Trg1, Rst1, and Sell corresponds to each control line (control wires 1) (see FIG. 5).

The signal line TRG1 for transmitting a transfer gate signal is connected to a gate of the transfer transistor SW1. The transfer transistor SW1 has a source connected to a connection point between a source of the reset transistor SW2 and a gate of the amplification transistor AMP. This connection point constitutes the floating diffusion FD serving as a capacitor for accumulating signal charges.

When the high-level transfer signal TRG1 is input to the gate of the transfer transistor SW1 through the signal line Trg1, the transfer transistor SW1 turns on to transfer the signal charges (here, photoelectrons) accumulated by photoelectric conversion of the photodiode PD to the floating diffusion FD. Note that, in the present embodiment, "turn on" may be referred to as connected state, and "turn off" may be referred to as non-connected state.

The reset transistor SW2 has a gate connected to the signal line Rst1 for transmitting a reset signal and has a drain connected to a constant voltage source VSS. When the high-level reset signal RST1 is input to the gate of the reset transistor SW2 through the signal line Rst1, the reset transistor SW2 turns on to reset the floating diffusion FD to a voltage of the constant voltage source VSS. On the other hand, in a case where the low-level reset signal RST1 is not input to the gate through the signal line RST, the reset transistor SW2 turns off to form a predetermined potential barrier between the floating diffusion FD and the constant voltage source VSS.

The amplification transistor AMP has a gate connected to the floating diffusion FD, has a drain connected to the constant voltage source VSS, and has a source connected to a drain of the selection transistor SW3.

The selection transistor SW3 has a gate connected to the signal line Sell and has a source connected to the vertical signal line VSL1. When the high-level control signal SEL1 (an address signal (vertical address signal) or a select signal) is input to the gate through the signal line Sell, the selection transistor SW3 turns on, and in a case where the low-level control signal SEL1 is input to the gate through the signal line Sell, the selection transistor SW3 turns off.

When the selection transistor SW3 turns on, the amplification transistor AMP amplifies the voltage of the floating diffusion FD and outputs the amplified voltage to the vertical signal line VSL1. The voltage output from each pixel through the vertical signal line VSL1 is output to the AD converter ADC11 or 21 (see FIG. 5). The other pixels are also similar in configuration to the pixel PX11, so that no description will be given below of the other pixels.

Figure 10:
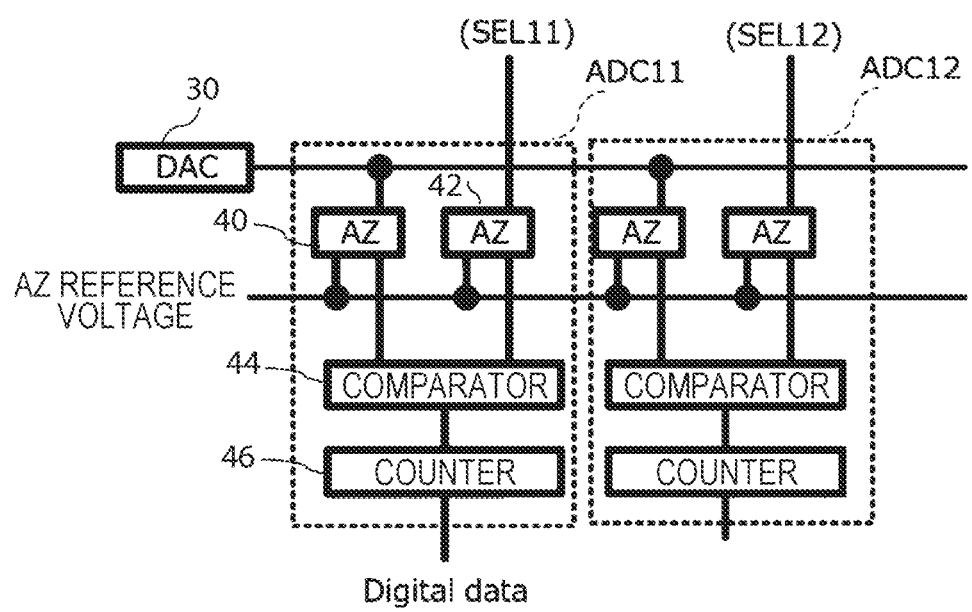
FIG. 10 is a diagram illustrating a circuit configuration example of an AD converter.

FIG. 10 is a diagram illustrating a circuit configuration example of the AD converter ADC11. As illustrated in FIG. 10, the AD converter ADC11 includes a plurality of AZ units 40 and 42, a comparator 44, and a counter 46.

A DAC unit 30 is a DA converter, and includes a counter (not illustrated) therein. The DAC unit 30 outputs a voltage value corresponding to a counter value while decrementing the counter value.

The AZ units 40 and 42 match, to an AZ reference voltage, the voltage of the signal input in a period (not illustrated) indicated by an auto-zero circuit mechanism included in the image control unit 8, and hold an offset between the voltage of the input signal and the voltage of the output. Then, the voltage offset can be continuously held even after the end of the indicated period. More specifically, the AZ unit 40 holds the offset voltage between the input voltage from the DAC unit 30 in the indicated period and the output voltage. The AZ unit 42 holds the offset voltage between the input voltage from the selector SEL11, that is, the vertical signal line VLS1 or 2, in the indicated period and the output voltage.

The comparator 44 compares the output voltage of the DAC unit 30 that has passed through the AZ unit 40, that is, the output voltage of the AZ unit 40 with the output voltage of the selector SEL11 that has passed through the AZ unit 42, that is, the output voltage of the AZ unit 42. Then, the comparator 44 inverts the output value when the output voltage of the AZ unit 40 becomes lower than the voltage of the output voltage of the AZ unit 42.

The counter 46 starts counting from the beginning of an ADC period and stops when the output of the comparator is inverted. The value of the counter that has stopped becomes digital data and becomes a value of a result of the AD conversion. The other AD converters ADC12 to 14 and 21 to 24 are also similar in configuration to the AD converter ADC11, so that no description will be given below of the other AD converters.

As described above, the AD converter ADC11 is similar in circuit configuration to the circuit of a general image sensor. Therefore, it is also possible to acquire a normal captured image. In a case of normal imaging, the AZ unit 42 holds the offset voltage between the input voltage from the selector SEL11, that is, the vertical signal line VLS1, in the indicated period and the output voltage. Then, a voltage obtained as a result of offset correction performed on the input voltage that is the image signal from VLS1 is output. That is, in a case of normal imaging, the AD converter ADC11 performs, with the first input voltage that is an offset component used as a zero reference point, AD conversion on the image signal input next to the offset component.

On the other hand, in a case where the difference image is generated, for example, in the example illustrated in FIGS. 6 and 7, the AZ unit 42 holds the offset voltage between the image signal of the green pixel in the first row that is the input voltage from the selector SEL11, that is, the vertical signal line VLS2, in the indicated period and the output voltage. Then, a voltage obtained as a result of offset correction performed on the image signal of the green pixel in the second row that is the input voltage from the vertical signal line VLS1 with respect to the image signal of the green pixel in the first row is output. That is, in a case where the difference image is generated, the AD converter ADC11 performs AD conversion on the input voltage from the green pixel in the second row with the input voltage from the green pixel in the first row used as the zero reference point.

Figure 11:
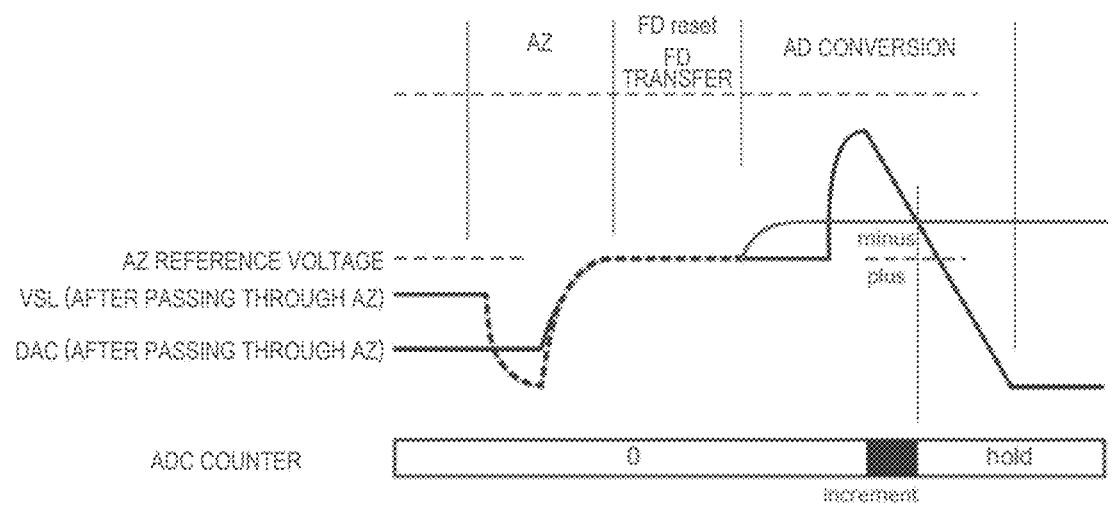
FIG. 11 is a diagram specifically illustrating a difference processing example.
Figure 12:
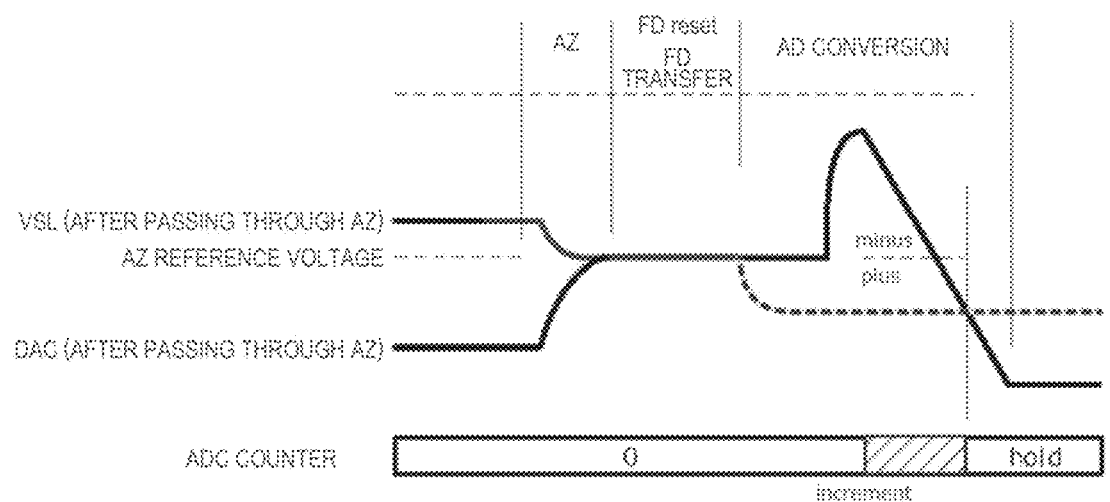
FIG. 12 is a diagram illustrating a difference processing example performed by the AD converter on pixel values of the green pixels in the first row and the second row.

FIG. 11 is a diagram specifically illustrating a difference processing example performed on the pixel value of the green pixel (first pixel) in the first row and the pixel value of the green pixel (second pixel) in the second row by the AD converter ADC11. The vertical axis indicates a state change, the AZ reference voltage, the voltage of the VSL line that has passed through the AZ unit 42, the voltage of the DAC unit 30 that has passed through the AZ unit 40, and ADC counter of the counter unit 46, and the horizontal axis indicates time. FIG. 12 is a diagram similar to FIG. 11. That is, FIG. 12 is a diagram illustrating the difference processing example performed on the pixel value of the green pixel (first pixel) in the first row and the green pixel (second pixel) in the second row by the AD converter ADC11. FIG. 11 illustrates a case where the output voltage of the green pixel PX21 (second pixel) is lower than the output voltage of the green pixel PX12 (first pixel), and FIG. 12 illustrates a case where the output voltage of the green pixel PX21 (second pixel) is higher than the output voltage of the green pixel PX12 (first pixel). That is, FIG. 11 illustrates an example where the second pixel is darker, and FIG. 12 illustrates an example where the second pixel is brighter.

During an "auto-zero (AZ) state" period of the state change, causing the selection transistor SW3 to establish an electrical connection between the output of the floating diffusion FD of the green pixel PX12 (first pixel) in the first row and the vertical signal line VSL1 allows the output voltage (pixel signal) of the first pixel to be output to the vertical signal line VSL1. As a result, the output voltage of the DAC unit 30 and the voltage level of the vertical signal line VSL1 are matched to the AZ reference voltage by the auto-zero mechanism of each of the AZ units 40 and 42. Therefore, the output voltage of the first pixel is adjusted to the zero reference for AD conversion. In this case, the AZ units 40 and 42 continue to hold their respective offset values.

Next, during a period of "FD reset, FD transfer state", in the pixel circuit of the green pixel PX12 (first pixel) in the first row, the connection between FD and VSL1 is made non-connected (closed) by the selection transistor SW3, and the FD reset and the FD transfer are performed on the green pixel PX21 (second pixel) in the second row. The AD converter ADC11 waits without changing the operation.

Next, in an "AD conversion state", the output value of the green pixel PX21 (second pixel) is output to the vertical signal line VSL2. In accordance with this output value, the AZ unit 42 outputs the output voltage of the green pixel PX21 (second pixel) while holding the offset value. As a result, in the "AD conversion state", the AZ unit 42 outputs a difference value between the output voltage of the first pixel and the output voltage of the second pixel to the comparator 44. On the other hand, in the "AD conversion state", the AZ unit 40 corrects the reference voltage that changes in a manner that depends on the counter from a predetermined initial value to a predetermined final value output from the DAC unit 30 with the held offset value, and outputs the corrected reference voltage to the comparator 44. Therefore, the AZ unit 40 adjusts the reference voltage to the zero reference for AD conversion.

Then, the comparator 44 inverts the output value at a second point where the output voltage of the AZ unit 40 becomes lower than the voltage of the output voltage of the AZ unit 42. The ADC counter of the counter unit 46 counts the second point below a first point at which the output of the reference voltage is started, and converts the counted value into a digital value. As illustrated in FIG. 11, it indicates that before the reference voltage matches the AZ reference voltage, the reference voltage is negative. That is, it indicates that the output voltage of the green pixel PX21 (second pixel) is lower than the output voltage of the green pixel PX12 (first pixel).

On the other hand, as illustrated in FIG. 12, it indicates that after the reference voltage matches the AZ reference voltage, the reference voltage is positive. That is, it indicates that the output voltage of the green pixel PX21 (second pixel) is higher than the output voltage of the green pixel PX12 (first pixel). Note that, in the difference AD conversion illustrated in FIG. 11, the signal of the vertical signal line VSL (that has passed through AZ) changes twice during the period of "auto-zero (AZ) state", but this indicates a state where the FD of the pixel is selected from a state where no pixel is selected. On the other hand, in the second and subsequent difference AD conversion (see FIG. 12), since the operation is started with the FD of the second pixel selected, the change occurs once. The second and subsequent difference processing therefore eliminates the need of providing an analog settling period in the period of the "auto-zero (AZ) state", so that the period of the "auto-zero (AZ) state" can be shortened. Therefore, in the second and subsequent processing, the difference AD conversion can be performed in a shorter time.

Figure 13:
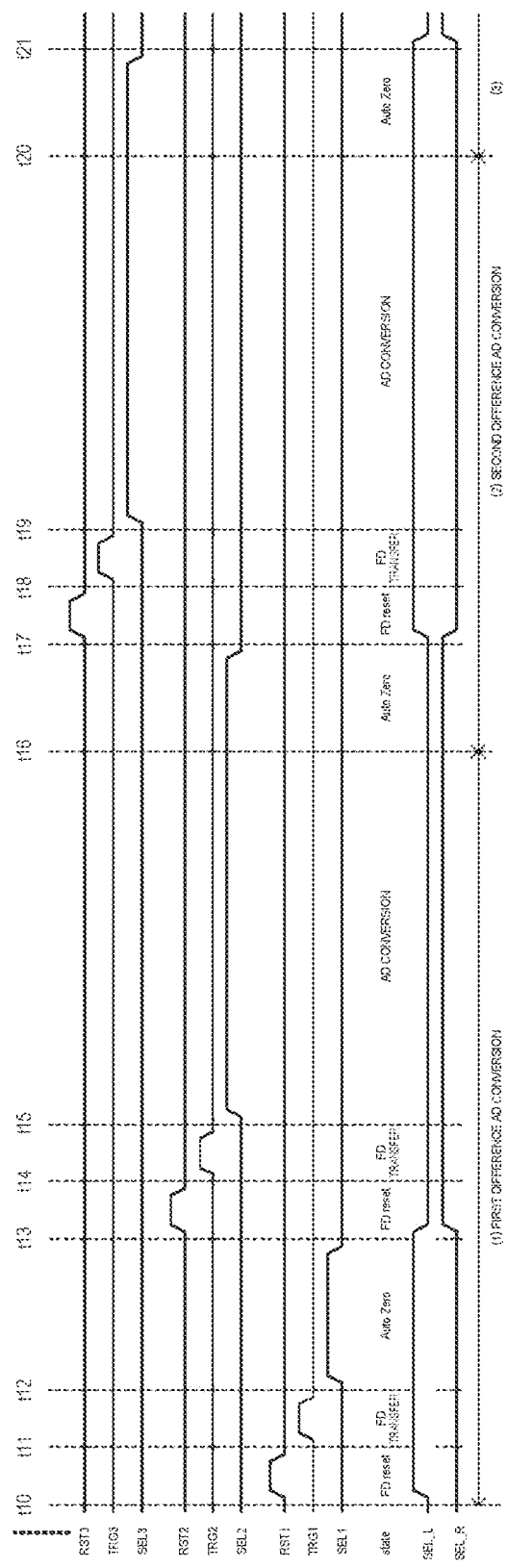
FIG. 13 is a time chart illustrating the difference processing example from time t10 to time t21.
Figure 14:
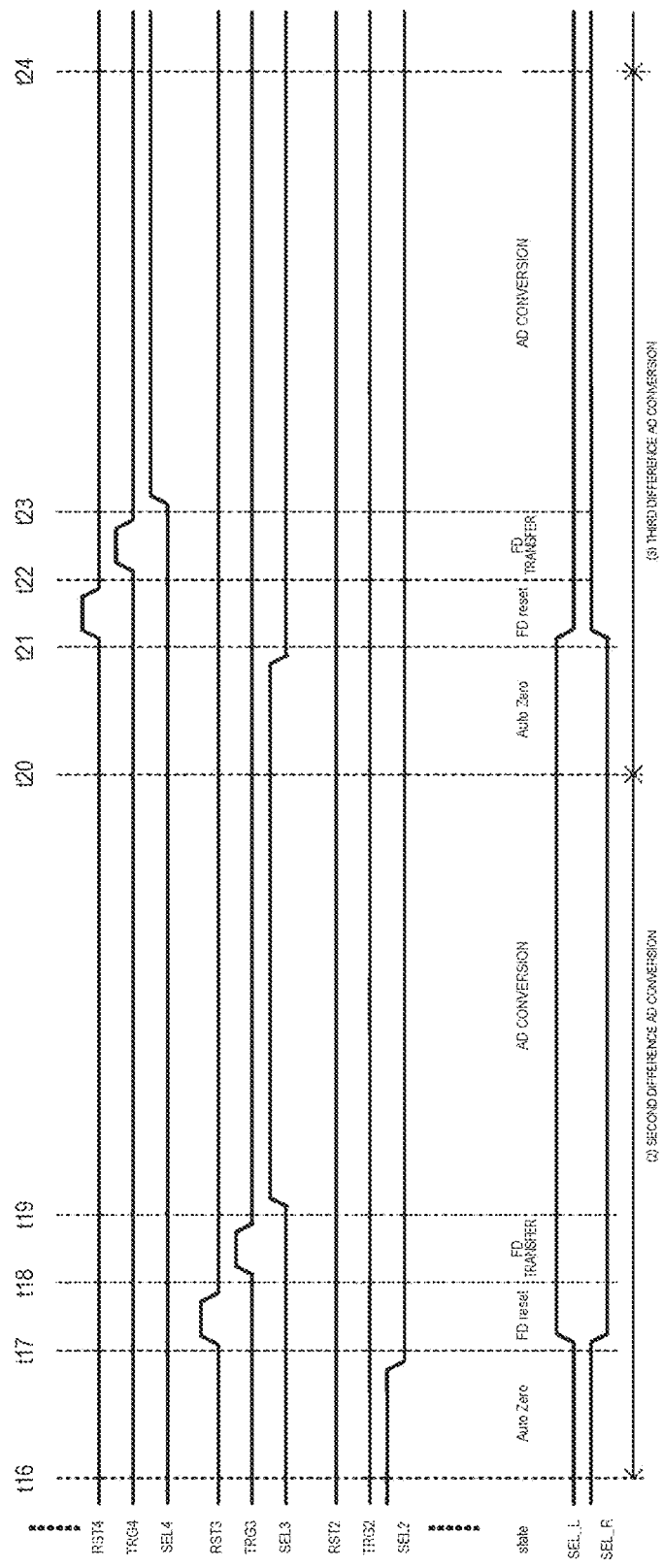
FIG. 14 is a time chart including the difference processing example from time t22 to time t24.
Figure 15:
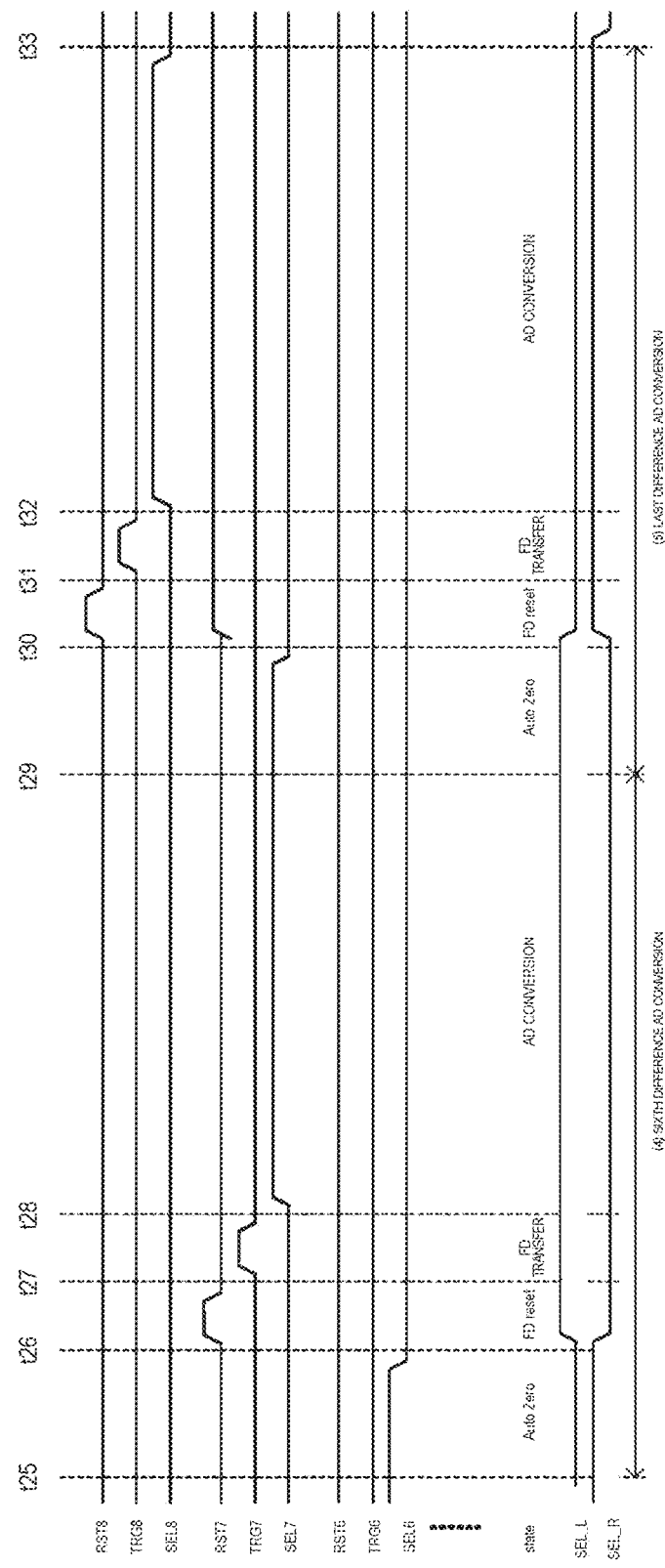
FIG. 15 is a time chart including the difference processing example performed on the last row.

Here, the difference processing example performed by the image sensor 2 will be described in detail with reference to FIGS. 13 to 15. FIG. 13 is a time chart illustrating the difference processing example from time t10 to time t21, FIG. 14 is a time chart including the difference processing example from time t22 to time t24, and FIG. 15 is a time chart including the difference processing example performed on the last row. The vertical axis indicates signals RST8, TRG8, SEL8 to RST1, TRG1, SEL1, an AD converter state State, the selection signals SEL_L, and SEL_R from the top, and the horizontal axis indicates time. In the following description, for the selection signals SEL_L and SEL_R, "0" (left) is referred to as low level, and "1" (right) is referred to as high level.

(FD Reset of First Row)

As illustrated in FIG. 13, first, at time t10, the signal RST1 and SEL_L go to the high level. As a result, the reset transistor SW2 of each pixel in the first row turns on when the high-level reset signal RST1 is input to the gate of the reset transistor SW2 through the signal line Rst1 to reset the floating diffusion FD to the voltage of the constant voltage source VSS.

(FD Transfer of First Row)

Next, at time t11, the signal RST1 goes to the low level to make the reset transistor SW2 non-connected. Then, the signal TRG1 goes to the high level. As a result, signal charges (here, photoelectrons) accumulated by photoelectric conversion of the photodiode PD of each green pixel in the first row are transferred to the floating diffusion FD.

(Auto-Zero by FD in First Row)

Next, at time t12, the signal SEL1 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, since SEL_L is at the high level and SEL_R is at the low level, the green pixel in the first row is selected. Then, the amplified potential is output to a corresponding one of the AD converters ADC11 to 14 and a corresponding one of the AD converters ADC21 to 24 (see FIG. 6).

Subsequently, between time t12 and time t13, the AZ units 40 and 42 of the AD converters ADC11 to 14 and 21 to 24 perform auto-zero (AZ) to set the green pixels in the first row to the reference value (zero value). Thereafter, the AZ circuit stores this offset amount.

(FD Reset of Second Row)

At time t14, the signal RST2 and SEL_R go to the high level, and SEL_L goes to the low level. As a result, the reset transistor SW2 of each pixel in the second row turns on when the high-level reset signal RST2 is input to the gate of the reset transistor SW2 through the signal line Rst2 to reset the floating diffusion FD to the voltage of the constant voltage source VSS.

(FD Transfer of Second Row)

Next, at time t14, the signal RST2 goes to the low level to make the set transistor SW2 non-connected. Then, the signal TRG4 goes to the high level. As a result, signal charges (here, photoelectrons) accumulated by photoelectric conversion of the photodiode PD of each green pixel in the second row are transferred to the floating diffusion FD.

(AD Conversion of First and Second Rows)

Next, at time t15, the signal SEL2 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, since SEL_L is at the low level and SEL_R is at the high level, the green pixel in the second row is selected. Then, the amplified potential is output to a corresponding one of the AD converters ADC11 to 14 and a corresponding one of the AD converters ADC21 to 24 (see FIG. 7).

Subsequently, between time t15 and time t16, the AD converters ADC11 to 14 and 21 to 24 perform AD conversion (see FIGS. 11 and 12). As described above, the AD converters ADC11 to 14 and 21 to 24 each perform AD conversion and output a difference between the green pixel in the first row and the green pixel in the second row as data.

(Auto-Zero by FD of Second Row)

Next, between time t16 and time t17, a state where the signal SEL2 is at the high level, SEL_L is at the low level, and SEL_R is at the high level is maintained. Therefore, the AZ units 40 and 42 of the AD converters ADC11 to 14 and 21 to 24 perform auto-zero (AZ) to set the green pixels in the second row to the reference value (zero value). Thereafter, the AZ circuit stores this offset amount.

Subsequently, between time t16 and time t17, the AZ units 40 and 42 of the AD converters ADC11 to 14 and 21 to 24 perform auto-zero (AZ) to set the green pixels in the first row to the reference value (zero value). Thereafter, the AZ circuit stores this offset amount.

(FD Reset of Third Row)

At time t17, the signal RST3 and SEL_R go to the high level, and SEL_L goes to the low level. As a result, the reset transistor SW2 of each pixel in the third row turns on when the high-level reset signal RST3 is input to the gate of the reset transistor SW2 through the signal line Rst3 to reset the floating diffusion FD to the voltage of the constant voltage source VSS.

(FD Transfer of Third Row)

Next, at time t18, the signal RST3 goes to the low level to make the reset transistor SW2 non-connected. Then, the signal TRG3 goes to the high level. As a result, signal charges (here, photoelectrons) accumulated by photoelectric conversion of the photodiode PD of each green pixel in the third row are transferred to the floating diffusion FD.

(AD Conversion of Second and Third Rows)

Next, at time t19, the signal SEL2 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, since SEL_L is at the low level and SEL_R is at the high level, the green pixel in the third row is selected. Then, the amplified potential is output to a corresponding one of the AD converters ADC11 to 14 and a corresponding one of the AD converters ADC21 to 24 (see FIG. 8).

Subsequently, between time t19 and time t20, the AD converters ADC11 to 14 and 21 to 24 perform AD conversion (see FIGS. 11 and 12). As described above, the AD converters ADC11 to 14 and 21 to 24 each perform AD conversion and output a difference between the green pixel in the second row and the green pixel in the third row as data.

(Auto-Zero by FD of Third Row)

Next, between time t20 and time t21, a state where the signal SEL3 is at the high level, SEL_L is at the low level, and SEL_R is at the high level is maintained. Therefore, the AZ units 40 and 42 of the AD converters ADC11 to 14 and 21 to 24 perform auto-zero (AZ) to set the green pixels in the third row to the reference value (zero value). Thereafter, the AZ circuit stores this offset amount.

(FD Reset of Fourth Row)

As illustrated in FIG. 14, at time t21, the signal RST4 and SEL_R go to the high level, and SEL_L goes to the low level. As a result, the reset transistor SW2 of each pixel in the third row turns on when the high-level reset signal RST3 is input to the gate of the reset transistor SW2 through the signal line Rst3 to reset the floating diffusion FD to the voltage of the constant voltage source VSS.

(FD Transfer of Fourth Row)

Next, at time t22, the signal RST3 goes to the low level to make the reset transistor SW2 non-connected. Then, the signal TRG4 goes to the high level. As a result, signal charges (here, photoelectrons) accumulated by photoelectric conversion of the photodiode PD of each green pixel in the fourth row are transferred to the floating diffusion FD.

(AD Conversion of Third and Fourth Rows)

Next, at time t23, the signal SEL2 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, since SEL_L is at the low level and SEL_R is at the high level, the green pixel in the fourth row is selected. Then, the amplified potential is output to a corresponding one of the AD converters ADC11 to 14 and a corresponding one of the AD converters ADC21 to 24.

Subsequently, between time t23 and time t24, the AD converters ADC11 to 14 and 21 to 24 perform AD conversion (see FIGS. 11 and 12). As described above, the AD converters ADC11 to 14 and 21 to 24 each perform AD conversion and output a difference between the green pixel in the third row and the green pixel in the fourth row as data.

As described above, the difference AD conversion of each time can be performed without interruption. It is therefore possible to contribute to shortening of the waiting time for settling (settling time) after control.

Furthermore, since the procedure is similar to or less complicated than the procedure of the AD conversion for normal imaging, it is possible to achieve contour extraction at high speed and with low power consumption. Since the power required for contour extraction by digital processing, which is a method in the related art, is not required, a recognition image can be generated with low power consumption. Furthermore, since the information is used for recognition, a further reduction in AD conversion time can be expected by making the quantization step coarser than the quantization step for the image for viewing.

As illustrated in FIG. 15, the auto-zero by the FD of the seventh row ends at time t30.

(FD Reset of Eighth Row)

At time t30, the signal RST8 and SEL_R go to the high level, and SEL_L goes to the low level. As a result, the reset transistor SW2 of the pixel in the eighth row turns on when the high-level reset signal RST8 is input to the gate of the reset transistor SW2 through the signal line Rst8 to reset the floating diffusion FD to the voltage of the constant voltage source VSS.

(FD Transfer of Eighth Row)

Next, at time t31, the signal RST8 goes to the low level to make the reset transistor SW2 non-connected. Then, the signal TRG8 goes to the high level. As a result, signal charges (here, photoelectrons) accumulated by photoelectric conversion of the photodiode PD of each green pixel in the eighth row are transferred to the floating diffusion FD.

(AD Conversion of Seventh and Eighth Rows)

Next, at time t32, the signal SEL8 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, since SEL_L is at the low level and SEL_R is at the high level, the green pixel in the eighth row is selected. Then, the amplified potential is output to a corresponding one of the AD converters ADC11 to 14 and a corresponding one of the AD converters ADC21 to 24.

Subsequently, between time t32 and time t33, the AD converters ADC11 to 14 and 21 to 24 perform AD conversion (see FIGS. 11 and 12). As described above, the AD converters ADC11 to 14 and 21 to 24 each perform AD conversion and output a difference between the green pixel in the seventh row and the green pixel in the eighth row as data. Then, the signal SEL8 is set to the low level to bring the AD conversion to an end.

As described above, according to the present embodiment, the image sensor 2 includes the AD conversion unit 14 including the AD converter ADC11 and the AD converter ADC12, and the second AD conversion unit 18 including the AD converter ADC21, in which the AD converter ADC11 is connected to the vertical signal line VSL1 and the vertical signal line VSL2 via the selector SEL11, the AD converter ADC12 is connected to the vertical signal line VSL3 and the vertical signal line VSL4 via the selector SEL12, the AD converter ADC21 is connected to the second vertical signal line VSL2 and the 1 vertical signal line VSL3 via the selector SEL21, the selector SEL11 and the selector SEL12 are connected to the first selection drive line Sel_L, and the selector SEL21 is connected to the second selection drive line Sel_R. With this arrangement, when the selectors SEL11, 12, and 21 select the vertical signal lines VSL1, VSL3, and VSL3, respectively, and then select the vertical signal lines VSL2, VSL2, and VSL 4, respectively, the AD converter ADC11 and the AD converter ADC11 can calculate a difference between the green pixel in the first row and the green pixel in the second row located in the upper left diagonal of the green pixel in the first row, and the AD converter ADC21 can calculate a difference between the green pixel in the first row and the green pixel in the second row located in the upper right diagonal of the green pixel in the first row. On the other hand, in a case where the selectors SEL11, 12, and 21 select the vertical signal lines VSL1, VSL2, and VSL3, respectively, normal images can be captured. With such a configuration, the AD converters whose number is the same as the number of vertical signal lines VSL can capture the difference image and the normal image. Furthermore, arranging the AD conversion unit 14 and the second AD conversion unit 18 adjacent to the same end side of the pixel array unit 10, the wiring can be simplified as compared with a case where the AD conversion units are arranged at both ends.

Second Embodiment

An electronic apparatus according to a second embodiment is different from the electronic apparatus according to the first embodiment in that a difference value between red pixels and a difference value between blue pixels can be calculated. Hereinafter, a difference from the electronic apparatus according to the first embodiment will be described.

Figure 16:
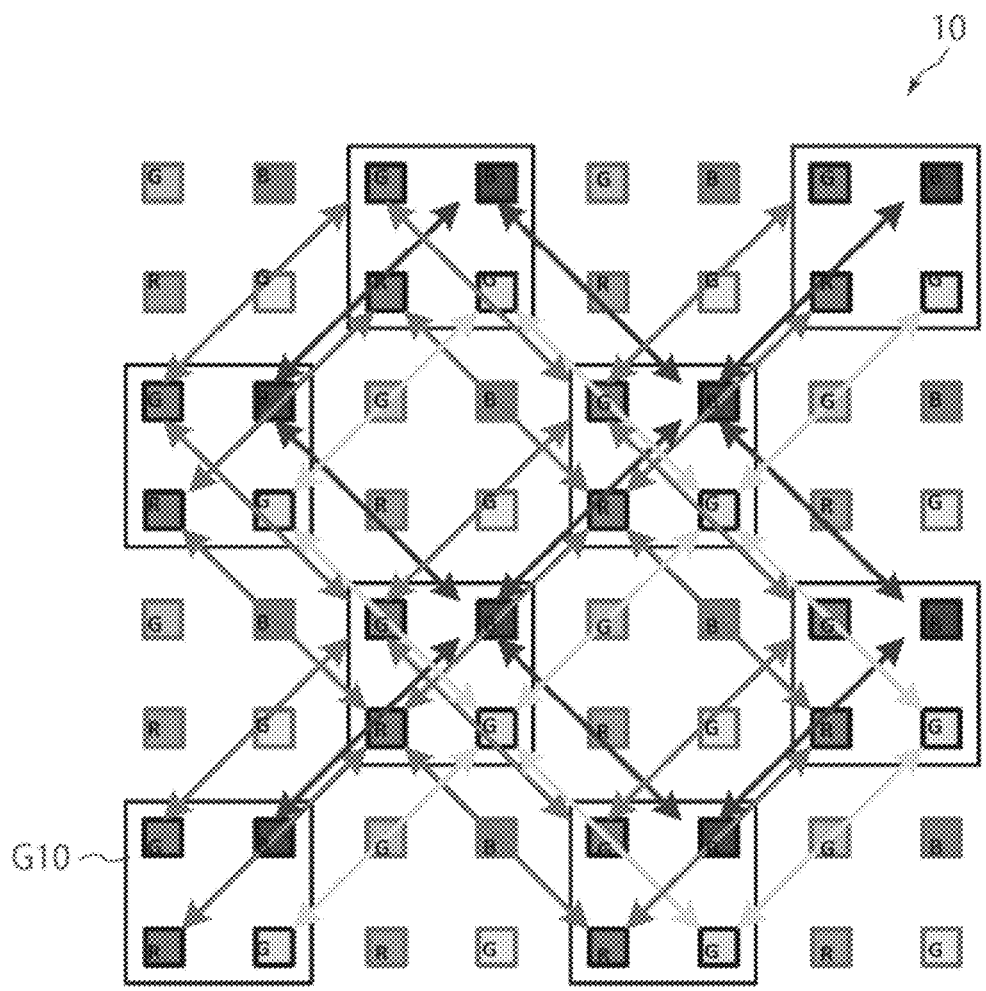
FIG. 16 is a diagram illustrating a difference processing example performed on a pixel array unit according to a second embodiment.

FIG. 16 is a diagram illustrating a difference processing example performed on the pixel array unit 10 according to the second embodiment. As illustrated in FIG. 14, in difference processing according to the present embodiment, the difference processing can be performed between the base pixel groups G10 of the Bayer array. For example, the difference processing is performed on pixels of the same color between the base pixel group G10 including 2×2 pixels in first and second rows and the base pixel group G10 in the third and fourth rows located in the upper left diagonal of the base pixel group G10 in first and second rows.

Figure 17:
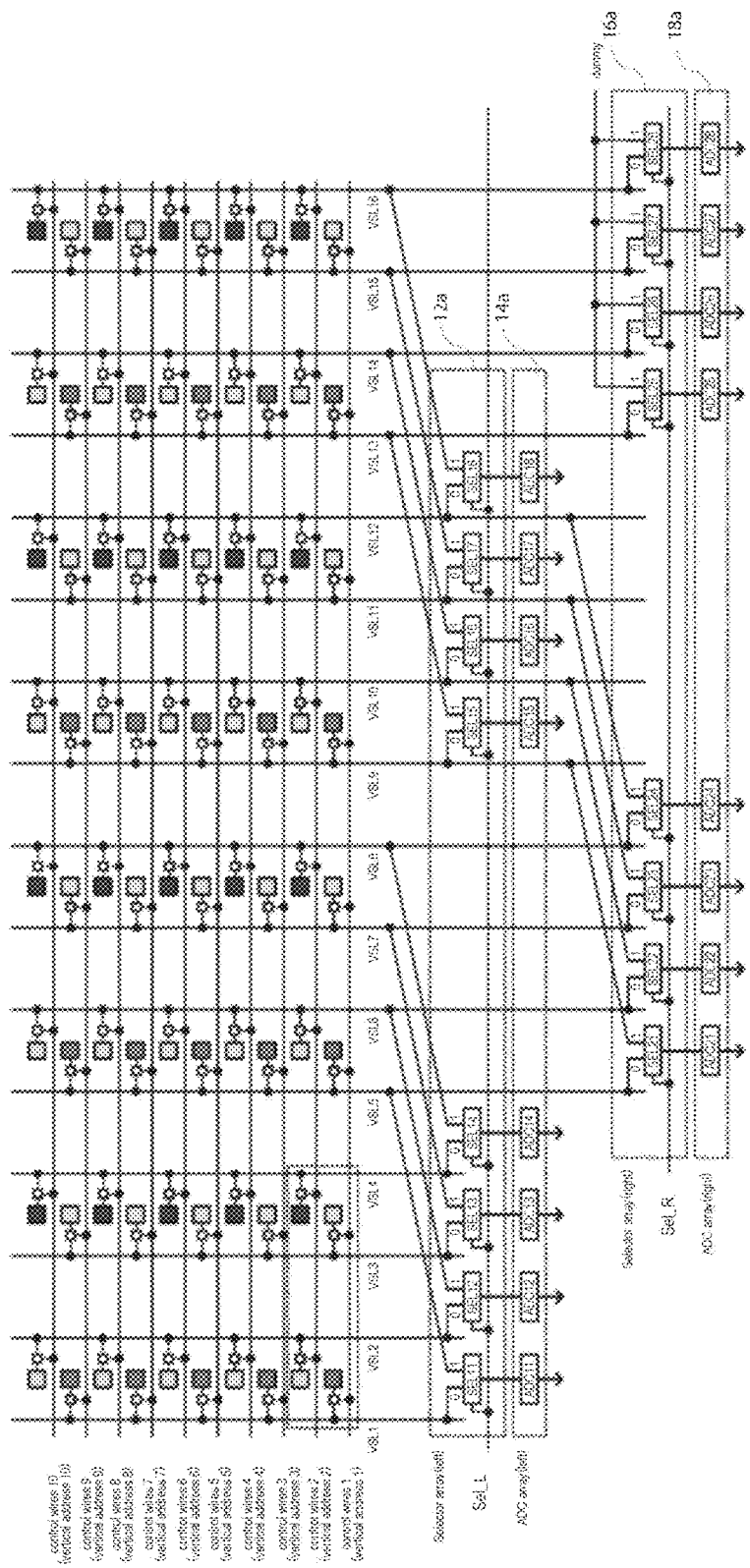
FIG. 17 is a diagram illustrating an example of a circuit of the pixel array unit according to the second embodiment.

FIG. 17 is a diagram illustrating an example of a circuit including a pixel array unit 10, a first selection unit 12a, a first AD conversion unit 14a, a second selection unit 16a, and a second AD conversion unit 18a according to the second embodiment. Note that the description will be given on the assumption that the number of pixels is 8×8 or 10×8 for the sake of simplicity, but the number is not limited to either 8×8 or 10×8.

As illustrated in FIG. 17, in the pixel array unit 10 according to the second embodiment, two vertical signal lines VSL are wired for each column of pixels. Therefore, the read speed is twice as high as in a case where one vertical signal line VSL is provided for each column of pixels.

The first selection unit 12a includes selection units SEL11 to 18. The first selection unit 12a selects one of a pair of two signal lines of (((n−1)×8+m), ((n−1)×8+m+4)) (n is 1 to M/4, and m is 1 to 4) among the plurality of vertical signals (VSL) of the pixel array unit 10, and outputs a signal of the selected signal line to the first AD conversion unit 14a. Here, the number of the plurality of vertical signals (VSL) of the pixel array unit 10 is, for example, 1 to M (for example, M is a multiple of 8).

In a case where the difference image is generated, the first selection unit 12a selects the ((n−1)×8+m)-th vertical signal line VSL in a case where the selector control signal (left) (SEL_L) is the "0" selection signal. Furthermore, the ((n−1)×8+m+4)-th vertical signal line VSL is selected in a case where the selector control signal (left) (SEL_L) is the "1" selection signal. As described above, in a case where the difference image is generated, the first selection unit 12a alternately selects one of the signals of vertical signals (VSL) spaced away from each other by three vertical signal lines.

The first AD conversion unit 14a includes AD converters ADC11 to 18. The AD converters ADC11 to 18 are each connected to a corresponding one of the selection units SEL11 to 18.

The second selection unit 16a includes selection units SEL21 to 28. The first selection unit 12a selects one of a pair of two signal lines of (((n−1)×8+m+4), (n×8+m)) (n is 1 to M/4, and m is 1 to 4) among the plurality of vertical signals (VSL) of the pixel array unit 10, and outputs a signal of the selected signal line to the second AD conversion unit 18a. Here, the number of the plurality of vertical signals (VSL) of the pixel array unit 10 is, for example, 1 to M (for example, M is a multiple of 8).

In a case where the difference image is generated, the second selection unit 16a selects the ((n−1)×8+m+4)-th vertical signal line VSL in a case where the selector control signal (right) (SEL_R) is the "0" selection signal. Furthermore, the (n×8+m)-th vertical signal line VSL is selected in a case where the selector control signal (right) (SEL_R) is the "1" selection signal. As described above, in a case where the difference image is generated, the first selection unit 16a alternately selects one of the signals of the vertical signals (VSL) spaced apart from each other by three vertical signal lines.

The second AD conversion unit 18a includes AD converters ADC21 to 28. The AD converters ADC21 to 28 are each connected to a corresponding one of the selection units SEL21 to 28.

As described above, the AD converters ADC11 to 18 of the first AD conversion unit 14a and the AD converters ADC21 to 28 of the second AD conversion unit 18a also serve as the AD converter ADC provided for each vertical signal line VSL, so that the number of the AD converters ADC is twice the number of the AD converters ADC according to the first embodiment.

Furthermore, in order to obtain a difference for each Bayer array, the first selection unit 12a and the second selection unit 16a have a structure by which vertical signal lines VSL spaced apart from each other by one base pixel group G10, that is, vertical signal lines VSL spaced apart from each other by three vertical signal lines, are connected to pixels. As described above, in a manner similar to the electronic apparatus 100 of the first embodiment, the circuit structure is divided into two groups: the first selection unit 12a and the first AD conversion unit 14a, and the second selection unit 16a and the second AD conversion unit 18a.

First, in the operation of performing the difference AD conversion, the image control unit 8 selects the control lines 1 and 2 (control wires 1, 2) and does not select the control lines 3 to 10 (control wires 3 to 10). As a result, the pixels in the first row and the second row are connected to the vertical signal lines VSL.

Next, the image control unit 8 sets SEL_L=0 and SEL_R=1. As a result, the data of the pixels connected to VSL1, VSL2, VSL3, and VSL4 is sequentially input to the AD converters ADC11, 12, 13, and 14. Similarly, the data of the pixels connected to VSL9, VSL10, VSL11, and VSL12 is sequentially input to the AD converters ADC21, 22, 23, and 24. Furthermore, the data is also sequentially input to the AD converters ADC15, 16, 17, and 18. Here, the AD converters ADC11 to 18 and 21 to 24 are each subjected to auto-zero (AZ), so that the level of the signal voltage output from the corresponding pixel is set to the reference value of each ADC, that is, the value of 0.

Next, the image control unit 8 selects the control lines 3 and 4 and does not select the control lines 1, 2, and 5 to 10. As a result, only the data of the pixels in the rows of the control lines 3 and 4 is connected to the corresponding vertical signal lines (VSL).

Next, when SEL_L=1 and SEL_R=0, the image control unit 8 sequentially inputs the data of the pixels connected to VSL5, VSL6, VSL7, and VSL8 to the AD converters ADC11, 12, 13, and 14. Furthermore, the data of the pixels connected to VSL5, VSL6, VSL7, and VSL8 is sequentially input to the AD converters ADC21, 22, 23, and 24, and the data of the pixels connected to VSL13, VSL14, VSL15, and VSL16 is sequentially input to ADC15, ADC16, ADC17, and ADC18.

Next, in this state, the AD converters ADC11 to 18 and 21 to 24 perform AD conversion, so that ADC11, ADC12, ADC13, and ADC14 can acquire a difference between pixels of the same color of a 2×2 pixel unit and another 2×2 pixel unit located in the upper right diagonal of the 2×2 pixel unit, ADC21, ADC22, ADC23, and ADC24 can acquire a difference between pixels of the same color of a 2×2 pixel unit and another 2×2 pixel unit located in the upper right diagonal of the 2×2 pixel unit, and ADC15, ADC16, ADC17, and ADC18 can acquire a difference between pixels of the same color of a 2×2 pixel unit and another 2×2 pixel unit located in the upper right diagonal of the 2×2 pixel unit. This series of operations is applied to all the pixels and ADCs, and when the series of operations is repeated, the same color difference image based on the 2×2 pixel units of the entire frame can be obtained. Note that since ADC25, ADC26, ADC27, and ADC28 are located at the right end, ADC25, ADC26, ADC27, and ADC28 cannot obtain a difference from the right VSL, and thus can perform processing such as discarding AD-converted data.

Figure 18:
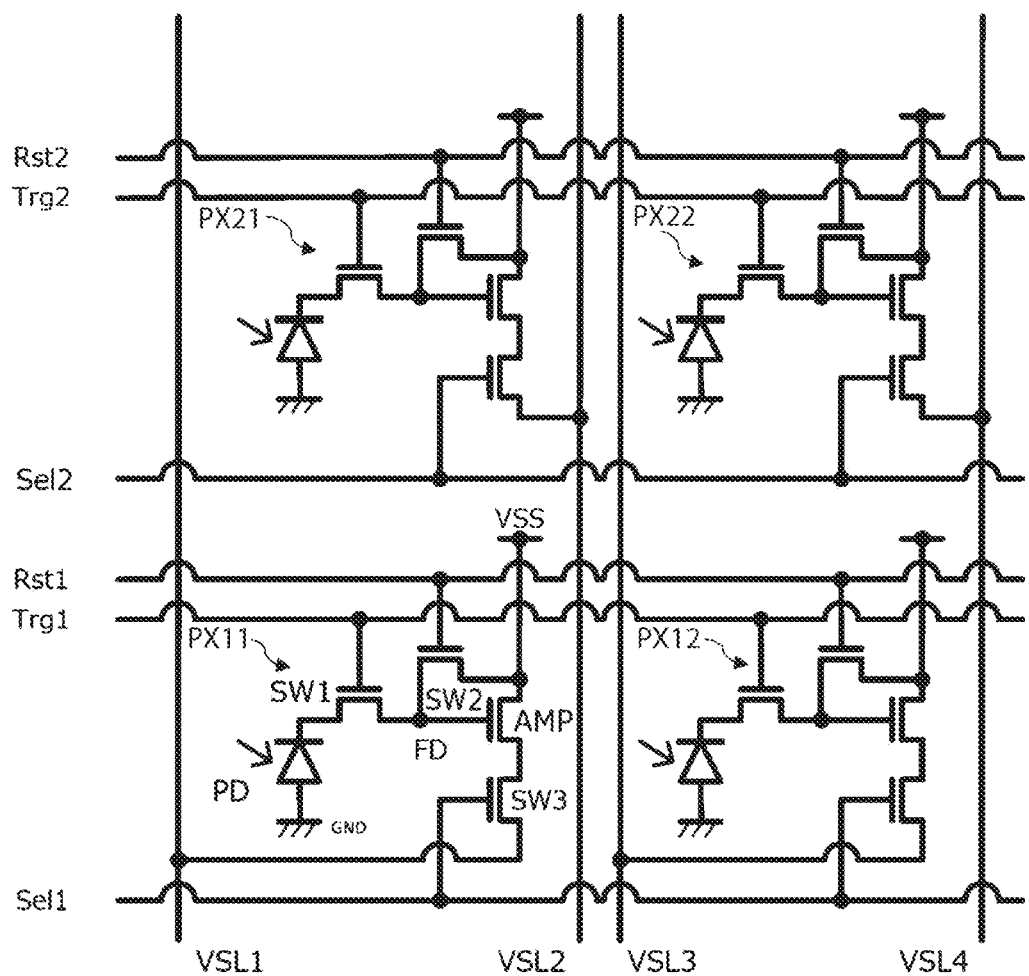
FIG. 18 is a diagram illustrating a circuit configuration example of a pixel base unit according to the second embodiment.

FIG. 18 is a diagram illustrating a circuit configuration example of the pixel base unit G10 according to the second embodiment. As illustrated in FIG. 18, A pixel PX11 includes a photodiode PD, a transfer transistor SW1, a reset transistor SW2, an amplification transistor AMP, a selection transistor SW3, and a roating diffusion FD. The pixel base unit G10 according to the second embodiment is different from the pixel base unit G10 according to the first embodiment in that the pixels vertically arranged in the same column are connected to different vertical signal lines VSL. That is, the selection transistor SW3 of the pixel PX11 and the selection transistor SW3 of the pixel PX21 have their sources connected to different vertical signal lines VSL1 and VSL2, respectively. Similarly, the selection transistor SW3 of the pixel PX12 and the selection transistor SW3 of the pixel PX22 have their sources connected to different vertical signal lines VSL3 and VSL4, respectively. Since the number of vertical signals VSL is twice the number of vertical signals VSL of the pixel base unit G10 according to the first embodiment, it is possible to perform AD conversion simultaneously on two rows that do not conflict with each other. The subsequent operation and the like are similar to the pixel base unit G10 according to the first embodiment, so that no description will be given below of the subsequent operation and the like.

Figure 19:
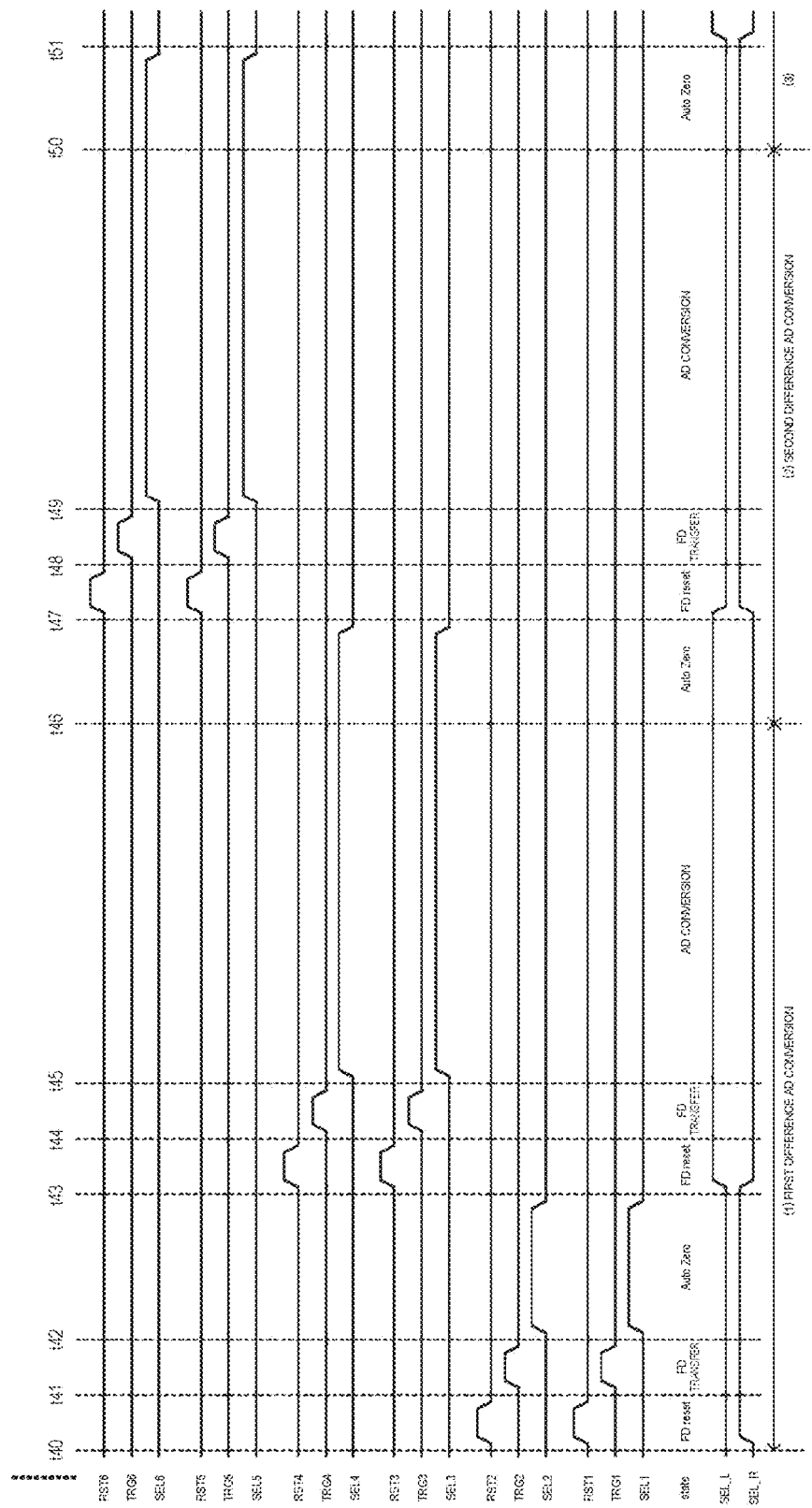
FIG. 19 is a time chart illustrating the difference processing example from time t40 to time t51.
Figure 20:
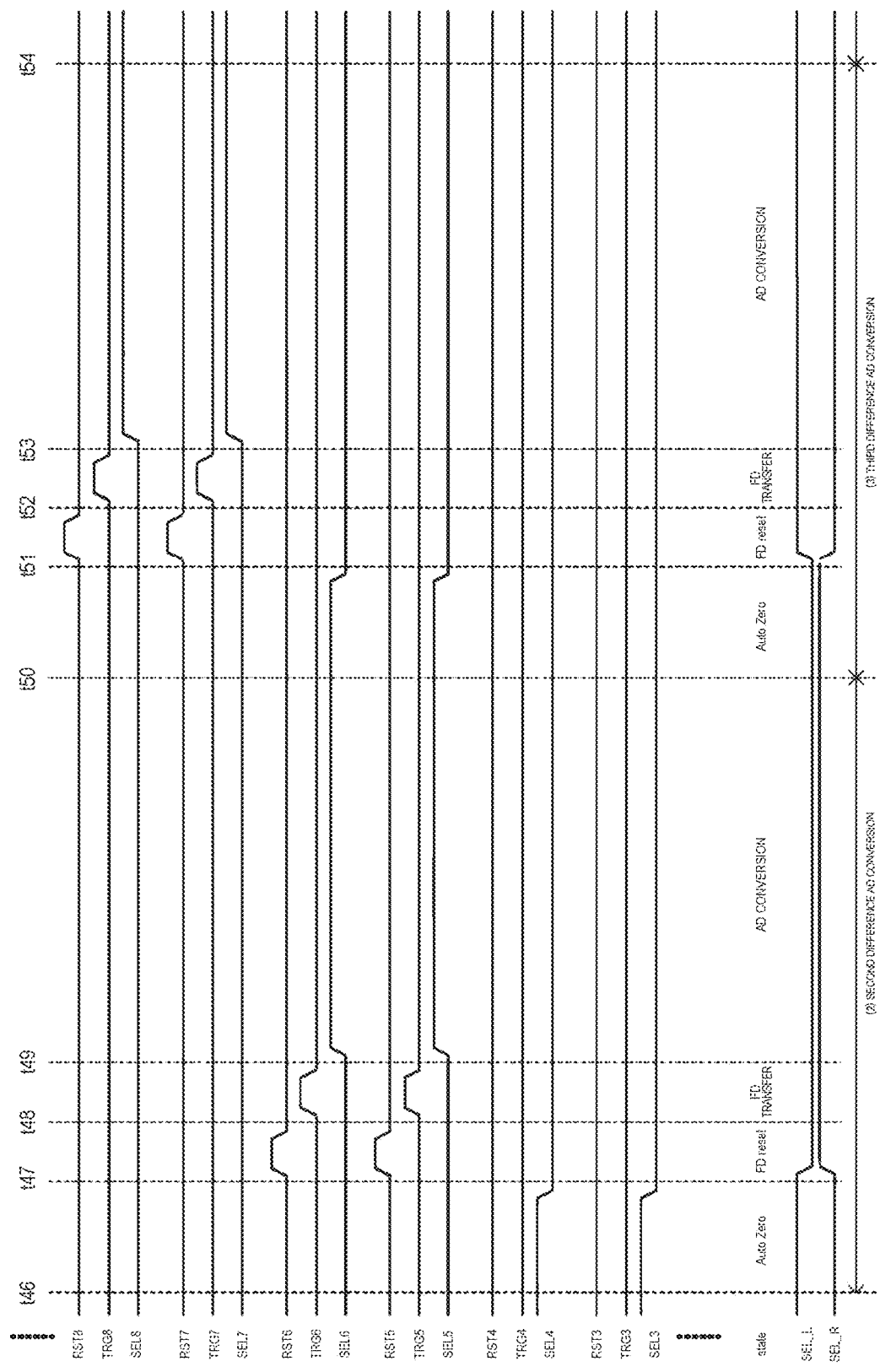
FIG. 20 is a time chart including the difference processing example from time t51 to time t44.
Figure 21:
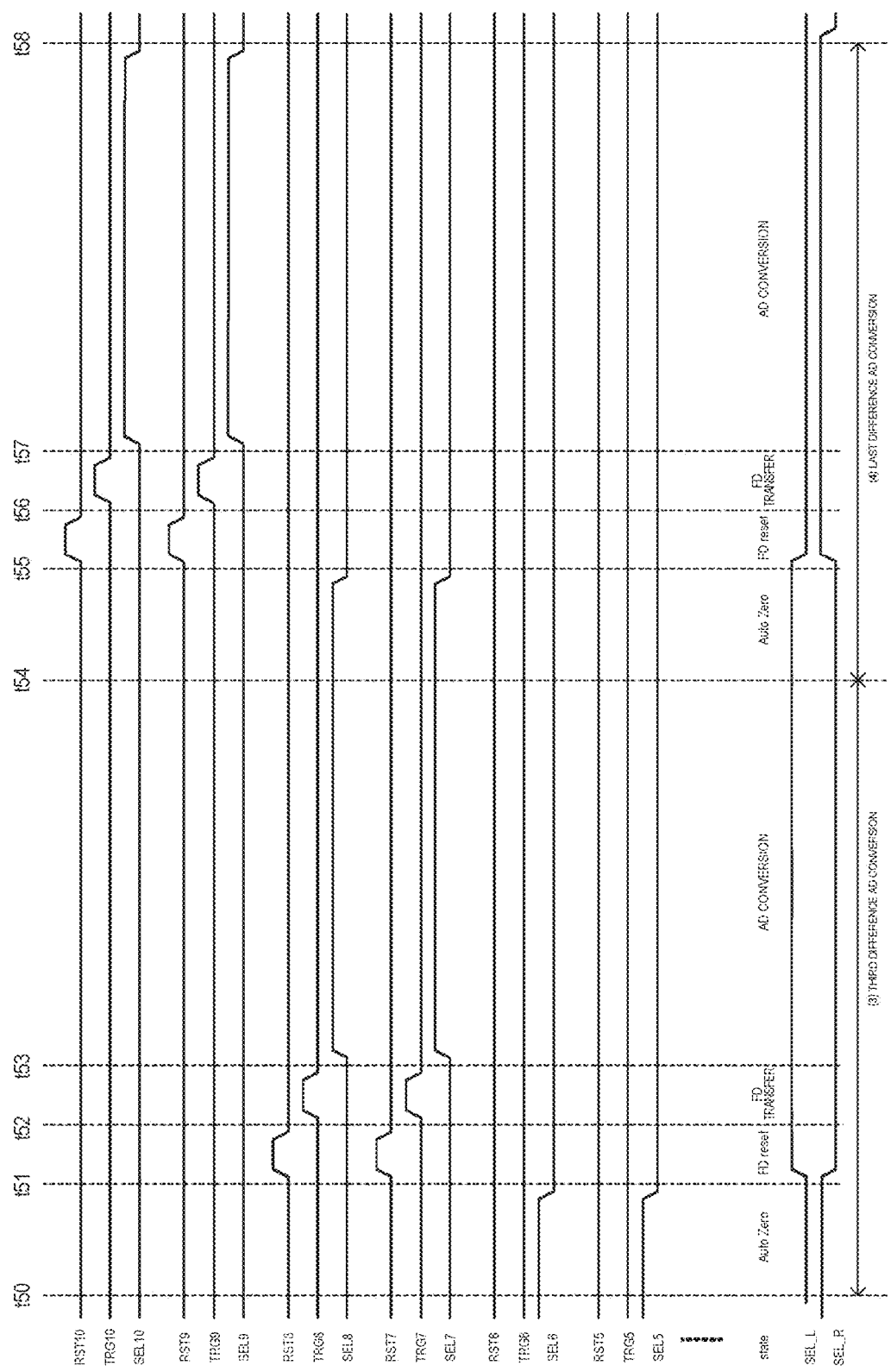
FIG. 21 is a time chart including the difference processing example performed on the last row.

Here, the difference processing example performed by the image sensor 2 according to the second embodiment will be described in detail with reference to FIGS. 19 to 21. FIG. 19 is a time chart illustrating the difference processing example processing from time t40 to time t51, FIG. 20 is a time chart including the difference processing example from time t51 to time t44, and FIG. 21 is a time chart including the difference processing example performed on the last row. The vertical axis indicates signals RST10, TRG10, SEL10 to RST1, TRG1, SEL1, an AD converter state State, signals SEL_L, and SEL_R from the top, and the horizontal axis indicates time. The difference processing example is different from the difference processing example performed by the image sensor 2 according to the first embodiment in that the control is performed simultaneously on two rows and that a difference between pixels of the same colors of the 2×2 pixel units is output.

As illustrated in FIG. 19, first, at time t40, the signals RST1 and 2, and SEL_R go to the high level. As a result, the reset transistor SW2 of each pixel in the first and second rows turns on when the high-level reset signal RST1 is input to the gate of the reset transistor SW2 through the signal line Rst1 to reset the floating diffusion FD to the voltage of the constant voltage source VSS.

Next, at time t41, the signals RST1 and 2 go to the low level to make the set transistor SW2 non-connected. Then, the signals TRG1 and 2 go to the high level. As a result, signal charges (here, photoelectrons) accumulated by photoelectric conversion of the photodiode PD of each pixel in the first and second rows are transferred to the floating diffusion FD.

Next, at time t42, the signal SEL1 and 2 go to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level. As a result, the AD converters ADC11 to 14 are electrically connected to the vertical signal line VSL1 to 4, and the AD converters ADC15 to ADC18 are electrically connected to the vertical signal line VSL9 to 12, and the data of each pixel is input to the corresponding AD converter accordingly.

Furthermore, since SEL_R is 1 (High), the AD converters ADC21 to 24 are electrically connected to the vertical signal line VSL9 to 12, and the AD converters ADC25 to ADC28 are electrically connected to dummy, and the data of each pixel is input to the corresponding AD converter accordingly. Since the AD converters ADC25 to ADC28 are located at the right end and there is no right vertical signal line VSL, the AD converters ADC25 to ADC28 are not used in the second example. Note that instead of the use of the dummy signal, an implementation without the selection units SEL25 to SEL28 may be employed.

Subsequently, between time t42 and time t44, the AZ units 40 and 42 of the AD converters ADC11 to 18 and 25 to 25 perform auto-zero (AZ) for setting to the reference value (zero value). Thereafter, the AZ circuit stores this offset amount.

At time t43, the signals RST3 and 4, and SEL_L go to the high level, and SEL_R goes to the low level. As a result, the reset transistor SW2 of each pixel in the third and fourth rows turns on when the high-level reset signal RST2 is input to the gate of the reset transistor SW2 through the signal lines Rst3 and 4 to reset the floating diffusion FD to the voltage of the constant voltage source VSS.

Next, at time t44, the signals RST3 and 4 go to the low level to make the set transistor SW2 non-connected. Then, the signals TRG3 and 4 go to the high level. As a result, signal charges (here, photoelectrons) accumulated by photoelectric conversion of the photodiode PD of each pixel in the third and fourth rows are transferred to the floating diffusion FD.

Next, at time t45, the signals SEL3 and 4 go to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the high level, and SEL_R is at the low level. As a result, the AD converters ADC11 to 14 are electrically connected to VSL5 to VSL8, the AD converters ADC15 to ADC18 are electrically connected to VSL13 to VSL16, and the data of each pixel is input to the corresponding AD converter accordingly. Furthermore, the AD converters ADC21 to 24 are electrically connected to VSL5 to VSL8, the AD converters ADC25 to ADC28 are electrically connected to VSL13 to VSL16, and the data of each pixel is input to the corresponding AD converter accordingly. At this time, each AD converter ADC performs AD conversion to output, as data, a difference between the pixels of the same color in the first and second rows and the third and fourth rows.

Next, between time t46 and time t47, a state where the signals SEL3 and 4 are at the high level, SEL_L is at the low level, and SEL_R is at the high level is maintained. As a result, the AD converters ADC11 to 14 are electrically connected to VSL5 to VSL8, the AD converters ADC15 to ADC18 are electrically connected to VSL13 to VSL16, and the data of each pixel is input to the corresponding AD converter accordingly. Furthermore, the AD converters ADC21 to 24 are electrically connected to VSL5 to VSL8, the AD converters ADC25 to ADC28 are electrically connected to VSL13 to VSL16, and the data of each pixel is input to the corresponding AD converter accordingly. Then, the AZ units 40 and 42 of the AD converters ADC11 to 18 and 21 to 28 perform auto-zero (AZ) for setting to a new reference value (zero value). Thereafter, the AZ circuit stores this offset amount.

At time t47, the signals RST5 and 6, and SEL_R go to the high level, and SEL_L goes to the low level. As a result, the reset transistor SW2 of each pixel in the fifth and sixth rows turns on when the high-level reset signal RST3 is input to the gate of the reset transistor SW2 through the signal line Rst3 to reset the floating diffusion FD to the voltage of the constant voltage source VSS.

Next, at time t48, the signals RST5 and 6 go to the low level to make the reset transistor SW2 non-connected. Then, the signals TRG5 and 6 go to the high level. As a result, signal charges (here, photoelectrons) accumulated by photoelectric conversion of the photodiode PD of each green pixel in the fifth and sixth rows are transferred to the floating diffusion FD.

Next, at time t49, the signals SEL5 and 6 go to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level. As a result, the AD converters ADC11 to ADC14 are electrically connected to the vertical signal lines VSL1 to 4, the AD converters ADC15 to ADC18 are electrically connected to the vertical signal line VSL9 to 12, and the data of each pixel is input to the corresponding AD converter accordingly. Furthermore, the AD conversions ADC21 to 24 are connected to VSL9 to 12, the AD conversions ADC25 to 28 are connected to the dummy, and the data of each pixel is input to the corresponding ADC accordingly. At this time, AD conversion is performed to output, as data, a difference between the pixels of the same color of 2×2 pixel units in the third and fourth rows and the fifth and sixth rows.

Next, between time t50 and time t51, a state where the signals SEL5 and 6 are at the high level, SEL_L is at the low level, and SEL_R is at the high level is maintained. Therefore, the AZ units 40 and 42 of the AD converters ADC11 to 18 and 21 to 28 perform auto-zero (AZ) for setting to a new reference value (zero value).

As illustrated in FIG. 20, at time t51, the signals RST7 and 8 and SEL_L go to the high level, and SEL_R goes to the low level. As a result, the reset transistor SW2 of each pixel in the seventh and eight rows turns on when the high-level reset signal RST3 is input to the gate of the reset transistor SW2 through the signal line Rst3 to reset the floating diffusion FD to the voltage of the constant voltage source VSS.

Next, at time t52, the signals RST7 and 8 go to the low level to make the reset transistor SW2 non-connected. Then, the signals TRG7 and 8 go to the high level. As a result, signal charges (here, photoelectrons) accumulated by photoelectric conversion of the photodiode PD of each green pixel in the seventh and eight rows are transferred to the floating diffusion FD.

Next, at time t53, the signals SEL7 and 8 go to the high level. As a result, the potential of each FD in the seventh and eighth rows is amplified by the AMP and is output to the vertical signal line VSL. By this time, SEL_L is set to the high level, and SEL_R is set to the low level. As a result, the AD converters ADC11 to 14 are electrically connected to the vertical signal line VSL5 to VSL8, the AD converters ADC15 to ADC18 are electrically connected to the vertical signal line VSL13 to VSL16, and the data of each pixel is input to the corresponding AD converter accordingly. Furthermore, the AD converters ADC21 to 24 are electrically connected to the vertical signal line VSL5 to 8, the AD converters ADC25 to ADC28 are electrically connected to the vertical signal line VSL13 to VSL16, and the data of each pixel is input to the corresponding AD converter accordingly. Then, at this time, each AD converter performs AD conversion to output a difference between the pixels of the same color of the 2×2 pixel units in the fifth and sixth rows and the seventh and eighth rows. The selection signals SEL_L and SEL_R are controlled to be inverted each time. Furthermore, in a case where the number of pixels in the vertical direction of the pixel array unit 10 is increased, such difference AD conversion control is repeated.

As illustrated in FIG. 21, between time t54 and time t55, a state where the signals SEL7 and 8 are at the high level, SEL_L is at the low level, and SEL_R is at the high level is maintained. Therefore, the AZ units 40 and 42 of the AD converters ADC11 to 18 and 21 to 28 perform auto-zero (AZ) for setting to a new reference value (zero value).

Next, at time t56, the signals RST9 and 10, and SEL_R go to the high level, and SEL_L goes to the low level. As a result, the reset transistor SW2 of each pixel in the ninth and tenth rows turns on when the high-level reset signal RST3 is input to the gate of the reset transistor SW2 through the signal line Rst3 to reset the floating diffusion FD to the voltage of the constant voltage source VSS.

Next, at time t56, the signals RST9 and 10 go to the low level to make the reset transistor SW2 non-connected. Then, the signals TRG9 and 10 go to the high level. As a result, signal charges (here, photoelectrons) accumulated by photoelectric conversion of the photodiode PD of each pixel in the ninth and tenth rows are transferred to the floating diffusion FD.

Next, at time t57, the signals SEL9 and 10 go to the high level. As a result, the potential of each FD in the ninth and tenth rows are amplified by the AMP in accordance with the signals SEL9 and 10 and is output to the vertical signal line VSL. By this time, SEL_L and SEL_R are inverted, and difference data is acquired in a manner similar to the above. Since it is the last row, there is no next difference AD conversion, and the SE signals SEL9 and 10 are therefore set to the low level to bring the AD conversion to an end.

As described above, according to the present embodiment, the first selection unit 12a selects the ((n−1)×8+m)-th vertical signal line VSL in a case where the selector control signal (left) (SEL_L) is the "0" selection signal. Furthermore, the ((n−1)×8+m+4)-th vertical signal line VSL is selected in a case where the selector control signal (left) (SEL_L) is the "1" selection signal. The second selection unit 16a and the second selection unit 16a select the ((n−1)×8+m)-th vertical signal line VSL in a case where the selector control signal (right) (SEL_R) is the "0" selection signal. Furthermore, the ((n−1)×8+m+4)-th vertical signal line VSL is selected in a case where the selector control signal (right) (SEL_R) is the "1" selection signal. As a result, it is possible to calculate, by electrically connecting, in a sequential manner, the pixels in two rows of the pixel array unit 10 to the corresponding vertical signal lines VSL and performing control to make the values of SEL_L and SEL_R alternately different from each other, a difference between each pixel in the base unit G10 and the corresponding pixel in another base unit G10 located in the upper left diagonal or upper right diagonal of the base unit G10.

Third Embodiment

An electronic apparatus according to a third embodiment is different from the electronic apparatus according to the first embodiment in that a difference value between red pixels and a difference value between blue pixels can be calculated by sequentially reading odd-numbered rows or even-numbered rows. Hereinafter, a difference from the electronic apparatus according to the first embodiment will be described.

Figure 22:
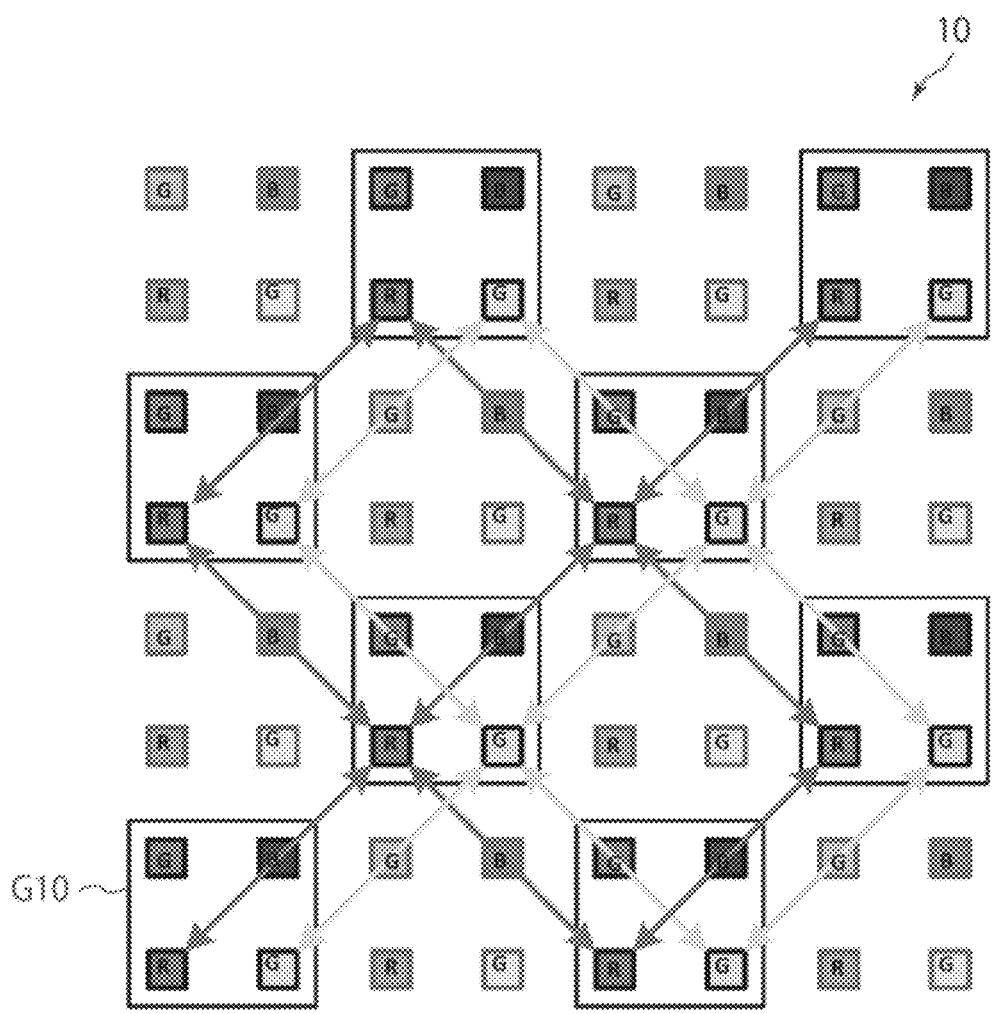
FIG. 22 is a diagram illustrating a difference processing example performed on odd-numbered rows of a pixel array unit according to a third embodiment.

FIG. 22 is a diagram illustrating a difference processing example performed on the odd-numbered rows of the pixel array unit 10 according to the third embodiment. As illustrated in FIG. 22, in difference processing according to the present embodiment, the difference processing can be performed between the base pixel groups G10 of the Bayer array. For example, the difference processing is performed on pixels of the same color between the base pixel group G10 including 2×2 pixels in first and second rows and the base pixel group G10 in the third and fourth rows located in the upper left diagonal of the base pixel group G10 in first and second rows. In this case, it is possible to perform the difference processing between red pixels and green pixels in odd-numbered rows.

Figure 23:
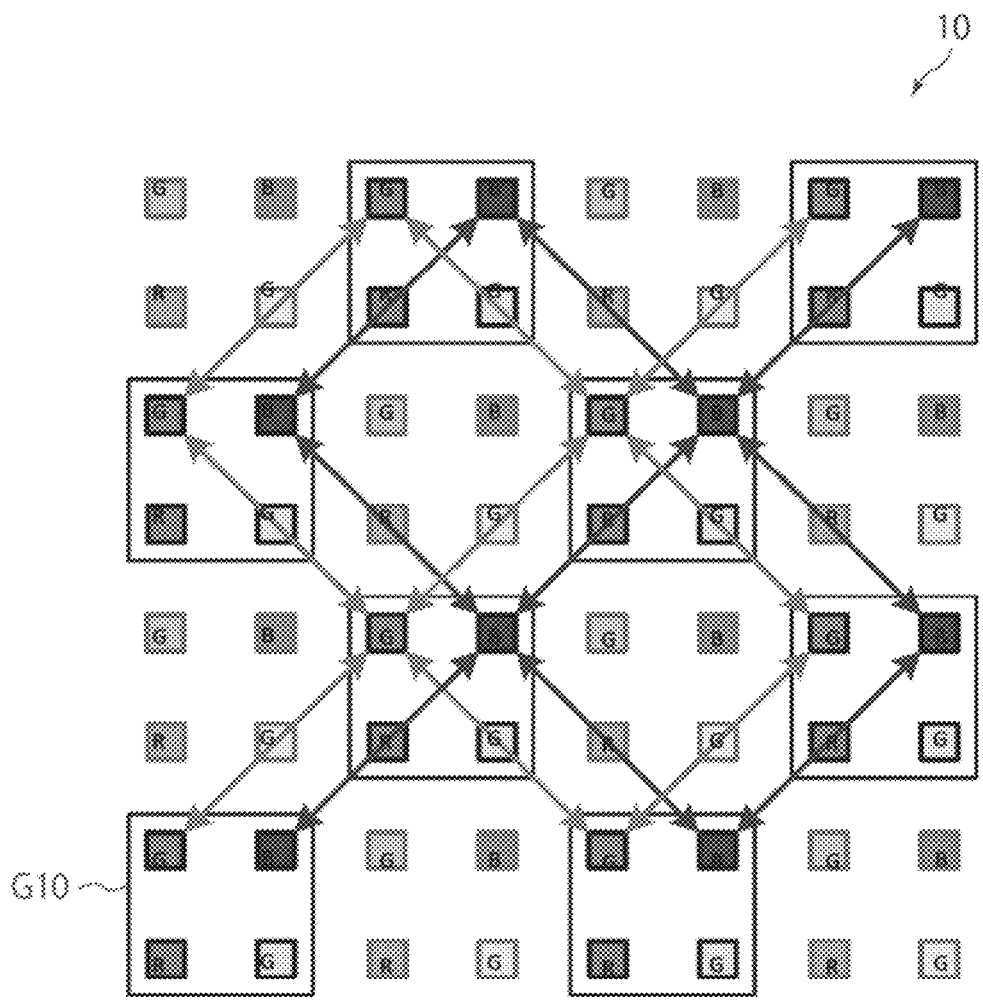
FIG. 23 is a diagram illustrating the difference processing example performed on even-numbered rows of the pixel array unit.

FIG. 23 is a diagram illustrating the difference processing example performed on the even-numbered rows of the pixel array unit 10 according to the third embodiment. As illustrated in FIG. 23, in difference processing according to the present embodiment, the difference processing can be performed between the base pixel groups G10 of the Bayer array. For example, the difference processing is performed on pixels of the same color between the base pixel group G10 including 2×2 pixels in first and second rows and the base pixel group G10 in the third and fourth rows located in the upper left diagonal of the base pixel group G10 in first and second rows. In this case, it is possible to perform the difference processing between green pixels and blue pixels in even-numbered rows.

Figure 24:
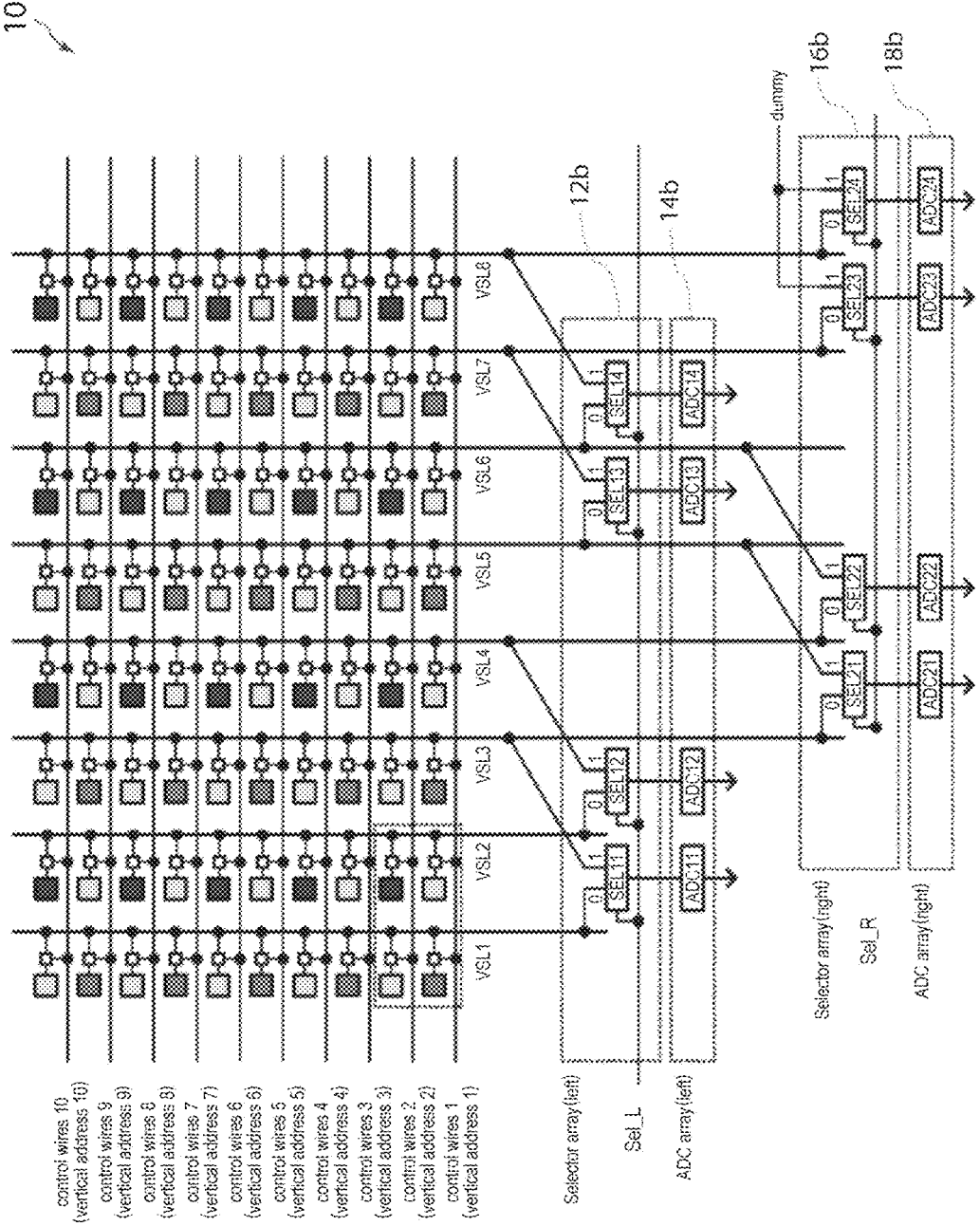
FIG. 24 is a diagram illustrating an example of a circuit of the pixel array unit according to the third embodiment.

FIG. 24 is a diagram illustrating an example of a circuit including a pixel array unit 10, a first selection unit 12b, a first AD conversion unit 14b, a second selection unit 16b, and a second AD conversion unit 18b according to the third embodiment. Note that the description will be given on the assumption that the number of pixels is 8×8 or 10×8 for the sake of simplicity, but the number is not limited to either 8×8 or 10×8.

As illustrated in FIG. 24, the first selection unit 12b includes selection units SEL11 to 14. The first selection unit 12b selects one of a pair of two signal lines, the (((n−1)× 4+m)-th signal line and the ((n−1)×4+m+2))-th signal line (n is 1 to M/4, and m is 1 to 2), among the plurality of vertical signals (VSL) of the pixel array unit 10, and outputs a signal of the selected signal line to the first AD conversion unit 14b. Here, the number of the plurality of vertical signals (VSL) of the pixel array unit 10 is, for example, 1 to M (for example, M is a multiple of 4).

In a case where the difference image is generated, the first selection unit 12b selects the ((n−1)×4+m)-th vertical signal line VSL in a case where the selector control signal (left) (SEL_L) is the "0" selection signal. Furthermore, the ((n−1)×4+m+2)-th vertical signal line VSL is selected in a case where the selector control signal (left) (SEL_L) is the "1" selection signal. As described above, in a case where the difference image is generated, the first selection unit 12b alternately selects one of the signals of vertical signals (VSL) spaced apart from each other by one vertical signal line.

The first AD conversion unit 14b includes AD converters ADC11 to 14. The AD converters ADC11 to 14 are each connected to a corresponding one of the selection units SEL11 to 14.

The second selection unit 16b includes selection units SEL21 to 24. The first selection unit 12b selects one of a pair of two signal lines, the (((n−1)×4+m+2)-th signal line and the (n×4+m))-th signal line (n is 1 to M/4, and m is 1 to 2), among the plurality of vertical signals (VSL) of the pixel array unit 10, and outputs a signal of the selected signal line to the second AD conversion unit 18b.

In a case where the difference image is generated, the second selection unit 16b selects the ((n−1)×4+m+2)-th vertical signal line VSL in a case where the selector control signal (right) (SEL_R) is the "0" selection signal. Furthermore, the ((n−1)×4+m+4)-th vertical signal line VSL is selected in a case where the selector control signal (right) (SEL_R) is the "1" selection signal. As described above, in a case where the difference image is generated, the first selection unit 16b alternately selects one of the signals of vertical signals (VSL) spaced apart from each other by one vertical signal line.

The second AD conversion unit 18b includes AD converters ADC21 to 24. The AD converters ADC21 to 24 are each connected to a corresponding one of the selection units SEL21 to 24. As described above, in a manner similar to the electronic apparatus 100 of the first embodiment, the circuit structure is divided into two groups: the first selection unit 12b and the first AD conversion unit 14b, and the second selection unit 16b and the second AD conversion unit 18b.

First, in the operation of performing the difference AD conversion on odd-numbered rows, the image control unit 8 selects the control line 1 (control wires 1) and does not select the control lines 2 to 10 (control wires 2 to 10). As a result, the pixels in the first row are connected to the vertical signal lines VSL.

Next, the image control unit 8 sets SEL_L=0 and SEL_R=1. As a result, the data of the pixels electrically connected to VSL1 and VSL2 is sequentially input to the AD converters ADC11 and 12. Similarly, the data of the pixels electrically connected to VSL5 and VSL6 is sequentially input to the AD converters ADC21 and 22. Furthermore, the data is also sequentially input to the AD converters ADC13 and 14. Here, the AD converters ADC11 to 18 and 21 to 24 are each subjected to auto-zero (AZ), so that the level of the signal voltage output from the corresponding pixel is set to the reference value of each ADC, that is, the value of 0.

Next, the image control unit 8 selects the control line 3 and does not select the control lines 1, 2, and 4 to 10. As a result, only the data of the pixels in the row of the control line 3 is connected to the corresponding vertical signal lines (VSL).

Next, when SEL_L=1 and SEL_R=0, the image control unit 8 sequentially inputs the data of the pixels electrically connected to VSL3 and VSL4 to the AD converters ADC11 and 12. Furthermore, the data of the pixels electrically connected to VSL3 and VSL4 is sequentially input to the AD converters ADC21 and 22, and the data of the pixels electrically connected to VSL7 and VSL8 is sequentially input to ADC13 and ADC14.

Next, in this state, the AD converters ADC11 to 14 and 21 to 24 perform AD conversion, so that ADC11 and ADC12 can acquire a difference between pixels of the same color of a 2×2 pixel unit and another 2×2 pixel unit located in the upper right diagonal of the 2×2 pixel unit, and ADC13 and ADC14 can acquire a difference between pixels of the same color of a 2×2 pixel unit and another 2×2 pixel unit located in the upper right diagonal of the 2×2 pixel unit. Subsequently, difference data in the frame is acquired by repeating the acquisition of the difference between the odd-numbered rows such as between the third row and the fifth row with the data of three rows read. It is therefore possible to generate difference data between red pixels and between green pixels in the same rows as the red pixels.

Subsequently, a procedure similar to the procedure for the odd-numbered rows is repeated for the even-numbered rows such as 2-4, 4-6, 6-8 . . . , and the like, difference data between blue pixels and between green pixels in the same rows as the blue pixels is obtained, and color pixel difference data for the entire frame can be generated together.

Figure 25:
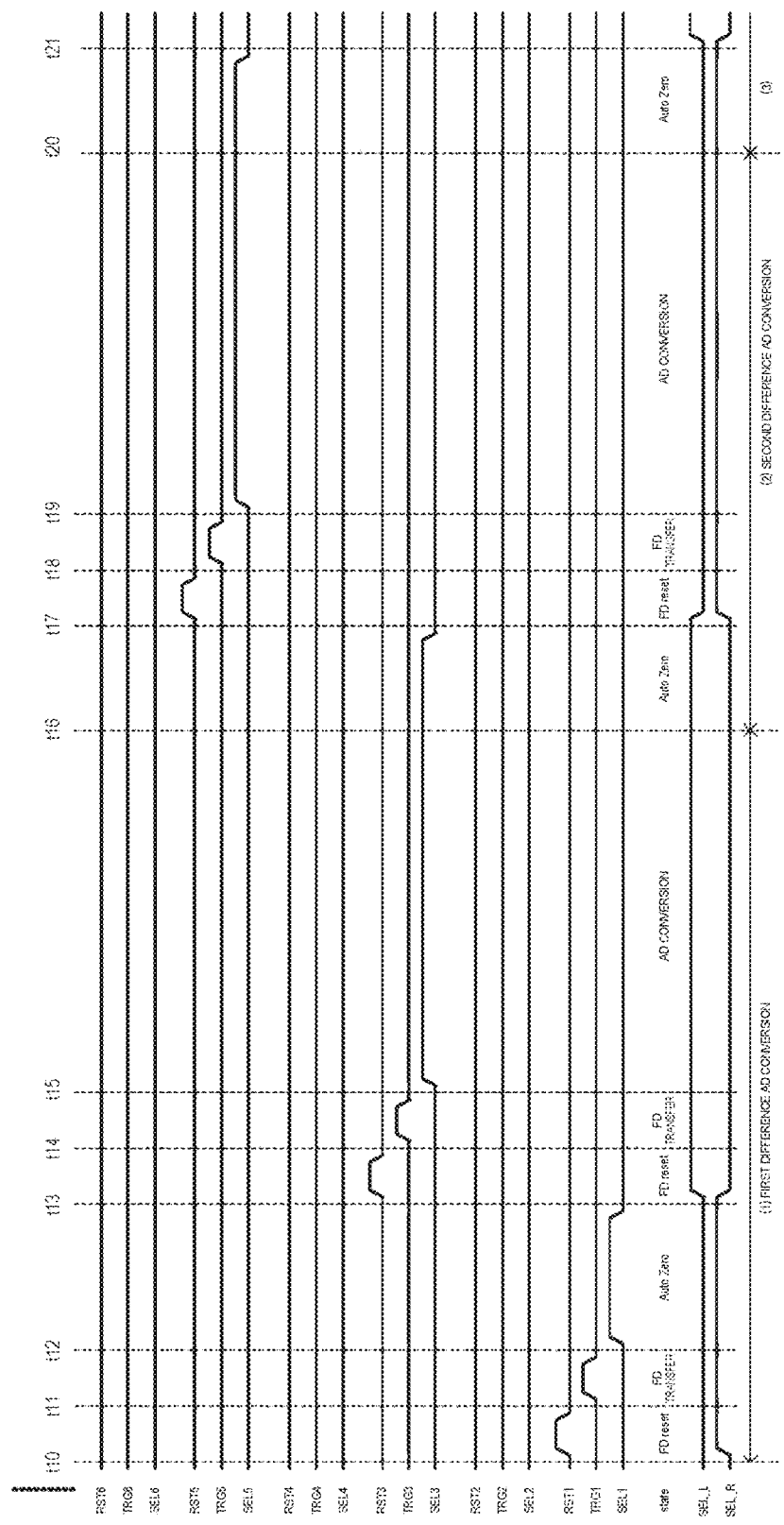
FIG. 25 is a time chart illustrating the difference processing example from time t10 to time t21 according to the third embodiment.
Figure 26:
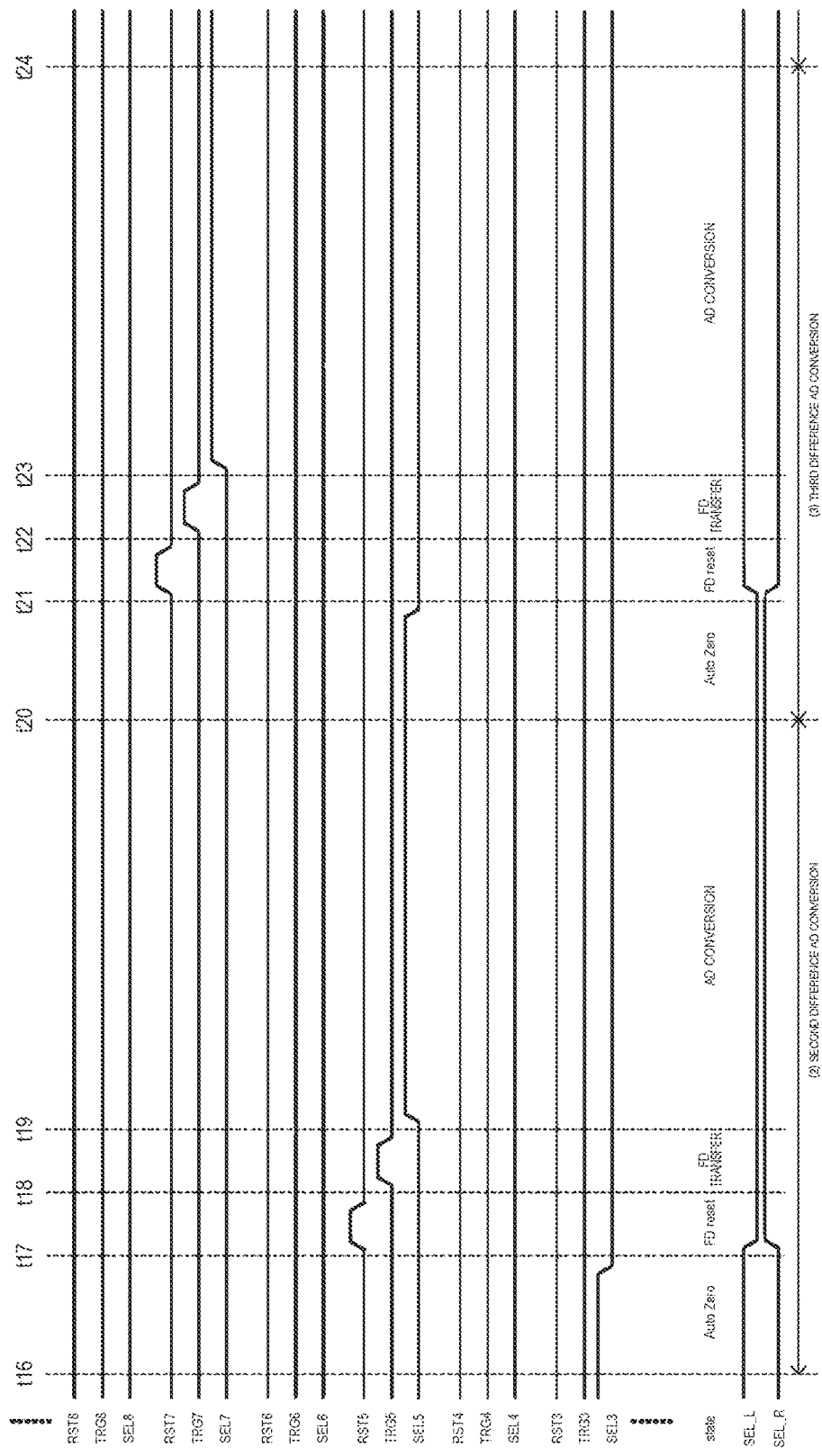
FIG. 26 is a time chart including the difference processing example from time t21 to time t24 according to the third embodiment.
Figure 27:
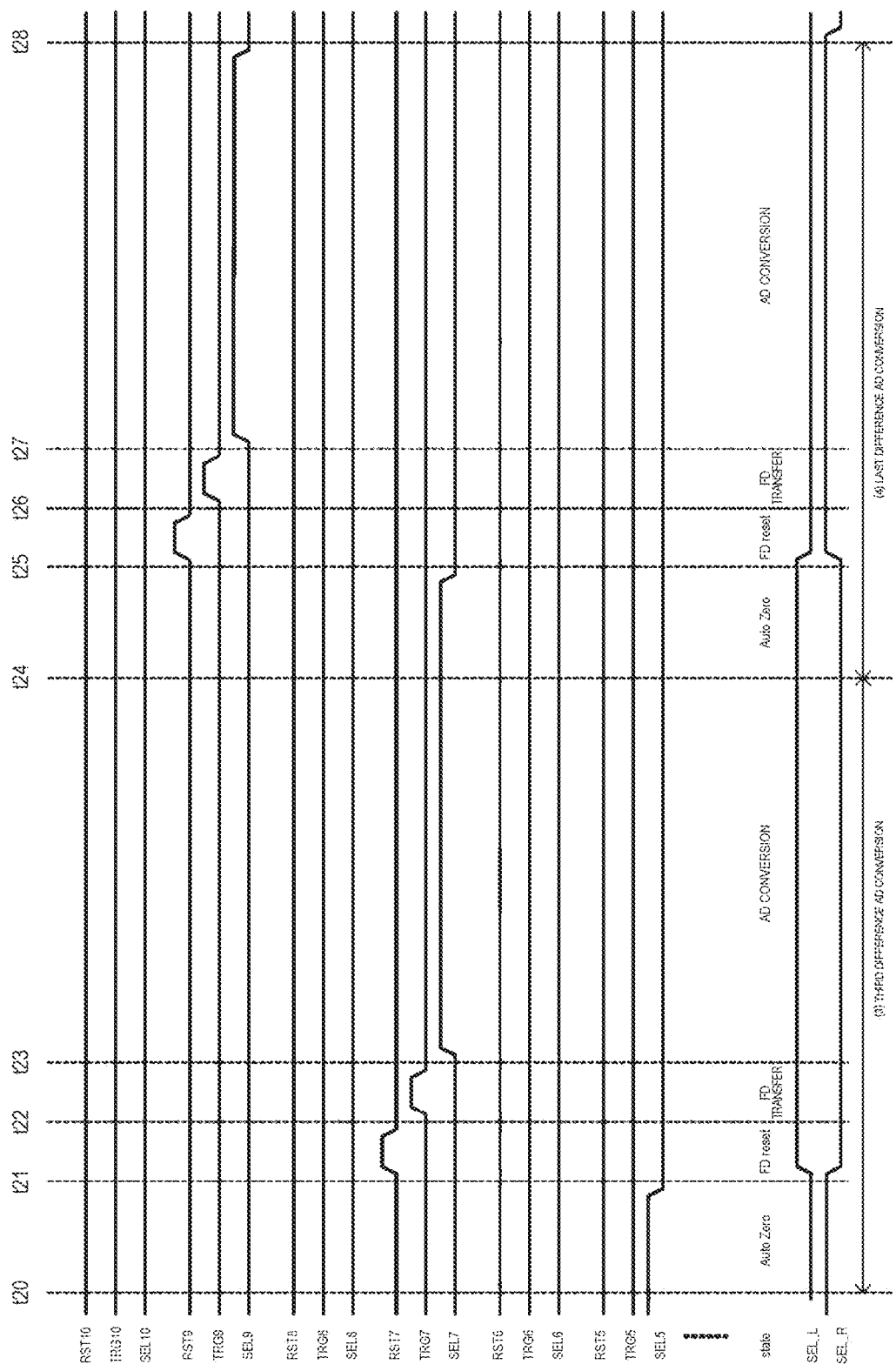
FIG. 27 is a time chart including the difference processing example performed on the last odd-numbered row.

Here, the difference processing example performed on the odd-numbered rows by the image sensor 2 according to the third embodiment will be described in detail with reference to FIGS. 25 and 26. FIG. 25 is a time chart illustrating the difference processing example from time t10 to time t21, FIG. 26 is a time chart including the difference processing example from time t21 to time t24, and FIG. 27 is a time chart including the difference processing example performed on the last odd-numbered row. The vertical axis indicates signals RST10, TRG10, SEL10 to RST1, TRG1, SEL1, an AD converter state State, signals SEL_L, and SEL_R from the top, and the horizontal axis indicates time. The difference processing example is different from the difference processing example performed by the image sensor 2 according to the first embodiment in that the difference processing is performed for each odd-numbered row. Furthermore, in a case where the difference processing example is performed on the odd-numbered rows, all the signals of the control lines in the even-numbered rows are maintained at the low level.

As illustrated in FIG. 25, first, at time t10, the signal RST1 and SEL_L go to the high level. As a result, the reset transistor SW2 of each pixel in the first row turns on when the high-level reset signal RST1 is input to the gate of the reset transistor SW2 through the signal line Rst1 to reset the floating diffusion FD to the voltage of the constant voltage source VSS.

Next, at time t11, the signal RST1 goes to the low level to make the set transistor SW2 non-connected. Then, the signal TRG1 goes to the high level. As a result, signal charges (here, photoelectrons) accumulated by photoelectric conversion of the photodiode PD of each pixel in the first row are transferred to the floating diffusion FD.

Next, at time t12, the signal SEL1 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the high level, and SEL_R is at the low level.

As a result, the AD converters ADC11 and 12 are electrically connected to the vertical signal lines VSL1 and 2, the AD converters ADC13 and 14 are electrically connected to the vertical signal lines VSL5 and 6, and the data of each pixel is input to the corresponding AD converter accordingly. Furthermore, since SEL_R is 1 (High), the AD converters ADC21 and 22 are electrically connected to the vertical signal lines VSL5 and 6, the AD converters ADC23 and 24 are connected to the dummy, and the data of each pixel is input to the corresponding AD converter accordingly.

In this state, in the period between time t12 and time t13, each AD converter performs auto-zero (AZ) to set the data of the pixels in the first row to the reference value (zero value). Thereafter, the AZ circuit stores this offset amount.

At time t13, the signal RST3 and SEL_R go to the low level, and SEL_L goes to the high level. As a result, the reset transistor SW2 of each pixel in the third row turns on when the high-level reset signal RST2 is input to the gate of the reset transistor SW2 through the signal line Rst2 to reset the floating diffusion FD to the voltage of the constant voltage source VSS.

Next, at time t14, the signal RST3 goes to the low level to make the set transistor SW2 non-connected. Then, the signal TRG3 goes to the high level. As a result, signal charges (here, photoelectrons) accumulated by photoelectric conversion of the photodiode PD of each pixel in the third row are transferred to the floating diffusion FD.

Next, at time t15, the signal SEL3 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the high level, and SEL_R is at the low level.

As a result, the AD converters ADC11 and 12 are electrically connected to the vertical signal lines VSL3 and VSL4, the AD converters ADC13 and 14 are electrically connected to the vertical signal lines VSL7 and VSL8, and the data of each pixel is input to the corresponding AD converter accordingly. Furthermore, the AD converters ADC21 and 22 are electrically connected to the vertical signal lines VSL3 and 4, the AD converters ADC23 and 24 are electrically connected to the vertical signal lines VSL7 and VSL8, and the data of the data of each pixel is input to the corresponding AD converter accordingly.

Subsequently, between time t15 and time t16, the AD converters ADC11 to 14 and 21 to 24 perform AD conversion. As described above, the AD converters ADC11 to 14 and 21 to 24 perform AD conversion to perform, every other row, difference processing between red pixels and between green pixels in the first and third rows.

Next, between time t16 and time t17, a state where the signal SEL3 is at the high level, SEL_L is at the high level, and SEL_R is at the low level is maintained. Therefore, the AZ units 40 and 42 of the AD converters ADC11 to 14 and 21 to 24 perform auto-zero (AZ) to set the data of the pixels in the third row to the reference value (zero value). Thereafter, the AZ circuit stores this offset amount.

At time t17, the signal RST5 and SEL_R go to the high level, and SEL_L goes to the low level. As a result, the reset transistor SW2 of each pixel in the fifth row turns on when the high-level reset signal RST3 is input to the gate of the reset transistor SW2 through the signal line Rst3 to reset the floating diffusion FD to the voltage of the constant voltage source VSS.

Next, at time t18, the signal RST3 goes to the low level to make the set transistor SW2 non-connected. Then, the signal TRG5 goes to the high level. As a result, signal charges (here, photoelectrons) accumulated by photoelectric conversion of the photodiode PD of each pixel in the fifth row are transferred to the floating diffusion FD.

Next, as illustrated in FIG. 26, the signal SEL5 goes to the high level at time t19. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level.

As a result, the AD converters ADC11 and 12 are electrically connected to the vertical signal lines VSL1 and 2, the AD converters ADC13 and 14 are electrically connected to the vertical signal lines VSL5 and 6, and the data of each pixel is input to the corresponding AD converter accordingly. Furthermore, the AD converters ADC21 and 22 are electrically connected to the vertical signal lines VSL5 and 6, the AD converters ADC23 and 24 are electrically connected to the dummy, and the data of each pixel or the dummy signal is input to the corresponding AD converter accordingly.

Next, between time t19 and time t20, each AD converter performs AD conversion. As described above, in the present embodiment, a difference between the pixels of the same color of the 2×2 pixels units G10 located diagonally relative to each other can be extracted. Since the shape is emphasized in the recognition field, the difference information is important. In the present embodiment, the shape can also be determined on the basis of color. Therefore, the present embodiment is applicable to color-based recognition. For example, in a three-dimensional ranging technology of projecting a color texture pattern, it is possible to output a change point of the color pattern at high speed and with low power consumption. Furthermore, it is possible to contribute to improvement of a recognition speed of the system and reduction of power consumption.

Next, between time t20 and time t21, a state where the signal SEL5 is at the high level, SEL_L is at the low level, and SEL_R is at the high level is maintained. Therefore, the AZ units 40 and 42 of the AD converters ADC11 to 14 and 21 to 24 perform auto-zero (AZ) to set the pixels in the fifth row to the reference value (zero value). Thereafter, the AZ circuit stores this offset amount.

At time t21, the signal RST7 and SEL_L go to the high level, and SEL_R goes to the low level. As a result, the reset transistor SW2 of each pixel in the seventh row turns on when the high-level reset signal RST7 is input to the gate of the reset transistor SW2 through the signal line Rst7 to reset the floating diffusion FD to the voltage of the constant voltage source VSS.

Next, at time t22, the signal RST7 goes to the low level to make the reset transistor SW2 non-connected. Then, the signal TRG7 goes to the high level. As a result, signal charges (here, photoelectrons) accumulated by photoelectric conversion of the photodiode PD of seven pixels in the seventh row are transferred to the floating diffusion FD.

Next, at time t23, the signal SEL7 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the high level, and SEL_R is at the low level.

The AD converters ADC11 and 12 are electrically connected to the vertical signal lines VSL1 and 2, the AD converters ADC11 and 12 are electrically connected to the vertical signal lines VSL3 and VSL4, the AD converters ADC13 and 14 are electrically connected to the vertical signal lines VSL7 and VSL8, and the data of each pixel is input to the corresponding AD converter accordingly. Furthermore, the AD converters ADC21 and 22 are electrically connected to the vertical signal lines VSL3 and 4, the AD converters ADC23 and 24 are electrically connected to the vertical signal lines VSL7 and VSL8, and the data of each pixel is input to the corresponding AD converter accordingly.

Next, between time t23 and time t24, each AD converter performs AD conversion to generate difference data between pixels of the same color of the 2×2 pixel units G10 in the fifth row and the seventh row. In the present embodiment, the levels of SEL_L and SEL_R are controlled to be inverted each time. In a case where the number of pixels in the vertical direction of the pixel array unit 10 is increased, the second and third difference AD conversion control is repeated.

Next, between time t24 and time t25, a state where the signal SEL7 is at the high level, SEL_L is at the high level, and SEL_R is at the low level is maintained. Therefore, the AZ units 40 and 42 of the AD converters ADC11 to 14 and 21 to 24 perform auto-zero (AZ) to set the pixels in the seventh row to the reference value (zero value). Thereafter, the AZ circuit stores this offset amount.

At time t25, the signal RST9 and SEL_L go to the high level, and SEL_R goes to the low level. As a result, the reset transistor SW2 of each pixel in the ninth row turns on when the high-level reset signal RST9 is input to the gate of the reset transistor SW2 through the signal line Rst9 to reset the floating diffusion FD to the voltage of the constant voltage source VSS.

Next, at time t27, the signal RST9 goes to the low level to make the reset transistor SW2 non-connected. Then, the signal TRG9 goes to the high level. As a result, signal charges (here, photoelectrons) accumulated by photoelectric conversion of the photodiode PD of nine pixels in the ninth row are transferred to the floating diffusion FD.

Next, at time t27, the signal SEL9 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the high level, and SEL_R is at the low level.

As a result, the AD converters ADC11 and 12 are electrically connected to the vertical signal lines VSL3 and VSL4, the AD converters ADC13 and 14 are electrically connected to the vertical signal lines VSL7 and VSL8, and the data of each pixel is input to the corresponding AD converter accordingly. Furthermore, the AD converters ADC21 and 22 are electrically connected to the vertical signal lines VSL3 and 4, the AD converters ADC23 and 24 are electrically connected to the vertical signal lines VSL7 and VSL8, and the data of each pixel is input to the corresponding AD converter accordingly.

Next, between time t27 and time t28, each AD converter performs AD conversion to generate difference data between pixels of the same color of the 2×2 pixel units G10 in the seventh row and the ninth row.

Figure 28:
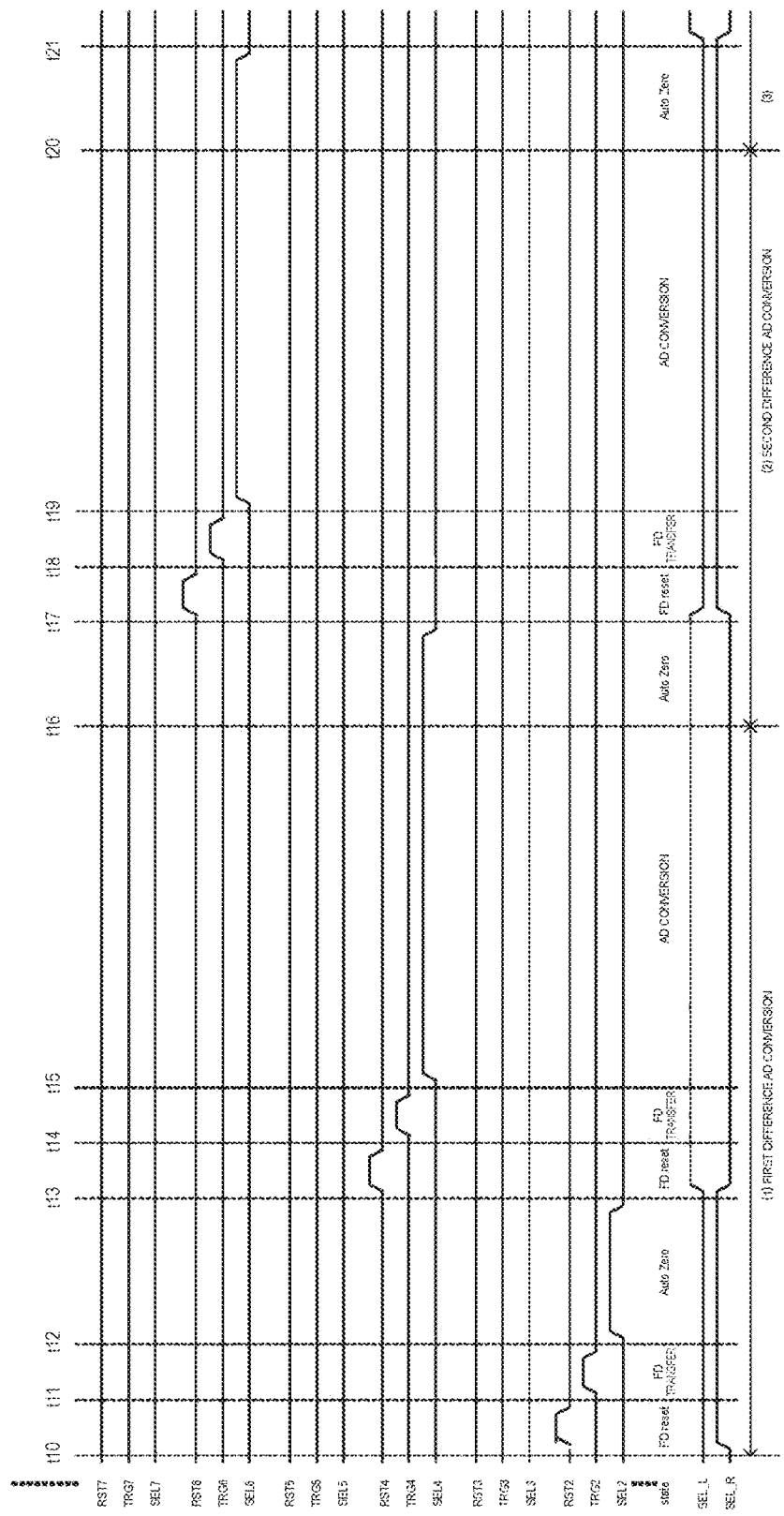
FIG. 28 is a time chart illustrating the difference processing example from time t10 to time t21 for even-numbered rows.
Figure 29:
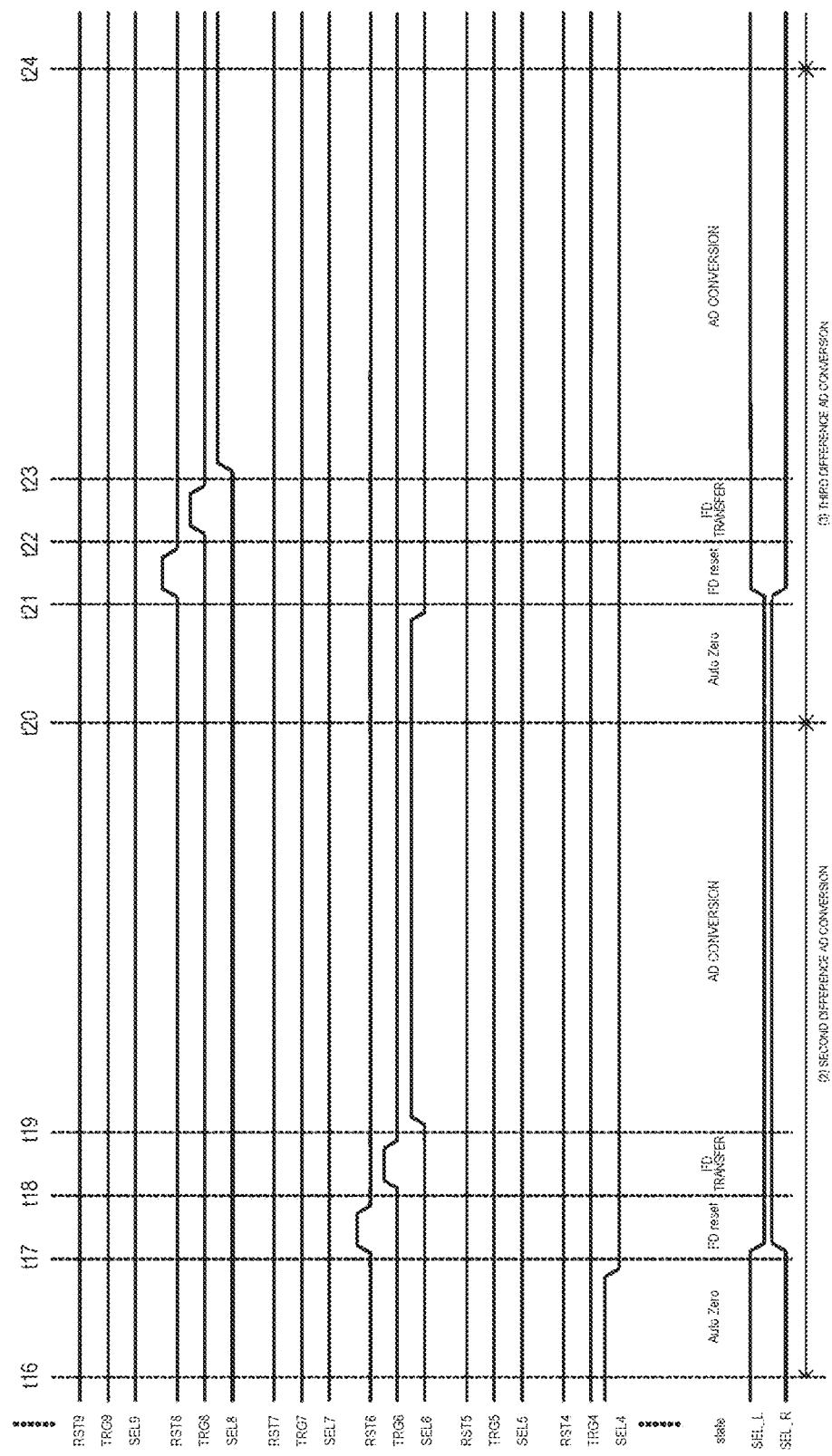
FIG. 29 is a time chart including the difference processing example from time t21 to time t24 for even-numbered rows.
Figure 30:
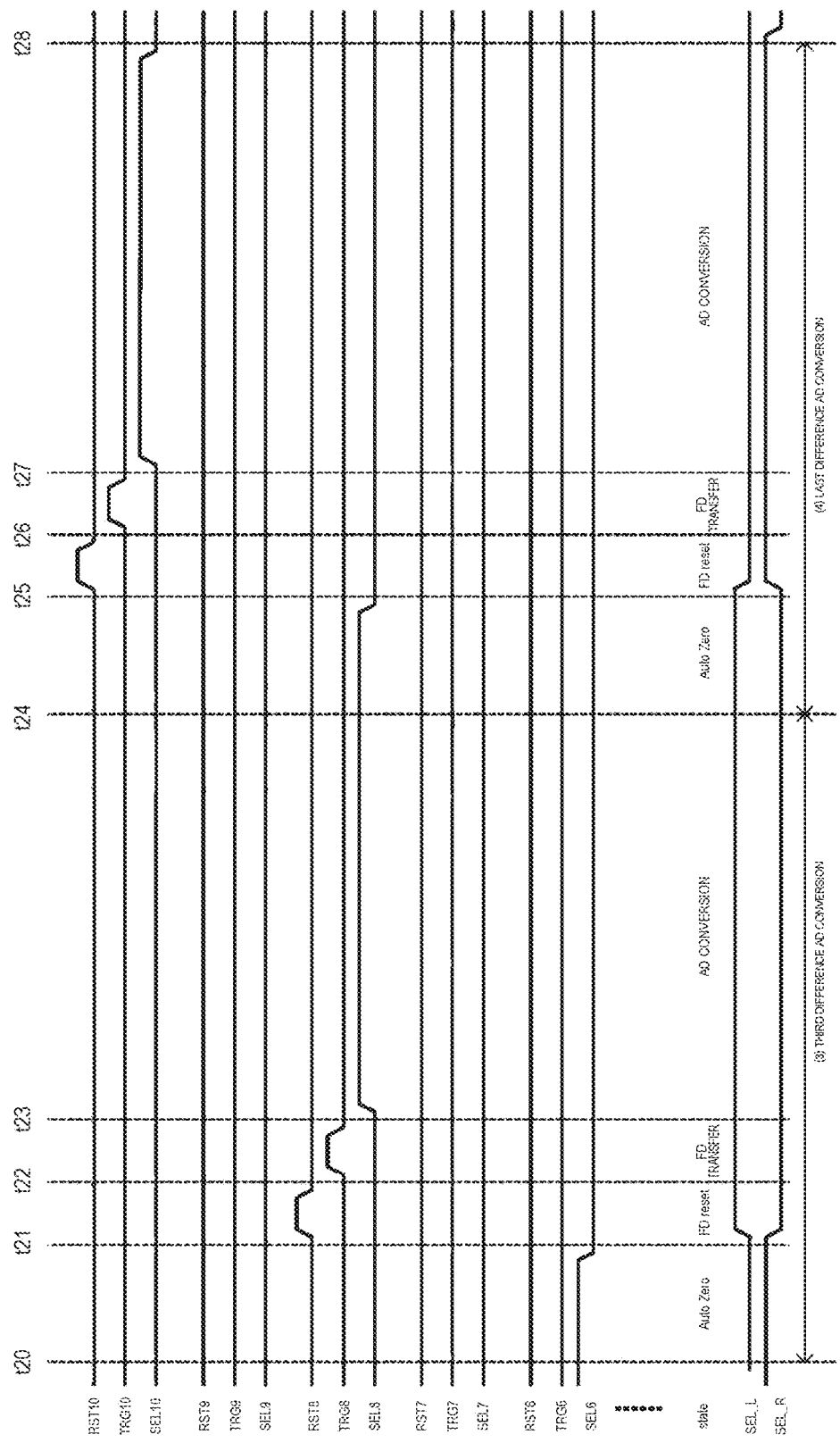
FIG. 30 is a time chart including the difference processing example performed on the last even-numbered row.

Here, the difference processing example performed on the even-numbered rows by the image sensor 2 according to the third embodiment will be described in detail with reference to FIGS. 28 and 30. FIG. 28 is a time chart illustrating the difference processing example from time t10 to time t21, FIG. 29 is a time chart including the difference processing example from time t21 to time t24, and FIG. 30 is a time chart including the difference processing example performed on the last even-numbered row. The vertical axis indicates signals RST10, TRG10, SEL10 to RST1, TRG1, SEL1, an AD converter state State, signals SEL_L, and SEL_R from the top, and the horizontal axis indicates time. The difference processing example is different from the difference processing example illustrated in FIGS. 25 to 27 in that the difference processing is performed for each even-numbered row. Furthermore, in a case where the difference processing example is performed on the even-numbered rows, all the signals of the control lines in the odd-numbered rows are maintained at the low level.

As illustrated in FIG. 28, first, at time t10, the signal RST2 and SEL_L go to the high level. As a result, the reset transistor SW2 of each pixel in the second row turns on when the high-level reset signal RST2 is input to the gate of the reset transistor SW2 through the signal line Rst2 to reset the floating diffusion FD to the voltage of the constant voltage source VSS.

Next, at time t11, the signal RST2 goes to the low level to make the set transistor SW2 non-connected. Then, the signal TRG1 goes to the high level. As a result, signal charges (here, photoelectrons) accumulated by photoelectric conversion of the photodiode PD of each pixel in the second row are transferred to the floating diffusion FD.

Next, at time t12, the signal SEL2 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the high level, and SEL_R is at the low level.

As a result, the AD converters ADC11 and 12 are electrically connected to the vertical signal lines VSL1 and 2, the AD converters ADC13 and 14 are electrically connected to the vertical signal lines VSL5 and 6, and the data of each pixel is input to the corresponding AD converter accordingly. Furthermore, since SEL_R is 1 (High), the AD converters ADC21 and 22 are electrically connected to the vertical signal lines VSL5 and 6, the AD converters ADC23 and 24 are connected to the dummy, and the data of each pixel is input to the corresponding AD converter accordingly.

In this state, in the period between time t12 and time t13, each AD converter performs auto-zero (AZ) to set the data of the pixels in the second row to the reference value (zero value). Thereafter, the AZ circuit stores this offset amount.

At time t13, the signal RST4 and SEL_R go to the low level, and SEL_L goes to the high level. As a result, the reset transistor SW2 of each pixel in the fourth row turns on when the high-level reset signal RST4 is input to the gate of the reset transistor SW2 through the signal line Rst4 to reset the floating diffusion FD to the voltage of the constant voltage source VSS.

Next, at time t14, the signal RST4 goes to the low level to make the set transistor SW2 non-connected. Then, the signal TRG4 goes to the high level. As a result, signal charges (here, photoelectrons) accumulated by photoelectric conversion of the photodiode PD of each pixel in the fourth row are transferred to the floating diffusion FD.

Next, at time t15, the signal SEL4 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the high level, and SEL_R is at the low level.

As a result, the AD converters ADC11 and 12 are electrically connected to the vertical signal lines VSL3 and VSL4, the AD converters ADC13 and 14 are electrically connected to the vertical signal lines VSL7 and VSL8, and the data of each pixel is input to the corresponding AD converter accordingly. Furthermore, the AD converters ADC21 and 22 are electrically connected to the vertical signal lines VSL3 and 4, the AD converters ADC23 and 24 are electrically connected to the vertical signal lines VSL7 and VSL8, and the data of the data of each pixel is input to the corresponding AD converter accordingly.

Subsequently, between time t15 and time t16, the AD converters ADC11 to 14 and 21 to 24 perform AD conversion. As described above, the AD converters ADC11 to 14 and 21 to 24 perform AD conversion to perform, every other row, difference processing between green pixels and between blue pixels in the second and fourth rows.

Next, between time t16 and time t17, a state where the signal SEL4 is at the high level, SEL_L is at the high level, and SEL_R is at the low level is maintained. Therefore, the AZ units 40 and 42 of the AD converters ADC11 to 14 and 21 to 24 perform auto-zero (AZ) to set the data of the pixels in the third row to the reference value (zero value). Thereafter, the AZ circuit stores this offset amount.

At time t17, the signal RST6 and SEL_R go to the high level, and SEL_L goes to the low level. As a result, the reset transistor SW2 of each pixel in the sixth row turns on when the high-level reset signal RST6 is input to the gate of the reset transistor SW2 through the signal line Rst6 to reset the floating diffusion FD to the voltage of the constant voltage source VSS.

Next, at time t18, the signal RST6 goes to the low level to make the set transistor SW2 non-connected. Then, the signal TRG6 goes to the high level. As a result, signal charges (here, photoelectrons) accumulated by photoelectric conversion of the photodiode PD of each pixel in the sixth row are transferred to the floating diffusion FD.

Next, as illustrated in FIG. 29, the signal SEL6 goes to the high level at time t19. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level.

As a result, the AD converters ADC11 and 12 are electrically connected to the vertical signal lines VSL1 and 2, the AD converters ADC13 and 14 are electrically connected to the vertical signal lines VSL5 and 6, and the data of each pixel is input to the corresponding AD converter accordingly. Furthermore, the AD converters ADC21 and 22 are electrically connected to the vertical signal lines VSL5 and 6, the AD converters ADC23 and 24 are electrically connected to the dummy, and the data of each pixel or the dummy signal is input to the corresponding AD converter accordingly.

Next, between time t19 and time t20, each AD converter performs AD conversion. As described above, in the present embodiment, a difference between the pixels of the same color of the 2×2 pixels units G10 located diagonally relative to each other can be extracted.

Next, between time t20 and time t21, a state where the signal SEL6 is at the high level, SEL_L is at the low level, and SEL_R is at the high level is maintained. Therefore, the AZ units 40 and 42 of the AD converters ADC11 to 14 and 21 to 24 perform auto-zero (AZ) to set the pixels in the fifth row to the reference value (zero value). Thereafter, the AZ circuit stores this offset amount.

At time t21, the signal RST8 and SEL_L go to the high level, and SEL_R goes to the low level. As a result, the reset transistor SW2 of each pixel in the eighth row turns on when the high-level reset signal RST8 is input to the gate of the reset transistor SW2 through the signal line Rst7 to reset the floating diffusion FD to the voltage of the constant voltage source VSS.

Next, at time t22, the signal RST8 goes to the low level to make the reset transistor SW2 non-connected. Then, the signal TRG8 goes to the high level. As a result, signal charges (here, photoelectrons) accumulated by photoelectric conversion of the photodiode PD of eight pixels in the eighth row are transferred to the floating diffusion FD.

Next, at time t23, the signal SEL8 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the high level, and SEL_R is at the low level.

As a result, the AD converters ADC11 and 12 are electrically connected to the vertical signal lines VSL3 and VSL4, the AD converters ADC13 and 14 are electrically connected to the vertical signal lines VSL7 and VSL8, and the data of each pixel is input to the corresponding AD converter accordingly. Furthermore, the AD converters ADC21 and 22 are electrically connected to the vertical signal lines VSL3 and 4, the AD converters ADC23 and 24 are electrically connected to the vertical signal lines VSL7 and VSL8, and the data of each pixel is input to the corresponding AD converter accordingly.

Next, between time t23 and time t24, each AD converter performs AD conversion to generate difference data between pixels of the same color of the 2×2 pixel units G10 in the sixth row and the eighth row. In the present embodiment, the levels of SEL_L and SEL_R are controlled to be inverted each time. In a case where the number of pixels in the vertical direction of the pixel array unit 10 is increased, the second and third difference AD conversion control is repeated.

Next, between time t24 and time t25, a state where the signal SEL8 is at the high level, the signal SEL_L is at the high level, and the signal SEL_R is at the low level is maintained. Therefore, the AZ units 40 and 42 of the AD converters ADC11 to 14 and 21 to 24 perform auto-zero (AZ) to set the pixels in the seventh row to the reference value (zero value). Thereafter, the AZ circuit stores this offset amount.

At time t25, the signal RST10 and SEL_R go to the high level, and SEL_L goes to the low level. As a result, the reset transistor SW2 of each pixel in the tenth row turns on when the high-level reset signal RST10 is input to the gate of the reset transistor SW2 through the signal line Rst10 to reset the floating diffusion FD to the voltage of the constant voltage source VSS.

Next, at time t27, the signal RST10 goes to the low level to make the reset transistor SW2 non-connected. Then, the signal TRG10 goes to the high level. As a result, signal charges (here, photoelectrons) accumulated by photoelectric conversion of the photodiode PD of each pixel in the tenth row are transferred to the floating diffusion FD.

Next, at time t27, the signal SEL10 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the high level, and SEL_R is at the low level.

As a result, the AD converters ADC11 and 12 are electrically connected to the vertical signal lines VSL3 and VSL4, the AD converters ADC13 and 14 are electrically connected to the vertical signal lines VSL7 and VSL8, and the data of each pixel is input to the corresponding AD converter accordingly. Furthermore, the AD converters ADC21 and 22 are electrically connected to the vertical signal lines VSL3 and 4, the AD converters ADC23 and 24 are electrically connected to the vertical signal lines VSL7 and VSL8, and the data of each pixel is input to the corresponding AD converter accordingly.

Next, between time t27 and time t28, each AD converter performs AD conversion to generate difference data between pixels of the same color of the 2×2 pixel units G10 in the eighth row and the tenth row.

(Second Control Method of Third Embodiment)

A second control method of the third embodiment is different from the first control method of the third embodiment only in timing chart. In the first control method, only odd-numbered rows are read and subjected to AD conversion first, and then even-numbered rows are read and subjected to AD conversion in a similar procedure. Therefore, there is a difference in exposure timing between the odd-numbered rows and the even-numbered rows. The second control method differs in that a procedure up to the reading of the even-numbered rows (charge transfer to FD) is performed simultaneously with the reading of the odd-numbered rows and the AD conversion. It is therefore possible to synchronize the exposure timing of the odd-numbered rows and the exposure timing of the even-numbered rows. As a result, it is possible to suppress artifacts due to a difference in exposure timing of a moving subject. More specifically, charge readout of the even-numbered rows is performed simultaneously with AD conversion of the odd-numbered rows, and the charges of each pixel are transferred to the FD. In the subsequent AD conversion of the even-numbered rows, the AD conversion is performed on the charges transferred to the FD without pixel transfer. As a result, the even-numbered rows and the odd-numbered rows that are paired with each other are synchronized in exposure timing with each other, so that there is no motion blur of the moving subject, and artifacts when viewed as one image are suppressed.

Figure 31:
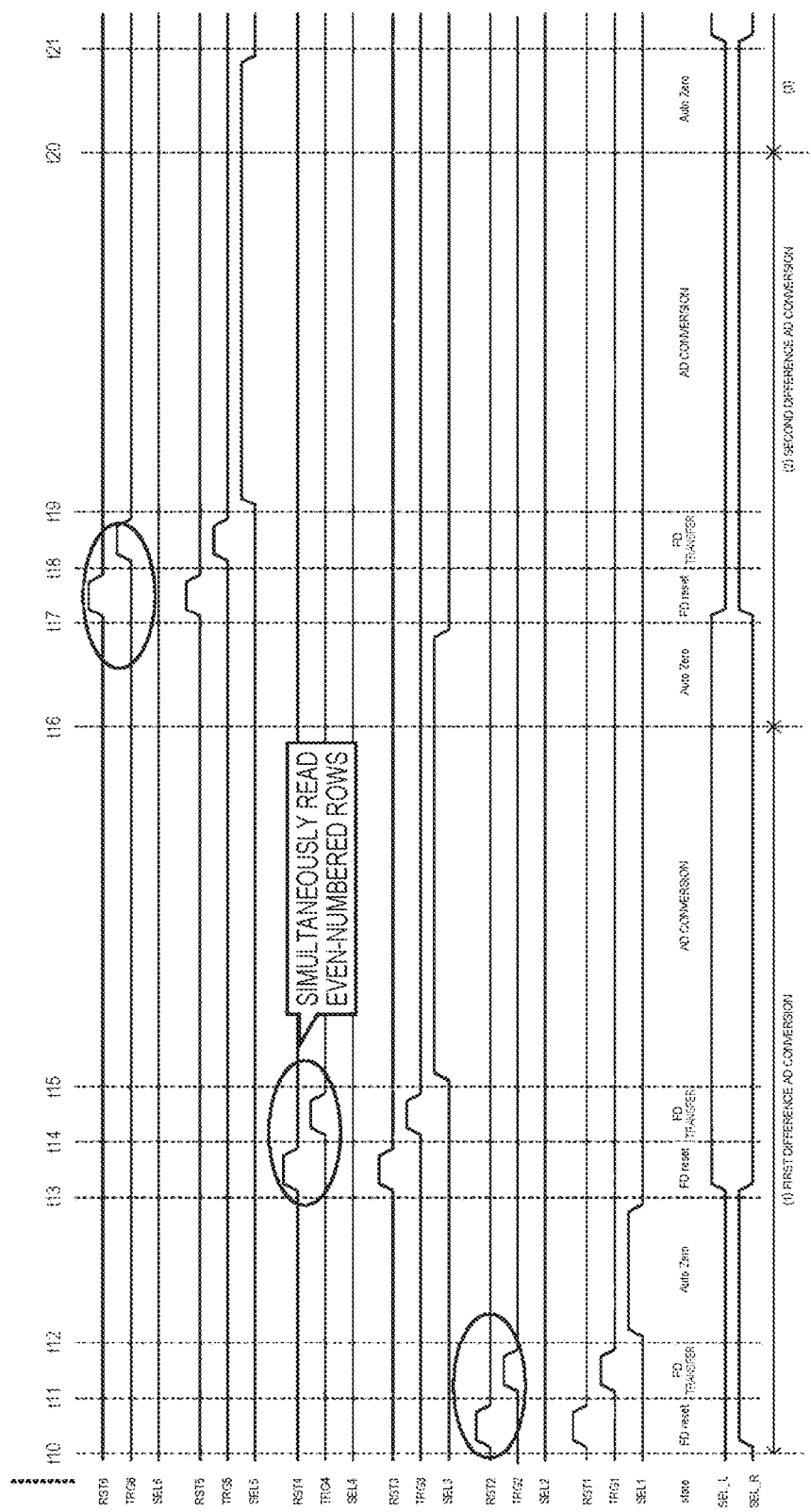
FIG. 31 is a time chart illustrating a difference processing example from time t10 to time t21 according to a second control method.
Figure 32:
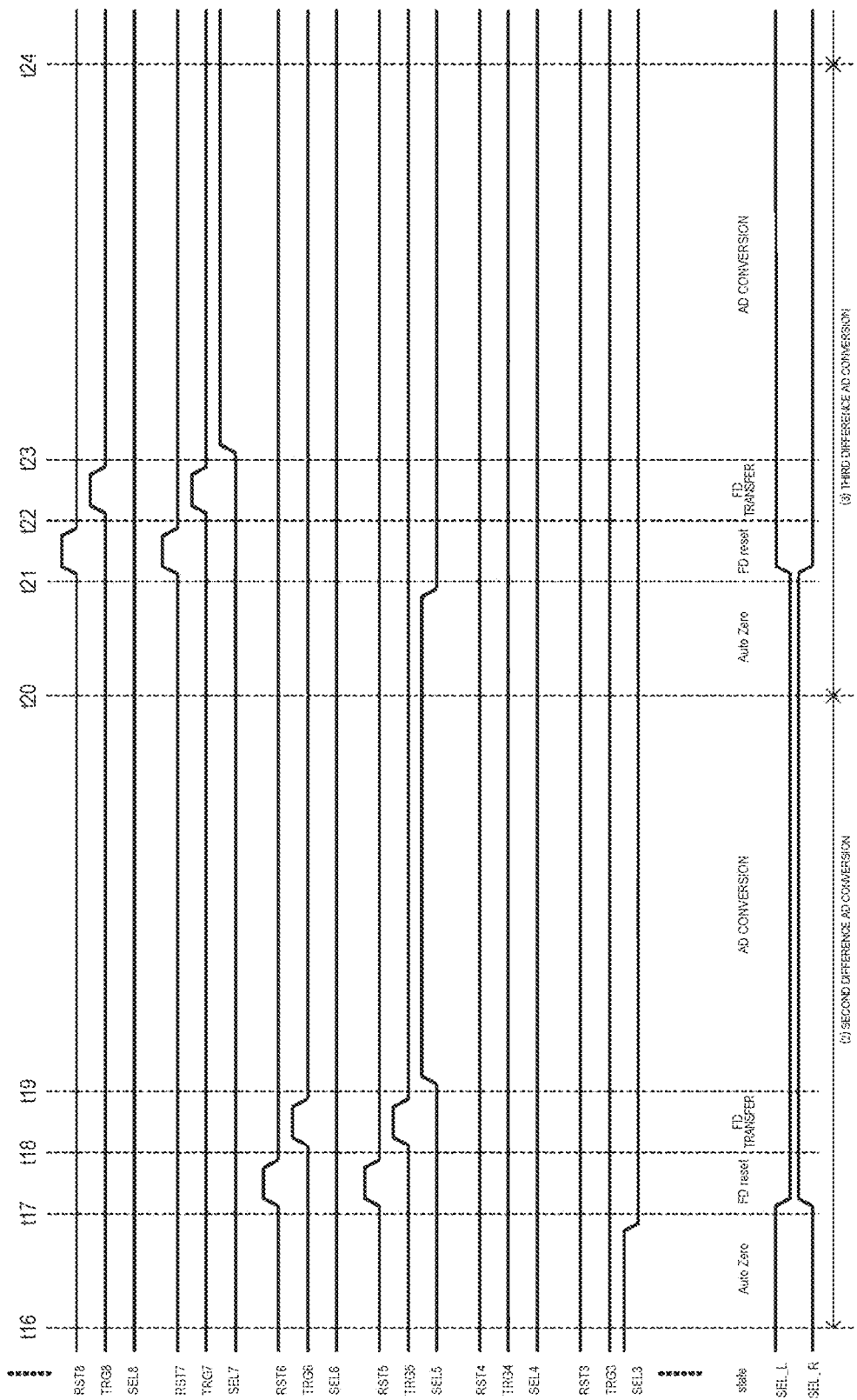
FIG. 32 is a time chart including the difference processing example from time t21 to time t24 according to the second control method.
Figure 33:
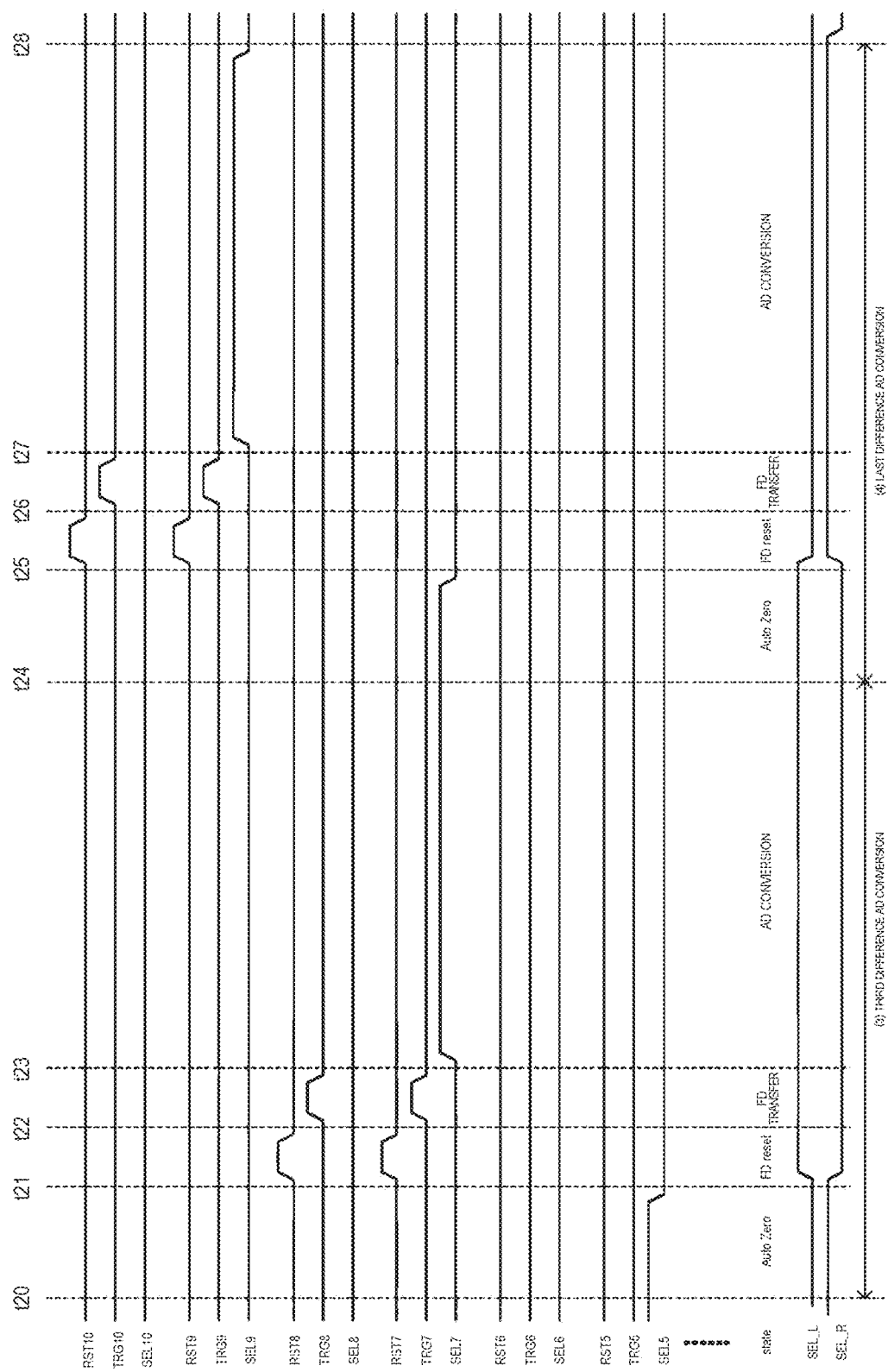
FIG. 33 is a time chart including the difference processing example performed on the last odd-numbered row according to the second control method.
Figure 34:
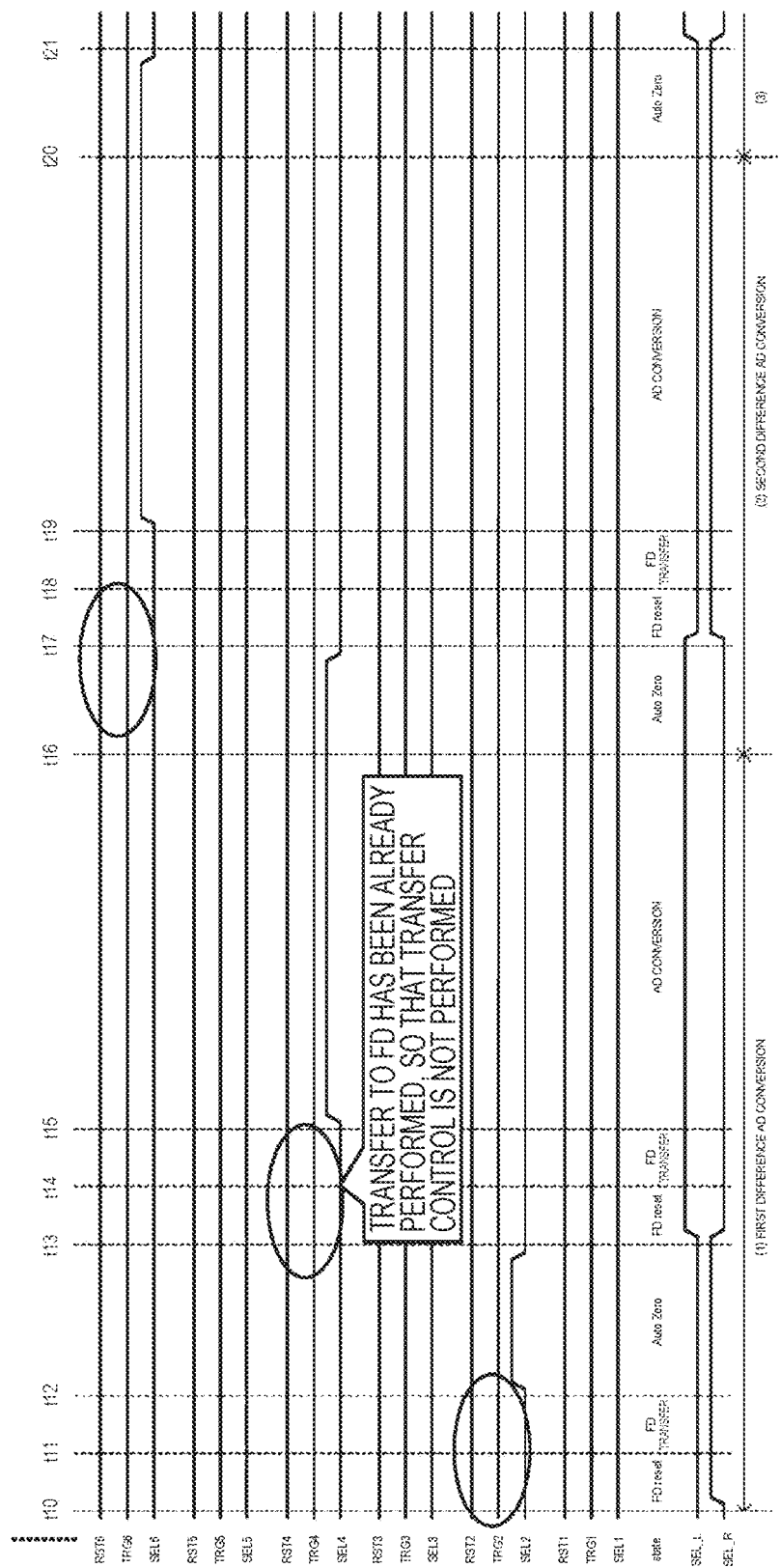
FIG. 34 is a time chart illustrating the difference processing example from time t30 to time t41 according to the second control method.

Here, a difference processing example performed by the image sensor 2 according to the second control method of the third embodiment will be described in detail with reference to FIGS. 31 to 36. FIGS. 31 to 33 illustrate AD conversion processing performed on the odd-numbered rows and processing of transferring charges to the FDs of the even-numbered rows, and FIGS. 34 to 34 illustrate AD conversion processing performed on the even-numbered rows. The vertical axis indicates signals RST10, TRG10, SEL10 to RST1, TRG1, SEL1, an AD converter state State, signals SEL_L, and SEL_R from the top, and the horizontal axis indicates time. The difference processing example is different from the difference processing example performed by the image sensor 2 according to the first embodiment in that the difference processing is performed for each odd-numbered row. Furthermore, in a case where the difference processing example is performed on the odd-numbered rows, all the signals of the control lines in the even-numbered rows are maintained at the low level. Hereinafter, a difference from the first control method of the third embodiment will be mainly described.

FIG. 31 is a time chart illustrating the difference processing example according to the second control method from time t10 to time t21, FIG. 32 is a time chart including the difference processing example according to the second control method from time t21 to time t24, and FIG. 33 is a time chart including the difference processing example according to the second control method performed on the last odd-numbered row.

Figure 35:
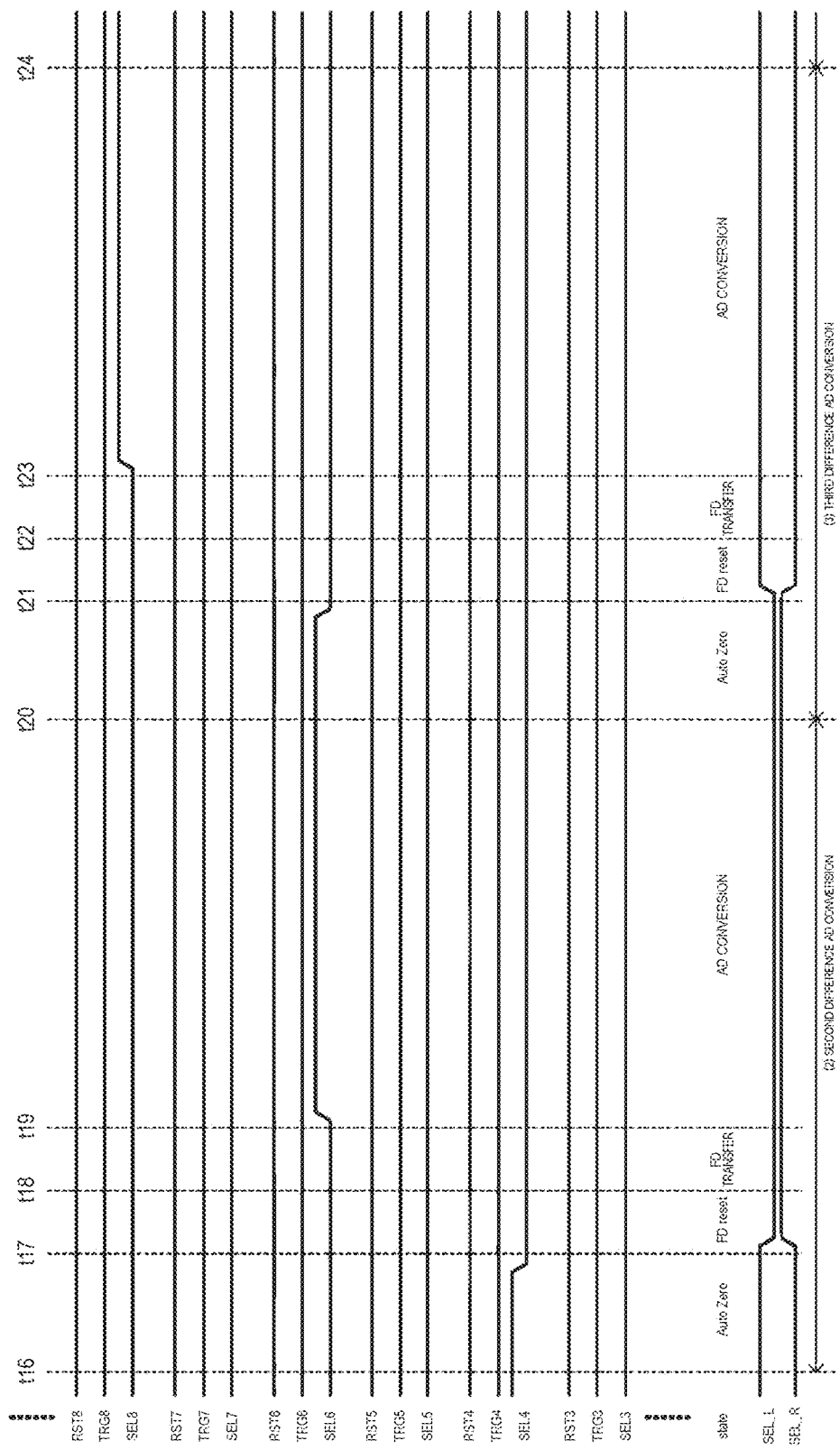
FIG. 35 is a time chart including the difference processing example from time t36 to time t44 according to the control method.
Figure 36:
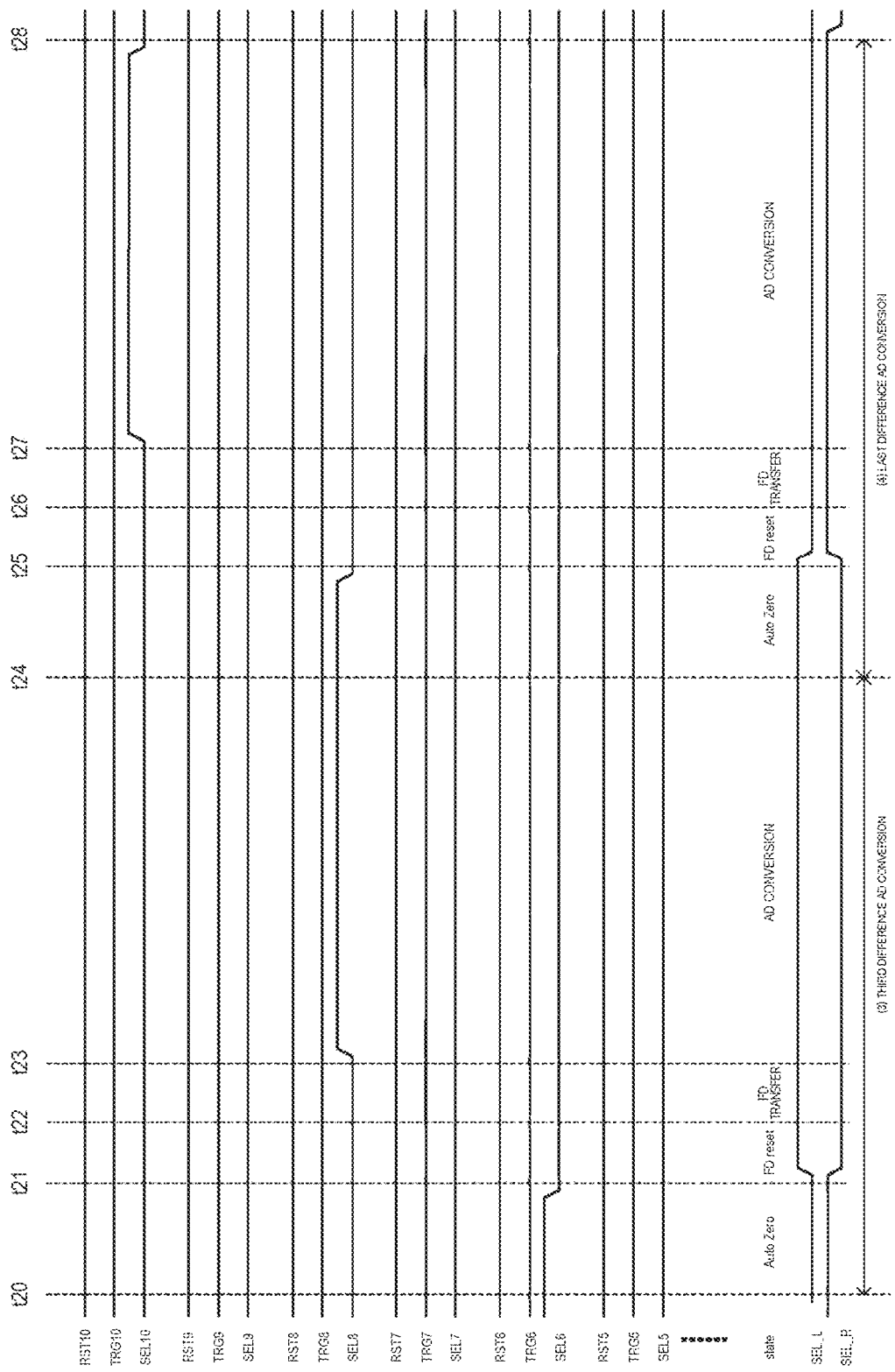
FIG. 36 is a time chart including the difference processing example performed on the last even-numbered row according to the second control method.

FIG. 34 is a time chart illustrating the difference processing example according to the second control method from time t30 to time t41, FIG. 35 is a time chart including the difference processing example according to the second control method from time t36 to time t44, and FIG. 36 is a time chart including the difference processing example according to the second control method performed on the last even-numbered row.

As illustrated in FIG. 31 first, at time t10, the signals RST1 and 2 and SEL_L go to the high level. As a result, the reset transistor SW2 of each pixel in the first and second rows turns on when the high-level reset signal RST1 is input to the gate of the reset transistor SW2 through the signal line Rst1 to reset the floating diffusion FD to the voltage of the constant voltage source VSS.

Next, at time t11, the signals RST1 and 2 go to the low level to make the set transistor SW2 non-connected. Then, the signals TRG1 and 2 go to the high level. As a result, signal charges (here, photoelectrons) accumulated by photoelectric conversion of the photodiode PD of each pixel in the first and second rows are transferred to the floating diffusion FD. Since t12 to t13 are similar to those in the control method 1, no description will be given below of t12 to t13.

At time t13, the signals RST3 and 4 and SEL_R go to the low level, and SEL_L goes to the high level. As a result, the reset transistor SW2 of each pixel in the third and fourth rows turns on when the high-level reset signal RST2 is input to the gate of the reset transistor SW2 through the signal line Rst2 to reset the floating diffusion FD to the voltage of the constant voltage source VSS.

Next, at time t14, the signals RST3 and 4 go to the low level to make the set transistor SW2 non-connected. Then, the signals TRG3 and 4 go to the high level. As a result, signal charges (here, photoelectrons) accumulated by photoelectric conversion of the photodiode PD of each pixel in the third and fourth rows are transferred to the floating diffusion FD. The processing between t15 to t17 is similar to that in the control method 1, so that no description will be given below of the processing.

Similarly, the processing between time t17 and time t28 is different from that in the control method 1 in that the accumulated signal charges (here, photoelectrons) of the even-numbered rows are transferred to the floating diffusion FD between time t17 and time t19, between time t21 and time t23, and between time t22 to time t27. The subsequent processing is similar to that in the control method 1, so that no description will be given below of the subsequent processing.

As described above, FIGS. 34 to 36 illustrate the AD conversion processing performed on the even-numbered rows, and correspond to the processing illustrated in FIGS. 28 to 30, respectively. As described above with reference to FIGS. 31 to 33, the accumulated signal charges (here, photoelectrons) of the even-numbered rows have already been transferred to the floating diffusion FD between time t10 and time t12, between time t13 and time t13, between time t17 and time t19, between time t22 and time t23, and between time t25 and time t25. Therefore, the processing illustrated in FIGS. 34 to 36 is different from the processing illustrated in FIGS. 28 to 30 in that the transfer of the accumulated signal charges of the even-numbered rows to the floating diffusion FD is not performed. The subsequent processing is similar to that in the control method 1, so that no description will be given below of the subsequent processing.

As described above, according to the present embodiment, the first selection unit 12b selects the ((n−1)×4+m)-th vertical signal line VSL in a case where the selector control signal (left) (SEL_L) is the "0" selection signal. Furthermore, the ((n−1)×4+m+2)-th vertical signal line VSL is selected in a case where the selector control signal (left) (SEL_L) is the "1" selection signal. The second selection unit 16b and the second selection unit 16a select the ((n−1)×4+m+2)-th vertical signal line VSL in a case where the selector control signal (right) (SEL_R) is the "0" selection signal. Furthermore, the ((n−1)×4+m+4)-th vertical signal line VSL is selected in a case where the selector control signal (right) (SEL_R) is the "1" selection signal. As a result, it is possible to calculate, by electrically connecting, in a sequential manner, the pixels in the odd-numbered rows of the pixel array unit 10 to the corresponding vertical signal lines VSL and performing control to make the values of SEL_L and SEL_R alternately different from each other, a difference between the red pixel in the odd-numbered row in the base unit G10 and the red pixel in the odd-numbered row in another base unit G10 located in the upper left diagonal or upper right diagonal of the base unit G10 and a difference between the green pixel in the odd-numbered row in the base unit G10 and the green pixel in the odd-numbered row in another base unit G10 located in the upper left diagonal or upper right diagonal of the base unit G10. Similarly, it is possible to calculate, by electrically connecting, in a sequential manner, the pixels in the even-numbered rows of the pixel array unit 10 to the corresponding vertical signal lines VSL and performing control to make the values of SEL_L and SEL_R alternately different from each other, a difference between the green pixel in the even-numbered row in the base unit G10 and the green pixel in the even-numbered row in another base unit G10 located in the upper left diagonal or upper right diagonal of the base unit G10 and a difference between the blue pixel in the even-numbered row in the base unit G10 and the blue pixel in the even-numbered row in another base unit G10 located in the upper left diagonal or upper right diagonal of the base unit G10.

Fourth Embodiment

An electronic apparatus according to a fourth embodiment is different from the electronic apparatus according to the first embodiment in that the FD is shared by the base pixel unit G10 of two pixels by two pixels. Hereinafter, a difference from the electronic apparatus according to the first embodiment will be described.

Figure 37:
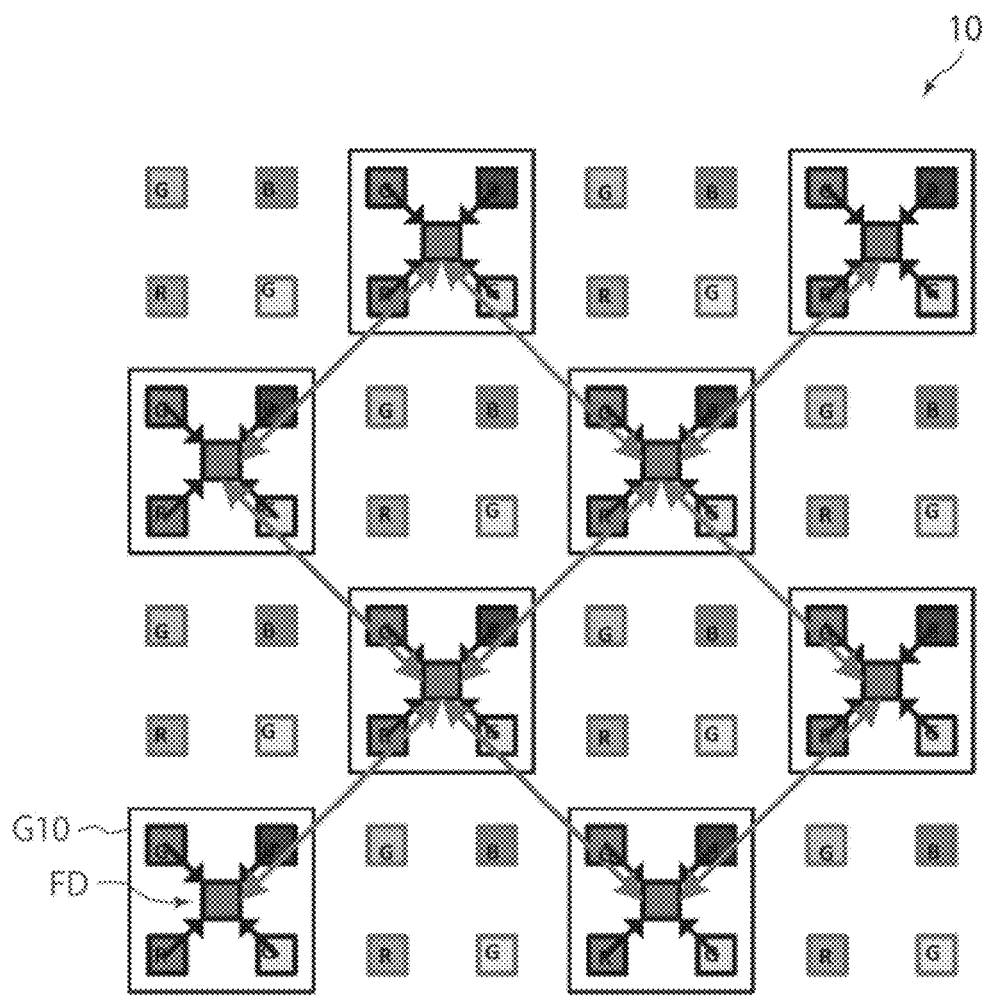
FIG. 37 is a diagram illustrating a difference processing example performed under a first control method on the pixel array unit according to a fourth embodiment.

FIG. 37 is a diagram illustrating a difference processing example performed under a first control method on a pixel array unit 10 according to the fourth embodiment. As illustrated in FIG. 37, in difference processing according to the present embodiment, the difference processing can be performed between base pixel groups G10 of the Bayer array. One shared FD is arranged in the base pixel group G10. Therefore, in the difference processing under the first control method, charges accumulated in the 2×2 pixels in the base pixel group G10 are added up by the FD, and the difference processing is performed.

Accordingly, by adding up the four pixels, the sensitivity increases fourfold, and color information disappears. The processing of generating the difference information is performed between the base pixel groups G10. Therefore, the difference information is generated between the base pixel groups G10 located diagonally relative to each other.

Figure 38:
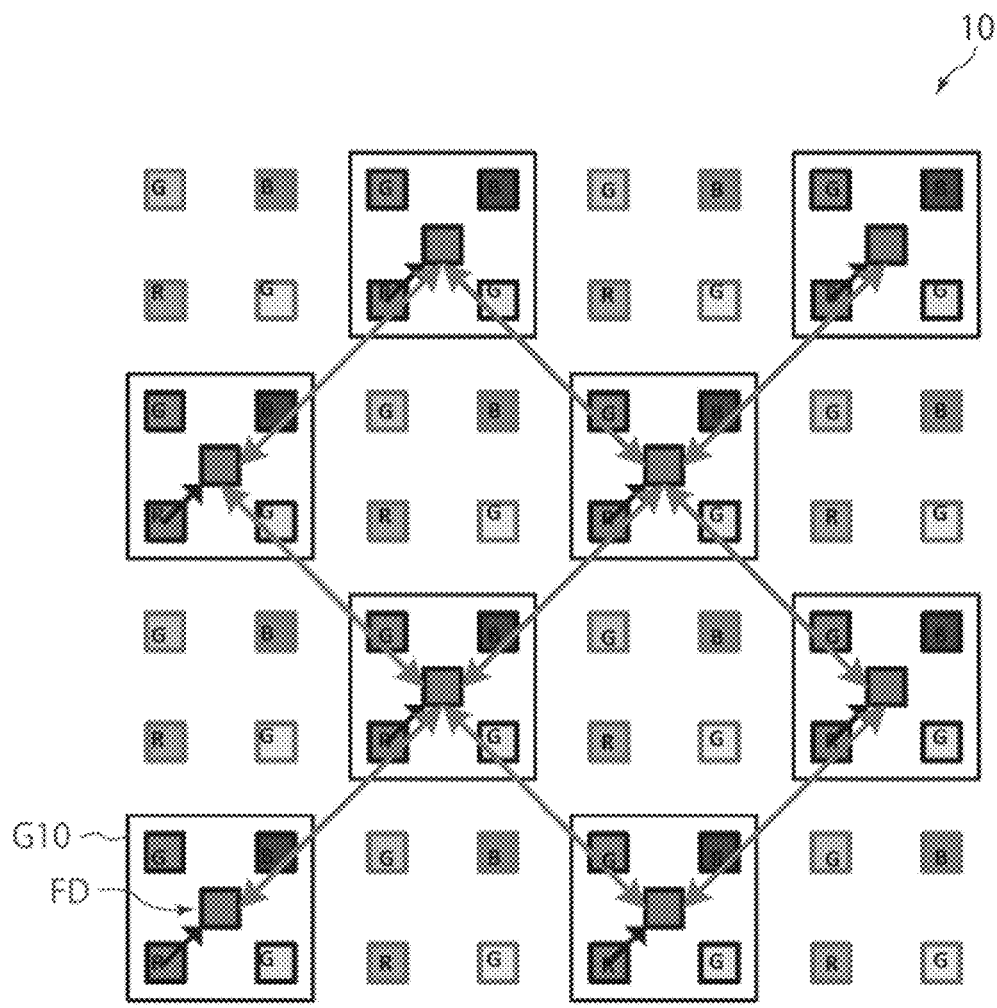
FIG. 38 is a diagram illustrating a difference processing example performed under a second control method on the pixel array unit according to the fourth embodiment.

FIG. 38 is a diagram illustrating a difference processing example performed under a second control method on the pixel array unit 10 according to the fourth embodiment. As illustrated in FIG. 38, under the second control method, the difference processing is performed for each color component. For example, it is assumed that only charges accumulated in the red pixel are transferred to the FD, and the processing of generating the difference information is performed between the base pixel groups G10. Therefore, the difference information is generated between the red pixels of the base pixel groups G10 located diagonally relative to each other. Repeating, for the green pixels and the blue pixels, processing similar to the processing for the red pixels generates difference information between the green pixels of the base pixel groups G10 located diagonally relative to each other and difference information between the blue pixels of the base pixel groups G10 located diagonally relative to each other. Furthermore, under the second control method, it is also possible to perform the difference processing by adding up two green pixels. It is therefore possible to shorten the time taken for the difference processing.

Figure 39:
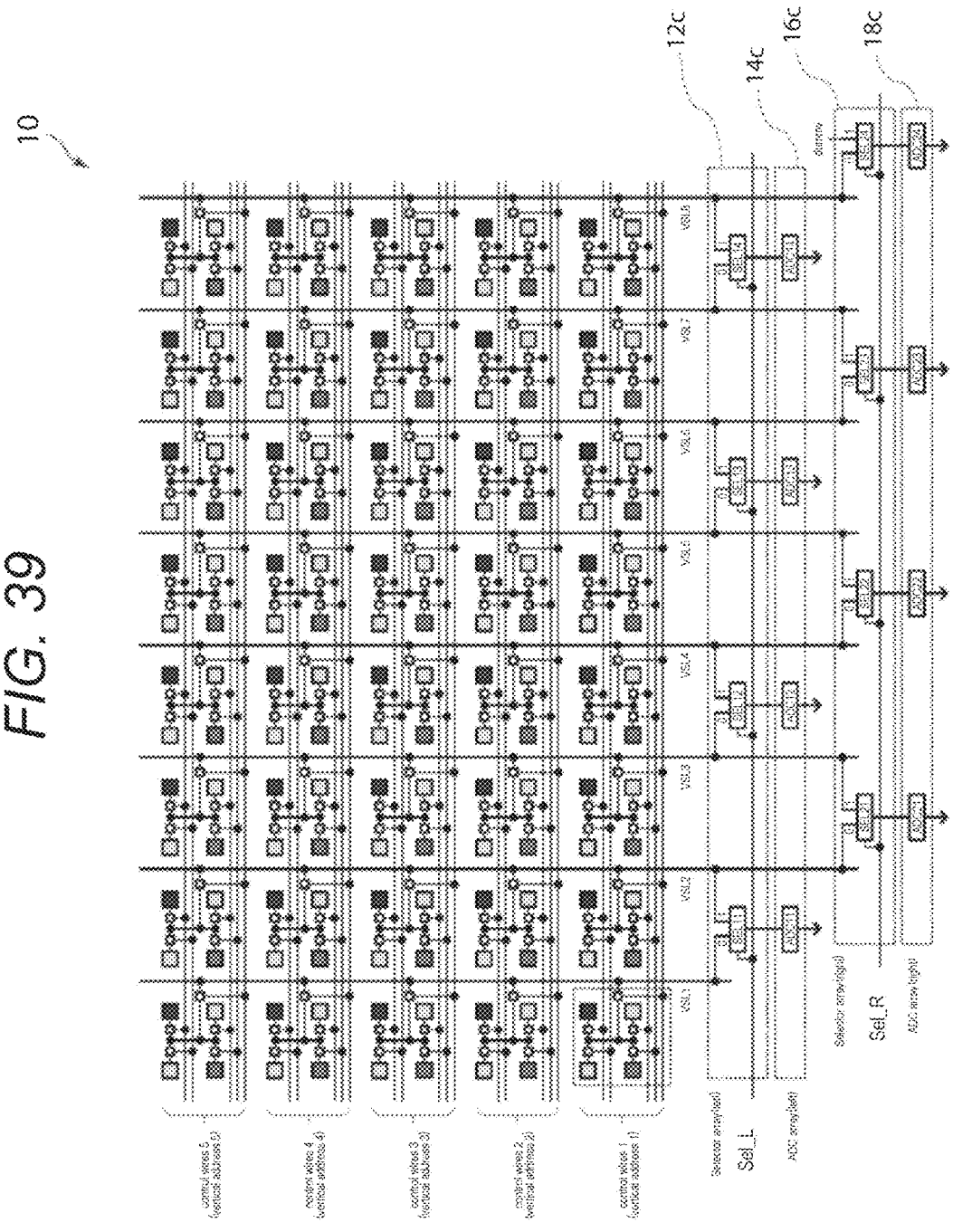
FIG. 39 is a diagram illustrating an example of a circuit of the pixel array unit according to the fourth embodiment.

FIG. 39 is a diagram illustrating an example of a circuit including the pixel array unit 10, a first selection unit 12c, a first AD conversion unit 14c, a second selection unit 16c, and a second AD conversion unit 18c according to the fourth embodiment. Note that the description will be given on the assumption that the number of pixels is 8×8 or 10×8 for the sake of simplicity, but the number is not limited to either 8×8 or 10×8.

As illustrated in FIG. 39, the first selection unit 12c includes selection units SEL11 to 14. The first selection unit 12c selects one of a pair of two signal lines, the (((n−1)×2+m)-th signal line and the ((n−1)×2+m+1))-th signal line (n is 1 to M/2, and m is 1 or 2), among the plurality of vertical signals (VSL) of the pixel array unit 10, and outputs a signal of the selected signal line to the first AD conversion unit 14c. Here, the number of the plurality of vertical signals (VSL) of the pixel array unit 10 is, for example, 1 to M (for example, M is an even number).

In a case where the difference image is generated, the first selection unit 12c selects the ((n−1)×2+m)-th vertical signal line VSL in a case where the selector control signal (left) (SEL_L) is the "0" selection signal. Furthermore, the ((n−1)×2+m+1)-th vertical signal line VSL is selected in a case where the selector control signal (left) (SEL_L) is the "1" selection signal. As described above, in a case where the difference image is generated, the first selection unit 12c alternately selects one of the signals of vertical signals (VSL) adjacent to each other.

The first AD conversion unit 14c includes AD converters ADC11 to 14. The AD converters ADC11 to 14 are each connected to a corresponding one of the selection units SEL11 to 14.

The second selection unit 16c includes selection units SEL21 to 24. The first selection unit 12c selects one of a pair of two signal lines, the (((n−1)×2+m+1)-th signal line and the ((n−1)×4+m+2))-th signal line (n is 1 to M/4, and m is 1 or 2), among the plurality of vertical signals (VSL) of the pixel array unit 10, and outputs a signal of the selected signal line to the second AD conversion unit 18c.

In a case where the difference image is generated, the second selection unit 16c selects the ((n−1)×2+m+1)-th vertical signal line VSL in a case where the selector control signal (right) (SEL_R) is the "0" selection signal. Furthermore, the ((n−1)×4+m+2)-th vertical signal line VSL is selected in a case where the selector control signal (right) (SEL_R) is the "1" selection signal. As described above, in a case where the difference image is generated, the first selection unit 16b alternately selects one of the signals of vertical signals (VSL) adjacent to each other.

The second AD conversion unit 18c includes AD converters ADC21 to 24. The AD converters ADC21 to 24 are each connected to a corresponding one of the selection units SEL21 to 24. As described above, in a manner similar to the electronic apparatus 100 of the first embodiment, the circuit structure is divided into two groups: the first selection unit 12c and the first AD conversion unit 14c, and the second selection unit 16c and the second AD conversion unit 18c.

As described above, unlike the electronic apparatus 100 according to the first embodiment, the FD is shared by the base pixel group G10 of two pixels by two pixels. With such a circuit, it is possible to reduce a wiring space required for reading to secure a pixel area. It is therefore possible to increase the pixel sensitivity. Furthermore, the number of vertical signal lines (VSL) used for reading is also reduced, and the number of AD converters is reduced accordingly, so that the circuit can be reduced in size. On the other hand, the number of pixels that can be subjected to AD conversion at a time decreases, and the frame rate drops accordingly. Note that, in the present embodiment, one VSL is provided for two pixels, so that the selection unit SEL is provided between the vertical signal lines VSL in order to acquire a diagonal difference. This configuration is divided into two groups to control the direction of the selection unit SEL.

First, in the difference operation of the control 1, the image control unit 8 selects the control line 1 (control wires 1) and does not select the control lines 2 to (control wires 2 to). As a result, the base pixel groups in the first row are connected to the vertical signal lines VSL. In the present embodiment, the arrangement of the base pixel groups G10 in the row direction is referred to as one row, and the arrangement of the base pixel groups G10 in the column direction is referred to as one column. Therefore, the control line 1 controls a plurality of base pixel groups G10 arranged in one row.

Next, the image control unit 8 sets SEL_L=0 and SEL_R=1. As a result, data of the base pixel group G10 electrically connected to VSL1 is input to the AD converter ADC11. Similarly, pixel data electrically connected to VSL3 is input to the AD converters ADC12 and 21. Pixel data of the base pixel groups G10 in the row of the control line 1 (control wires 1) is also input to the other AD converters in a similar procedure. Here, the AD converters ADC11 to 14 and 21 to 24 are each subjected to auto-zero (AZ), so that the level of the signal voltage output from the corresponding base pixel group G10 is set to the reference value of each ADC, that is, the value of 0.

Next, the image control unit 8 selects the control line 2 and does not select the control lines 1, and 3 to 5. As a result, pixel data of each base pixel groups G10 in the row of the control line 2 is electrically connected to the corresponding VSL (vertical signal line).

Next, when SEL_L=1 and SEL_R=0, the image control unit 8 inputs pixel data of the base pixel group G10 electrically connected to the vertical signal line VSL2 to the AD converters ADC11 and 21. Pixel data of the base pixel groups G10 in the row of the control line 2 (control wires 2) is also input to the other AD converters in a similar procedure.

Next, in this state, the AD converters ADC11 to 14 and 21 to 24 perform AD conversion. As a result, ADC11 and ADC12 can each acquire a difference between a 2×2 pixel unit and another 2×2 pixel unit located in the upper right diagonal of the 2×2 pixel unit, and ADC21 can acquire a difference between a 2×2 pixel unit and another 2×2 pixel unit located in the upper left diagonal of the 2×2 pixel unit. This procedure is repeated across the entire frame as illustrated in FIGS. 37 and 38, so as to acquire a difference between a 2×2 pixel unit and another 2×2 pixel unit located in the upper right diagonal of the 2×2 pixel unit and a difference between a 2×2 pixel unit and another 2×2 pixel unit located in the upper left diagonal of the 2×2 pixel unit.

Figure 40:
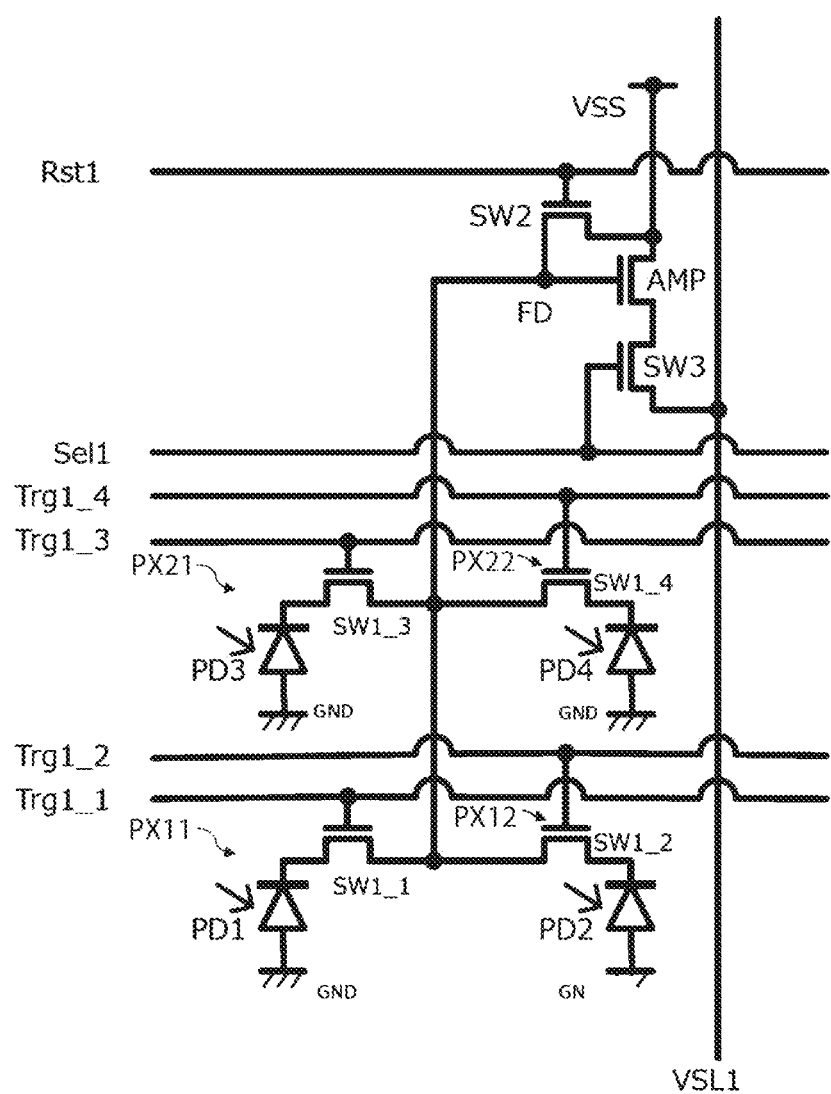
FIG. 40 is a diagram illustrating a circuit configuration example of a base pixel group of a Bayer array according to the fourth embodiment.

FIG. 40 is a diagram illustrating a circuit configuration example of the base pixel group G10 of the Bayer array according to the fourth embodiment. As illustrated in FIG. 40, the base pixel group G10 includes a plurality of pixels PX11, 12, 21, and 22, a reset transistor SW2, an amplification transistor AMP, a selection transistor SW3, and a floating diffusion FD. The pixel PX11 is a red pixel, the pixels PX12 and 21 are green pixels, and the pixel PX22 is a blue pixel.

The basic operation of the reset transistor SW2, the amplification transistor AMP, the selection transistor SW3, and the floating diffusion FD is similar to that of the circuit configuration of the base pixel group G10 according to the first embodiment, so that no description will be given below of the basis operation.

The pixels PX11, 12, 21, and 22 include photodiodes PD1 to 4 and transfer transistors SW1_1, 1_2, 1_3, and 1_4, respectively. The transfer transistors SW1_1, 1_2, 1_3, and 1_4 have their sources connected to the floating diffusion FD and have their drains connected to the photodiodes PD1 to 4, respectively. Furthermore, the transfer transistors SW1_1, 1_2, 1_3, and 1_4 have their gates connected to control lines Trg1_1, 1_2, 1_3, and 1_4, respectively. For example, the control line 1 (control wires 1) includes a bundle of the control lines Trg1_1, 1_2, 1_3, 1_4, SEL1, and RST1.

Under the first control method, with such a configuration, after the floating diffusion FD is reset, the high-level signal is applied to the gates of the transfer transistors SW1_1, 1_2, 1_3, and 1_4 via the control lines Trg1_1, 1_2, 1_3, and 1_4. As a result, charges accumulated in the photodiodes PD1 to 4 are transferred to and added up in the floating diffusion FD. In this case, adding up the accumulated charges makes the signal stronger, so that the sensitivity increases linearly.

On the other hand, under the second control method, the high-level signal is applied to the gate of any one of the transfer transistors SW1_1, 1_2, 1_3, and 1_4 via a corresponding one of the control lines Trg1_1, 1_2, 1_3, and 1_4. As a result, only the charges accumulated in one of the photodiodes PD1 to 4 can be transferred to the floating diffusion FD. In this case, the charges accumulated in one pixel can be amplified and output as a pixel signal.

For example, under the second control method, in a case where charges accumulated in the red pixel is amplified and output as a pixel signal, the high-level signal is applied to the gate of the transfer transistor SW1_1 via the control line Trg1_1. As a result, only the charges accumulated in the photodiode PD1 can be transferred to the floating diffusion FD. Similarly, only charges accumulated in each of the other pixels can be transferred to the floating diffusion FD.

(First Control of Fourth Embodiment)

Figure 41:
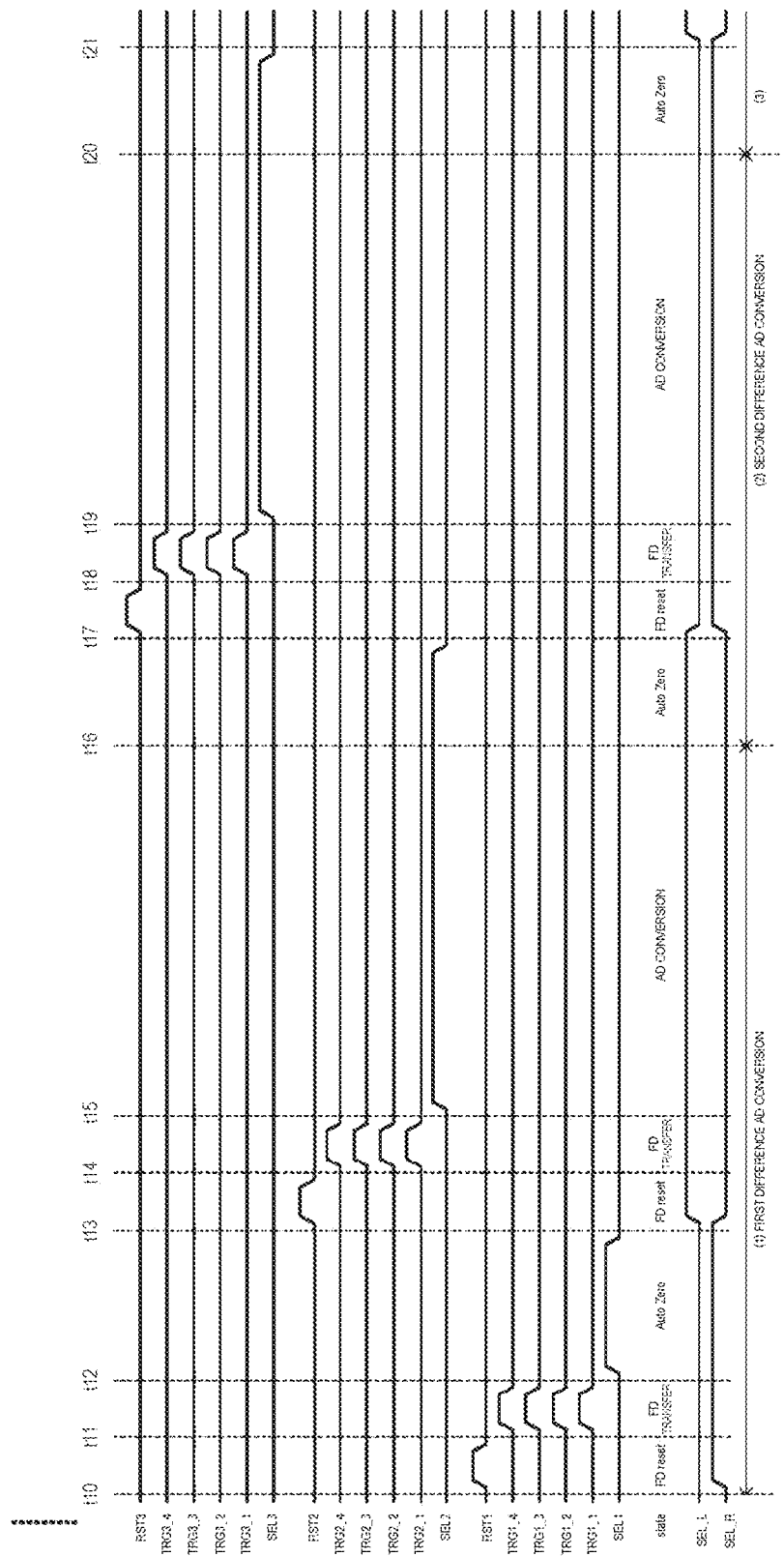
FIG. 41 is a time chart illustrating the difference processing example from time t10 to time t21 according to the fourth embodiment.
Figure 42:
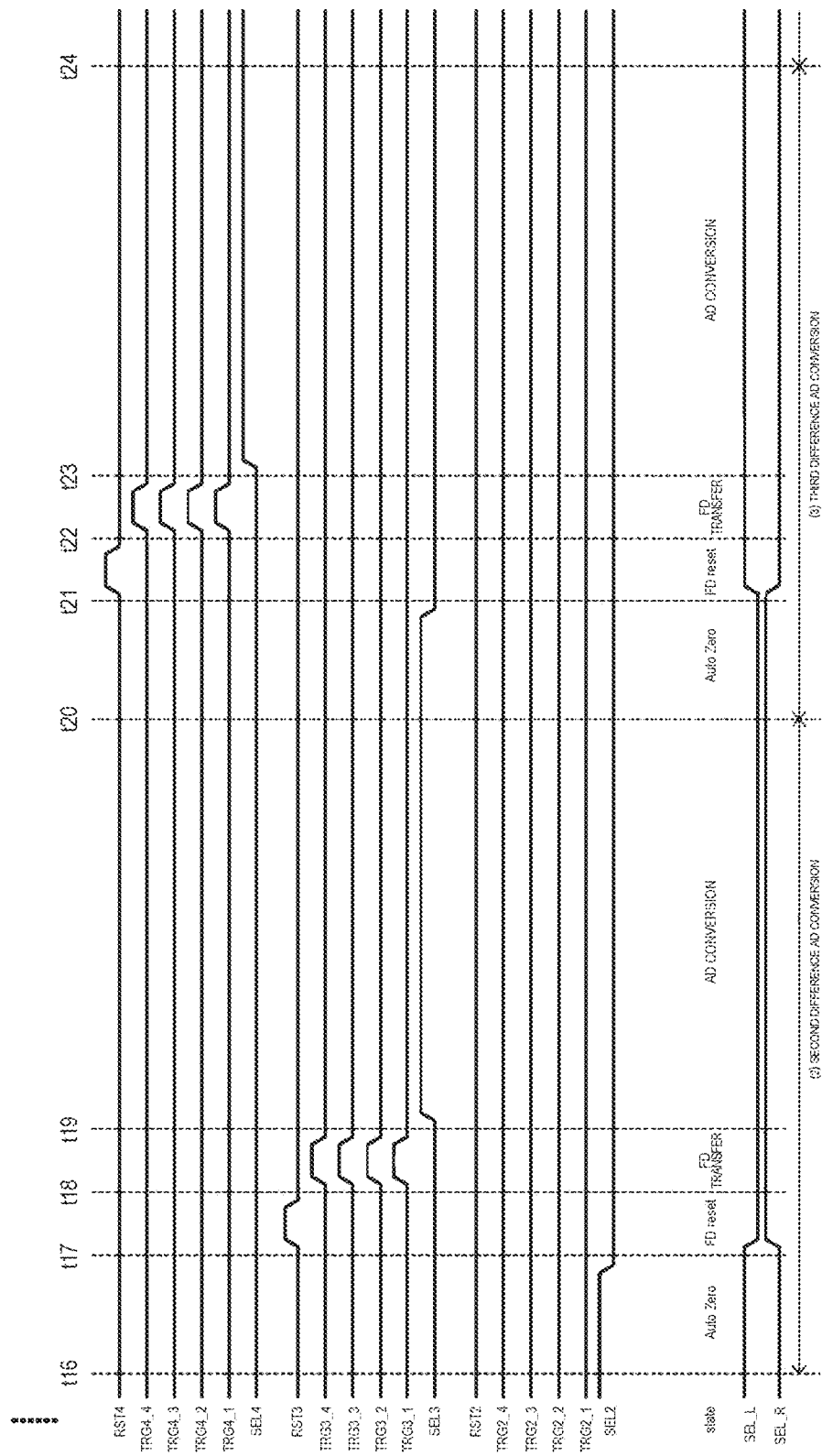
FIG. 42 is a time chart including the difference processing example from time t22 to time t24 according to the fourth embodiment.
Figure 43:
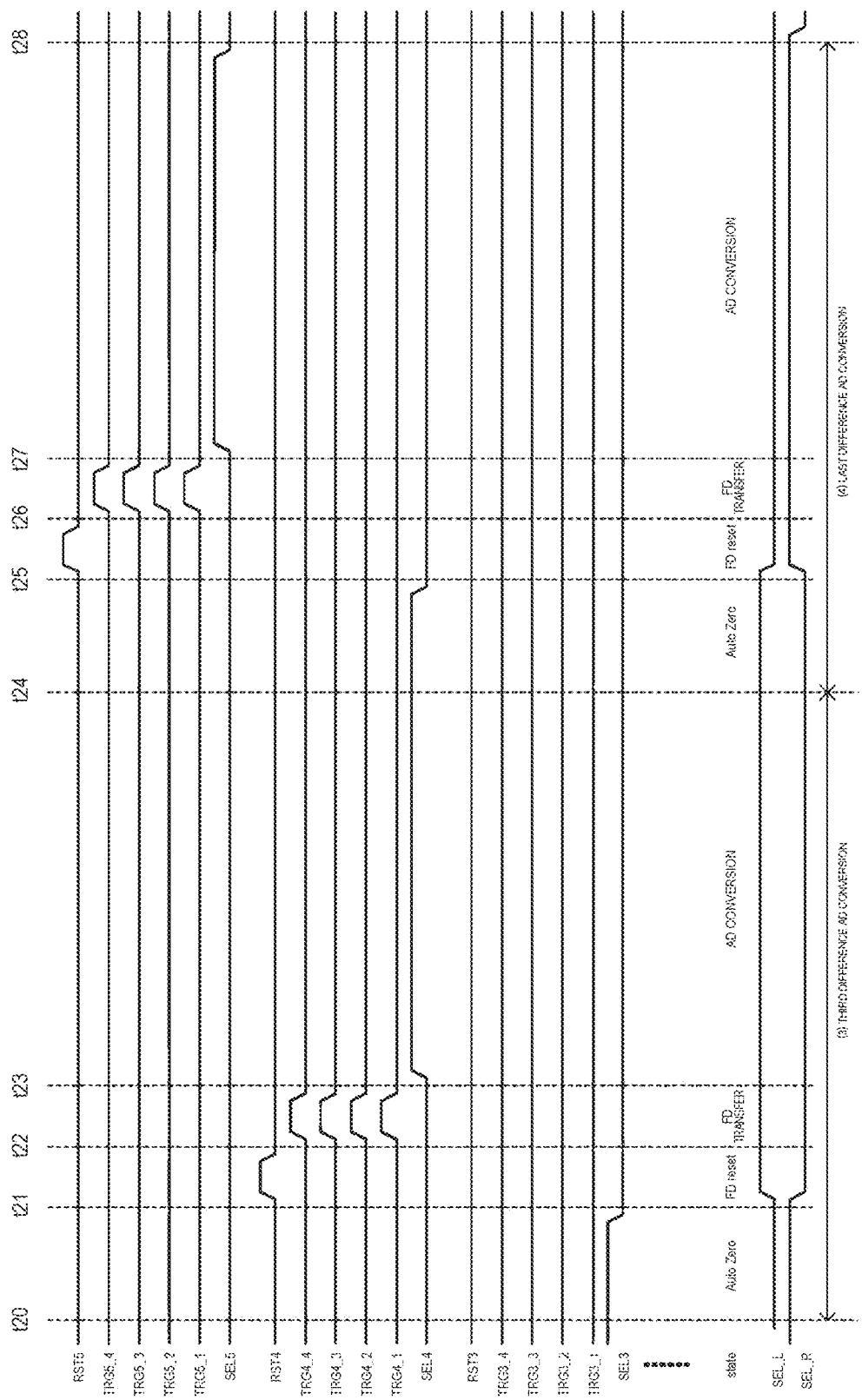
FIG. 43 is a time chart including the difference processing example performed on the last row according to the fourth embodiment.

Here, a difference processing example of the first control of the fourth embodiment will be described in detail with reference to FIGS. 41 to 43. FIG. 41 is a time chart illustrating the difference processing example according to the fourth embodiment from time t10 to time t21, FIG. 42 is a time chart including the difference processing example according to the fourth embodiment from time t22 to time t24, and FIG. 43 is a time chart including the difference processing example according to the fourth embodiment performed on the last row. The vertical axis indicates signals RST5, TRG5_4 to 5_1, SEL5, RST4, TRG4_4 to 4_1, SEL4, RST3, TRG3_4 to 3_1, SEL3, RST2, TRG2_4 to 2_1, SEL2, SEL1, RST1, TRG1_4 to 1_1, and SEL1, an AD converter state State, signals SEL_L, and SEL_R from the top, and the horizontal axis indicates time.

As illustrated in FIG. 41, first, at time t10, the signal RST1 and SEL_R go to the high level. As a result, the reset transistor SW2 of the base pixel group G10 in the first row turns on when the high-level reset signal RST1 is input to the gate of the reset transistor SW2 through the signal line Rst1 to reset the floating diffusion FD to the voltage of the constant voltage source VSS.

Next, at time t11, the signal RST1 goes to the low level to make the set transistor SW2 non-connected. Then, the signals TRG1_1 to 1_4 go to the high level. As a result, signal charges (here, photoelectrons) accumulated by photoelectric conversion of the photodiodes PD1 to 4 of the pixels of the base pixel group G10 are transferred to and added up in the floating diffusion FD.

Next, at time t12, the signal SEL1 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level. As a result, the AD converter ADC11 is electrically connected to the vertical signal line VSL1, and the AD converters ADC12 and 21 are connected to the vertical signal line VSL3. The other AD converters are also electrically connected to the corresponding vertical signal lines VSL according to a similar rule.

Subsequently, between time t12 and time t14, the AZ units 40 and 42 of the AD converters ADC11 to 14 and 21 to 24 perform auto-zero (AZ) to set the output signal of the base pixel group G10 to the reference value (zero value). Thereafter, the AZ circuit stores this offset amount.

At time t12, the signal RST2 and SEL_R go to the low level, and SEL_L goes to the high level. As a result, the reset transistor SW2 of the base pixel group G10 in the second row turns on when the high-level reset signal RST2 is input to the gate of the reset transistor SW2 through the signal line Rst2 to reset the floating diffusion FD to the voltage of the constant voltage source VSS.

Next, at time t14, the signal RST2 goes to the low level to make the set transistor SW2 non-connected. Then, the signal TRG4 goes to the high level. Then, the signals TRG1_1 to 1_4 go to the high level. As a result, signal charges (here, photoelectrons) accumulated by photoelectric conversion of the photodiodes PD1 to 4 of the pixels of the base pixel group G10 are transferred to and added up in the floating diffusion FD.

Next, at time t15, the signal SEL2 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level. As a result, the AD converters ADC11 and 21 are electrically connected to the vertical signal line VSL2, and the AD converter ADC12 is electrically connected to the vertical signal line VSL4. The other AD converters are also electrically connected to the corresponding vertical signal lines VSL according to a similar rule.

Subsequently, between time t15 and time t16, the AD converters ADC11 to 14 and 21 to 24 perform AD conversion. As described above, the AD converters ADC11 to 14 and 21 to 24 each perform AD conversion to output a difference between the base pixel group G10 in the first row and the base pixel group G10 in the second row as data.

Next, between time t16 and time t17, a state where the signal SEL2 is at the high level, SEL_L is at the high level, and SEL_R is at the low level is maintained. Therefore, the AZ units 40 and 42 of the AD converters ADC11 to 14 and 21 to 24 perform auto-zero (AZ) to set the output signal of the base pixel group G10 in the second row to the reference value (zero value). Thereafter, the AZ circuit stores this offset amount.

At time t17, the signal RST3 and SEL_R go to the high level, and SEL_L goes to the low level. As a result, the reset transistor SW2 of the base pixel group G10 in the third row turns on when the high-level reset signal RST3 is input to the gate of the reset transistor SW2 through the signal line Rst3 to reset the floating diffusion FD to the voltage of the constant voltage source VSS.

Next, at time t18, the signal RST3 goes to the low level to make the set transistor SW2 non-connected. Then, the signals TRG3_1 to 3_4 go to the high level. As a result, signal charges (here, photoelectrons) accumulated by photoelectric conversion of the photodiodes PD1 to 4 of the base pixel group G10 in the third row are transferred to and added up in the floating diffusion FD.

Next, at time t19, the signal SEL3 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level. As a result, the AD converter ADC11 is electrically connected to the vertical signal line VSL1, the AD converter ADC12 is electrically connected to the vertical signal line VSL3, and the data of each base pixel group G10 is input to the corresponding AD converter accordingly. Furthermore, since SEL_R is at the high level, the AD converter ADC21 is electrically connected to the vertical signal line VSL3. The other AD converters are also electrically connected to the corresponding vertical signal lines VSL according to a similar rule.

Subsequently, between time t19 and time t20, the AD converters ADC11 to 14 and 21 to 24 perform AD conversion. As described above, the AD converters ADC11 to 14 and 21 to 24 each perform AD conversion to output a difference between the base pixel group G10 in the second row and the base pixel group G10 in the third row as data.

Next, between time t20 and time t21, a state where the signal SEL3 is at the high level, SEL_L is at the low level, and SEL_R is at the high level is maintained. Therefore, the AZ units 40 and 42 of the AD converters ADC11 to 14 and 21 to 24 perform auto-zero (AZ) to set the output signal of the base pixel group G10 in the third row to the reference value (zero value). Thereafter, the AZ circuit stores this offset amount.

As illustrated in FIG. 42, at time t21, the signal RST4 and SEL_L go to the high level, and SEL_R goes to the low level. As a result, the reset transistor SW2 of each pixel in the fourth row turns on when the high-level reset signal RST4 is input to the gate of the reset transistor SW2 through the signal line Rst4 to reset the floating diffusion FD to the voltage of the constant voltage source VSS.

Next, at time t22, the signal RST4 goes to the low level to make the reset transistor SW2 non-connected. Then, the signals TRG4_1 to 4_4 go to the high level. As a result, signal charges (here, photoelectrons) accumulated by photoelectric conversion of the photodiodes PD1 to 4 of the base pixel group G10 in the fourth row are transferred to and added up in the floating diffusion FD.

Next, at time t23, the signal SEL4 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the high level, and SEL_R is at the low level. As a result, the AD converters ADC11 and 21 are electrically connected to the vertical signal line VSL2, and the AD converter ADC12 is electrically connected to the vertical signal line VSL4. The other AD converters are also electrically connected to the corresponding vertical signal lines VSL according to a similar rule.

Subsequently, between time t23 and time t24, the AD converters ADC11 to 14 and 21 to 24 perform AD conversion. As described above, the AD converters ADC11 to 14 and 21 to 24 each perform AD conversion to output a difference between the base pixel group G10 in the third row and the base pixel group G10 in the fourth row as data. As described above, a difference in luminance information is extracted by adding up the four pixels, so that it is possible to acquire the difference image with one-fourth of the time and with one-fourth of the power consumption compared to normal image output.

As illustrated in FIG. 43, between time t24 and time t25, a state where the signal SEL4 is at the high level, SEL_L is at the high level, and SEL_R is at the low level is maintained. Therefore, the AZ units 40 and 42 of the AD converters ADC11 to 14 and 21 to 24 perform auto-zero (AZ) to set the output signal of the base pixel group G10 in the fourth row to the reference value (zero value). Thereafter, the AZ circuit stores this offset amount.

At time t25, the signals RST5 and SEL_R go to the high level, and SEL_L goes to the low level. As a result, the reset transistor SW2 of the base pixel group G10 in the fifth row turns on when the high-level reset signal RST3 is input to the gate of the reset transistor SW2 through the signal line Rst3 to reset the floating diffusion FD to the voltage of the constant voltage source VSS.

Next, at time t26, the signal RST3 goes to the low level to make the set transistor SW2 non-connected. Then, the signals TRG5_1 to 5_4 go to the high level. As a result, signal charges (here, photoelectrons) accumulated by photoelectric conversion of the photodiodes PD1 to 4 of the base pixel group G10 in the fifth row are transferred to and added up in the floating diffusion FD.

Next, at time t27, the signal SEL5 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level. As a result, the AD converter ADC11 is electrically connected to the vertical signal line VSL1, the AD converter ADC12 is electrically connected to the vertical signal line VSL3, and the data of each base pixel group G10 is input to the corresponding AD converter accordingly. Furthermore, since SEL_R is at the high level, the AD converter ADC21 is electrically connected to the vertical signal line VSL3. The other AD converters are also electrically connected to the corresponding vertical signal lines VSL according to a similar rule.

Subsequently, between time t27 and time t28, the AD converters ADC11 to 14 and 21 to 24 perform AD conversion. As described above, the AD converters ADC11 to 14 and 21 to 24 each perform AD conversion to output a difference between the base pixel group G10 in the fourth row and the base pixel group G10 in the fifth row as data. Then, the signal SEL5 is set to low level to bring the AD conversion to an end.

(Second Control of Fourth Embodiment)

Figure 44:
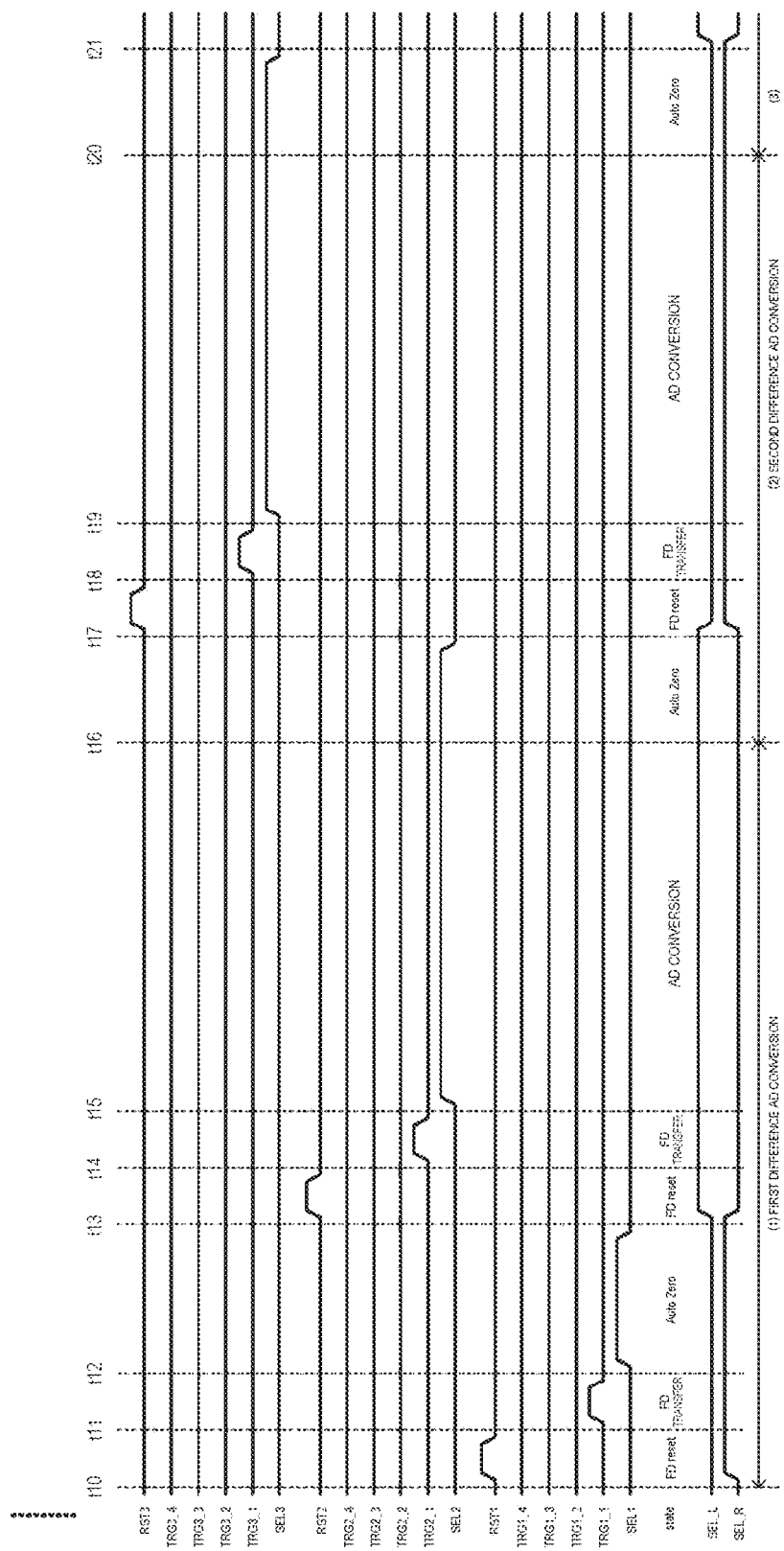
FIG. 44 is a time chart illustrating the difference processing example from time t10 to time t21 according to the second control.
Figure 45:
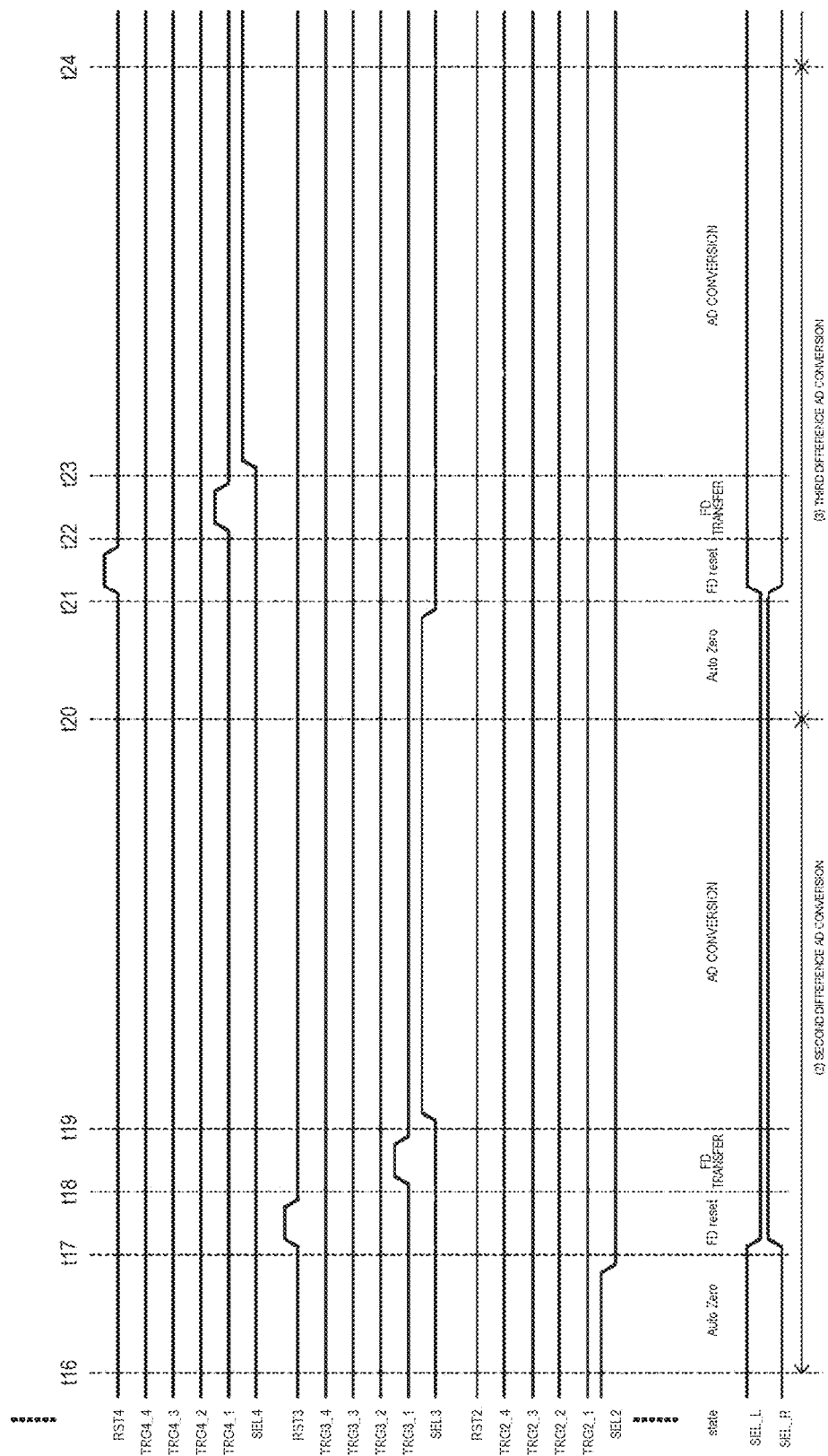
FIG. 45 is a time chart including the difference processing example from time t22 to time t24 according to the second control.
Figure 46:
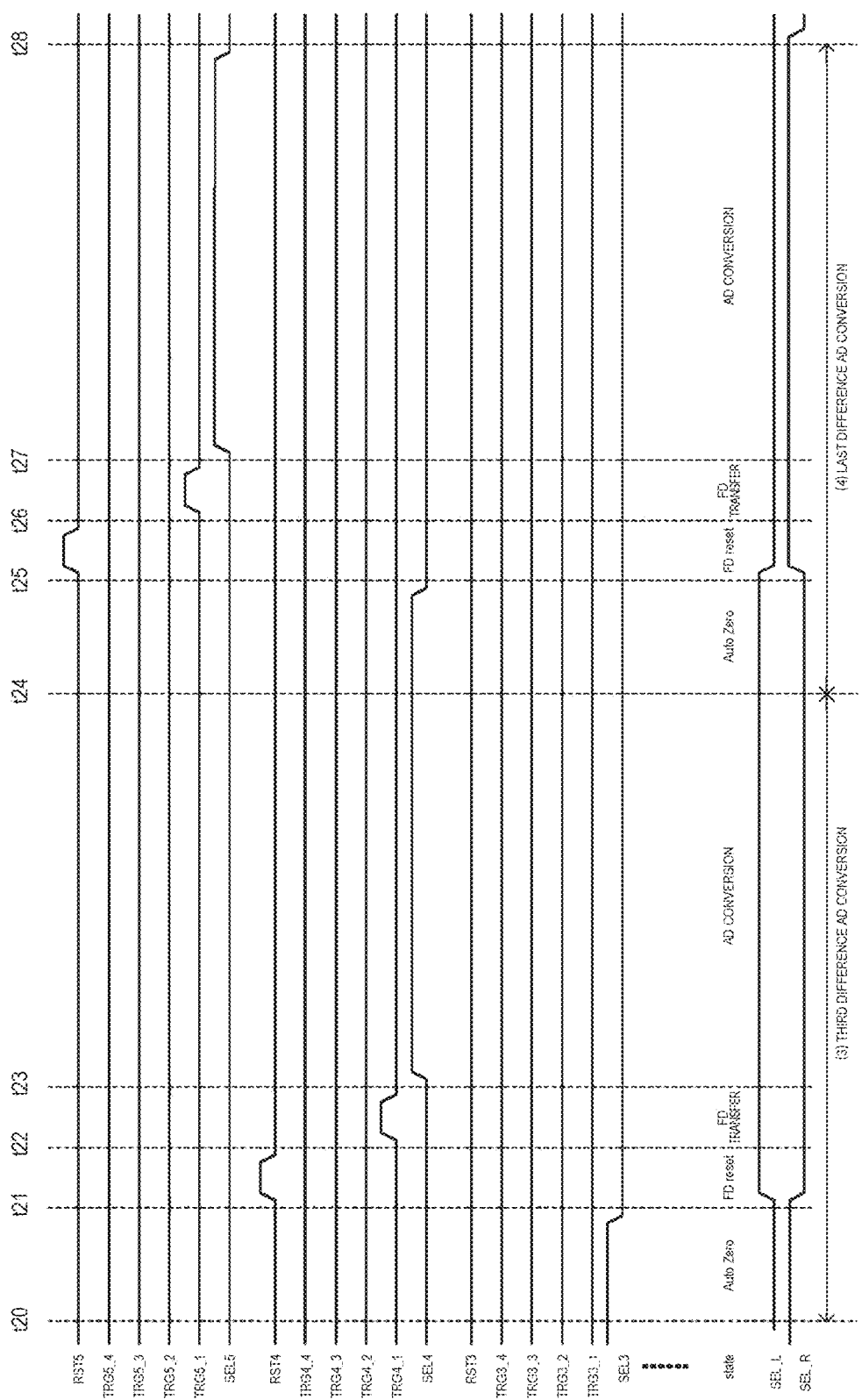
FIG. 46 is a time chart including the difference processing example performed on the last row according to the second control.

Here, a difference processing example of the second control of the fourth embodiment will be described in detail with reference to FIGS. 44 to 46. FIG. 44 is a time chart illustrating the difference processing example according to the second control from time t10 to time t21, FIG. 45 is a time chart including the difference processing example according to the second control from time t22 to time t24, and FIG. 46 is a time chart including the difference processing example according to the second control for the last row. The vertical axis indicates signals RST5, TRG5_4 to 5_1, SEL5, RST4, TRG4_4 to 4_1, SEL4, RST3, TRG3_4 to 3_1, SEL3, RST2, TRG2_4 to 2_1, SEL2, SEL1, RST1, TRG1_4 to 1_1, and SEL1, an AD converter state State, signals SEL_L, and SEL_R from the top, and the horizontal axis indicates time. As described above, the second control example corresponds to a control example obtained by making the first control example color-compatible. The circuit configuration is similar to that of the first control example, and the control method is different.

As illustrated in FIG. 44, first, at time t10, the signal RST1 and SEL_R go to the high level. As a result, the reset transistor SW2 of the base pixel group G10 in the first row turns on when the high-level reset signal RST1 is input to the gate of the reset transistor SW2 through the signal line Rst1 to reset the floating diffusion FD to the voltage of the constant voltage source VSS.

Next, at time t11, the signal RST1 goes to the low level to make the set transistor SW2 non-connected. Then, the signal TRG1_1 goes to the high level. As a result, signal charges (here, photoelectrons) accumulated by photoelectric conversion of the photodiode PD1 of the pixel (corresponding to the red pixel) of the base pixel group G10 are transferred to and added up in the floating diffusion FD.

Next, at time t12, the signal SEL1 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level. As a result, the AD converter ADC11 is electrically connected to the vertical signal line VSL1, and the AD converters ADC12 and 21 are connected to the vertical signal line VSL3. The other AD converters are also electrically connected to the corresponding vertical signal lines VSL according to a similar rule.

Subsequently, between time t12 and time t14, the AZ units 40 and 42 of the AD converters ADC11 to 14 and 21 to 24 perform auto-zero (AZ) to set the output signal of the base pixel group G10 to the reference value (zero value). Thereafter, the AZ circuit stores this offset amount.

At time t12, the signal RST2 and SEL_R go to the low level, and SEL_L goes to the high level. As a result, the reset transistor SW2 of the base pixel group G10 in the second row turns on when the high-level reset signal RST2 is input to the gate of the reset transistor SW2 through the signal line Rst2 to reset the floating diffusion FD to the voltage of the constant voltage source VSS.

Next, at time t14, the signal RST2 goes to the low level to make the set transistor SW2 non-connected. Then, the signal TRG1_1 goes to the high level. As a result, signal charges (here, photoelectrons) accumulated by photoelectric conversion of the photodiode PD1 of the pixel of the base pixel group G10 are transferred to the floating diffusion FD.

Next, at time t15, the signal SEL2 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level. As a result, the AD converters ADC11 and 21 are electrically connected to the vertical signal line VSL2, and the AD converter ADC12 is electrically connected to the vertical signal line VSL4. The other AD converters are also electrically connected to the corresponding vertical signal lines VSL according to a similar rule.

Subsequently, between time t15 and time t16, the AD converters ADC11 to 14 and 21 to 24 perform AD conversion. As described above, the AD converters ADC11 to 14 and 21 to 24 each perform AD conversion to output a difference between the red pixel of the base pixel group G10 in the first row and the red pixel of the base pixel group G10 in the second row as data.

Next, between time t16 and time t17, a state where the signal SEL2 is at the high level, SEL_L is at the high level, and SEL_R is at the low level is maintained. Therefore, the AZ units 40 and 42 of the AD converters ADC11 to 14 and 21 to 24 perform auto-zero (AZ) to set the output signal of the base pixel group G10 in the second row to the reference value (zero value). Thereafter, the AZ circuit stores this offset amount.

At time t17, the signal RST3 and SEL_R go to the high level, and SELL goes to the low level. As a result, the reset transistor SW2 of the base pixel group G10 in the third row turns on when the high-level reset signal RST3 is input to the gate of the reset transistor SW2 through the signal line Rst3 to reset the floating diffusion FD to the voltage of the constant voltage source VSS.

Next, at time t18, the signal RST3 goes to the low level to make the set transistor SW2 non-connected. Then, the signal TRG3_1 goes to the high level. As a result, signal charges (here, photoelectrons) accumulated by photoelectric conversion of the photodiode PD1 of the base pixel group G10 in the third row are transferred to the floating diffusion FD.

Next, at time t19, the signal SEL3 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level. As a result, the AD converter ADC11 is electrically connected to the vertical signal line VSL1, the AD converter ADC12 is electrically connected to the vertical signal line VSL3, and the data of each base pixel group G10 is input to the corresponding AD converter accordingly. Furthermore, since SEL_R is at the high level, the AD converter ADC21 is electrically connected to the vertical signal line VSL3. The other AD converters are also electrically connected to the corresponding vertical signal lines VSL according to a similar rule.

Subsequently, between time t19 and time t20, the AD converters ADC11 to 14 and 21 to 24 perform AD conversion. As described above, the AD converters ADC11 to 14 and 21 to 24 each perform AD conversion to output a difference between the red pixel of the base pixel group G10 in the second row and the red pixel of the base pixel group G10 in the third row as data.

Next, between time t20 and time t21, a state where the signal SEL3 is at the high level, SEL_L is at the low level, and SEL_R is at the high level is maintained. Therefore, the AZ units 40 and 42 of the AD converters ADC11 to 14 and 21 to 24 perform auto-zero (AZ) to set the output signal of the base pixel group G10 in the third row to the reference value (zero value). Thereafter, the AZ circuit stores this offset amount.

As illustrated in FIG. 45, at time t21, the signal RST4 and SEL_L go to the high level, and SEL_R goes to the low level. As a result, the reset transistor SW2 of the base pixel group G10 in the fourth row turns on when the high-level reset signal RST4 is input to the gate of the reset transistor SW2 through the signal line Rst4 to reset the floating diffusion FD to the voltage of the constant voltage source VSS.

Next, at time t22, the signal RST4 goes to the low level to make the reset transistor SW2 non-connected. Then, the signal TRG4_1 goes to the high level. As a result, signal charges (here, photoelectrons) accumulated by photoelectric conversion of the photodiode PD1 of the base pixel group G10 in the fourth row are transferred to the floating diffusion FD.

Next, at time t23, the signal SEL4 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the high level, and SEL_R is at the low level. As a result, the AD converters ADC11 and 21 are electrically connected to the vertical signal line VSL2, and the AD converter ADC12 is electrically connected to the vertical signal line VSL4. The other AD converters are also electrically connected to the corresponding vertical signal lines VSL according to a similar rule.

Subsequently, between time t23 and time t24, the AD converters ADC11 to 14 and 21 to 24 perform AD conversion. As described above, the AD converters ADC11 to 14 and 21 to 24 each perform AD conversion to output a difference between the red pixel of the base pixel group G10 in the third row and the red pixel of the base pixel group G10 in the fourth row as data. As described above, a difference in luminance information is extracted by adding up the four pixels, so that it is possible to acquire the difference image with one-fourth of the time and with one-fourth of the power consumption compared to normal image output.

As illustrated in FIG. 46, between time t24 and time t25, a state where the signal SEL4 is at the high level, SEL_L is at the high level, and SEL_R is at the low level is maintained. Therefore, the AZ units 40 and 42 of the AD converters ADC11 to 14 and 21 to 24 perform auto-zero (AZ) to set the output signal of the base pixel group G10 in the fourth row to the reference value (zero value). Thereafter, the AZ circuit stores this offset amount.

At time t25, the signals RST5 and SEL_R go to the high level, and SEL_L goes to the low level. As a result, the reset transistor SW2 of the base pixel group G10 in the fifth row turns on when the high-level reset signal RST3 is input to the gate of the reset transistor SW2 through the signal line Rst3 to reset the floating diffusion FD to the voltage of the constant voltage source VSS.

Next, at time t26, the signal RST5 goes to the low level to make the set transistor SW2 non-connected. Then, the signal TRG5_1 goes to the high level. As a result, signal charges (here, photoelectrons) accumulated by photoelectric conversion of the photodiode PD1 of the base pixel group G10 in the fifth row are transferred to the floating diffusion FD.

Next, at time t27, the signal SEL5 goes to the high level. As a result, the selection transistor SW3 turns on, and the amplification transistor AMP amplifies the voltage of the floating diffusion FD and outputs the amplified voltage to the vertical signal line VSL. For the amplified potential of the floating diffusion FD at this time, SEL_L is at the low level, and SEL_R is at the high level. As a result, the AD converter ADC11 is electrically connected to the vertical signal line VSL1, the AD converter ADC12 is electrically connected to the vertical signal line VSL3, and the data of each base pixel group G10 is input to the corresponding AD converter accordingly. Furthermore, since SEL_R is at the high level, the AD converter ADC21 is electrically connected to the vertical signal line VSL3. The other AD converters are also electrically connected to the corresponding vertical signal lines VSL according to a similar rule.

Subsequently, between time t27 and time t28, the AD converters ADC11 to 14 and 21 to 24 perform AD conversion. As described above, the AD converters ADC11 to 14 and 21 to 24 each perform AD conversion to output a difference between the red pixel of the base pixel group G10 in the fourth row and the red pixel of the base pixel group G10 in the fifth row as data. Then, the signal SEL5 is set to low level to bring the AD conversion to an end.

The difference processing between the blue pixels can be performed by manipulating TRG*_4 instead of TRG*_1 that is a signal illustrated in the timing chart of the second control example. Furthermore, for the green pixels, two pixels are added up by manipulating both TRG*_2 and TRG*_3 at the same time instead of TRG*_1, and the difference between the two green pixels can be obtained accordingly. In this case, since the two green pixels are added up, the sensitivity is twice as high as a case where the green pixel is individually acquired, and the image acquisition can be performed in a single time. In a case of taking a color difference image, such a driving method is useful.

As described above, according to the present embodiment, the FD is shared by the base pixel unit G10 of two pixels by two pixels. Furthermore, the first selection unit 12c selects the ((n−1)×2+m)-th vertical signal line VSL in a case where the selector control signal (left) (SEL_L) is the "0" selection signal. Furthermore, the ((n−1)×2+m+1)-th vertical signal line VSL is selected in a case where the selector control signal (left) (SEL_L) is the "1" selection signal. The second selection unit 16c and the second selection unit 16a select the ((n−1)×2+m+1)-th vertical signal line VSL in a case where the selector control signal (right) (SEL_R) is the "0" selection signal. Furthermore, the ((n−1)×4+m+2)-th vertical signal line VSL is selected in a case where the selector control signal (right) (SEL_R) is the "1" selection signal. As a result, it is possible to calculate, by electrically connecting, in a sequential manner, the pixels in every four rows of the pixel array unit 10 to the corresponding vertical signal lines VSL and performing control to make the values of SEL_L and SEL_R alternately different from each other, a difference between the addition value of each pixel in the base unit G10 and the addition value of each pixel in another base unit G10 located in the upper left diagonal or upper right diagonal of the base unit G10. Similarly, it is possible to calculate, by electrically connecting, in a sequential manner, the pixels in a predetermined row of the four rows of the pixel array unit 10 to the corresponding vertical signal lines VSL and performing control to make the values of SEL_L and SEL_R alternately different from each other, a difference between the addition value of each pixel in the base unit G10 and the addition value of each pixel in another base unit G10 located in the upper left diagonal or upper right diagonal of the base unit G10.

Note that the present technology can have the following configurations.

(1)

A solid-state imaging element including:
   a first analog-to-digital conversion unit including a first analog-to-digital conversion circuit and a second analog-to-digital conversion circuit; and
   a second analog-to-digital conversion unit including a third analog-to-digital conversion circuit, in which
   the first analog-to-digital conversion circuit is connected to a first vertical signal line and a second vertical signal line via a first switch circuit,
   the second analog-to-digital conversion circuit is connected to a third vertical signal line and a fourth vertical signal line via a second switch circuit,
   the third analog-to-digital conversion circuit is connected to the second vertical signal line and a different signal line other than the first vertical signal line, the second vertical signal line, and the fourth vertical signal line via a third switch circuit,
   the first switch circuit and the second switch circuit are connected to a first selection drive line,
   the third switch circuit is connected to a second selection drive line, and
   the first analog-to-digital conversion unit and the second analog-to-digital conversion unit are arranged on a same end side of a pixel array unit.

(2)

The solid-state imaging element according to (1), in which the different signal line corresponds to the third vertical signal line.

(3)

The solid-state imaging element according to (1), in which the different signal line corresponds to a signal line through which a predetermined signal value is supplied.

(4)

The solid-state imaging element according to (1), further including:
   a first selection unit connected to the first selection drive line; and a second selection unit connected to the second selection drive line, in which the first selection unit includes a plurality of switch circuits including the first switch circuit and the second switch circuit, the second selection unit includes a plurality of switch circuits including the third switch circuit, the first analog-to-digital conversion unit includes a plurality of analog-to-digital conversion circuits including the first analog-to-digital conversion circuit and the second analog-to-digital conversion circuit, the plurality of analog-to-digital conversion circuits corresponding to the plurality of switch circuits included in the first selection circuit, and the second analog-to-digital conversion unit includes a plurality of analog-to-digital conversion circuits including the third analog-to-digital conversion circuit, the plurality of analog-to-digital conversion circuits corresponding to the plurality of switch circuits included in the second selection circuit.

(5)
The solid-state imaging element according to (4), in which regarding a plurality of vertical signal lines including the first to fourth vertical signal lines and connected to the first selection circuit and the second selection circuit, each of the plurality of switch circuits included in the first selection unit is connected to two of the plurality of vertical signal lines in a predetermined order in accordance with an arrangement order of the plurality of switch circuits, each of the plurality of switch circuits included in the second selection unit is connected to two of the plurality of vertical signal lines in a predetermined order in accordance with an arrangement order of the plurality of switch circuits, a left vertical signal line of the two vertical signal lines is a right vertical signal line of the two vertical signal lines of any one of the plurality of switch circuits included in the first selection circuit, and a right vertical signal line of the two vertical signal lines is a left vertical signal line of the two vertical signal lines of any one of the plurality of switch circuits included in the first selection circuit.

(6)
The solid-state imaging element according to (5), in which each of the plurality of switch circuits included in the first selection unit is connected to two vertical signal lines including a $(2n-1)$ ($n$ is 1 to $M/2$, and $M$ is an even number)-th vertical signal line and a $(2n)$-th vertical signal line from left in accordance with the arrangement order of the plurality of switch circuits, and each of the plurality of switch circuits included in the second selection unit is connected to two vertical signal lines including the $(2n)$-th vertical signal line and a $(2n+1)$-th vertical signal line from left in accordance with the arrangement order of the plurality of switch circuits.

(7)
The solid-state imaging element according to (5), in which each of the plurality of switch circuits included in the first selection unit is connected to two vertical signal lines including a $((n-1)\times 8+m)$ ($n$ is 1 to $M/4$, $M$ is a multiple of 8, and $m$ is 1 to 4)-th vertical signal line and a $((n-1)\times 8+m+4)$-th vertical signal line from left in accordance with the arrangement order of the plurality of switch circuits, and each of the plurality of switch circuits included in the second selection unit is connected to two vertical signal lines including the $((n-1)\times 8+m+4)$-th vertical signal line and a $(n\times 8+m)$-th vertical signal line from left in accordance with the arrangement order of the plurality of switch circuits.

(8)
The solid-state imaging element according to (5), in which each of the plurality of switch circuits included in the first selection unit is connected to two vertical signal lines including a $((n-1)\times 4+m)$ ($n$ is 1 to $M/4$, $M$ is a multiple of 4, and $m$ is 1 or 2)-th vertical signal line and a $((n-1)\times 4+m+2)$-th vertical signal line from left in accordance with the arrangement order of the plurality of switch circuits, and each of the plurality of switch circuits included in the second selection unit is connected to two vertical signal lines including the $((n-1)\times 4+m+2)$-th vertical signal line and a $(n\times 4+m)$-th vertical signal line from left in accordance with the arrangement order of the plurality of switch circuits.

(9)
The solid-state imaging element according to (5), in which in a case where a difference image is captured, each of the switch circuits included in the first selection unit alternately selects the left vertical signal line or the right vertical signal line of the two vertical signal lines, and each of the switch circuits included in the second selection unit alternately selects the right vertical signal line or the left vertical signal line of the two vertical signal lines.

(10)
The solid-state imaging element according to (5), in which in a case where a normal image is captured, each of the switch circuits included in the first selection unit selects either the left vertical signal line or the right vertical signal line of the two vertical signal lines, and each of the switch circuits included in the second selection unit selects a vertical signal line of the two vertical signal lines on a same side as the vertical signal line selected by the switch circuit included in the first selection circuit.

(11)
The solid-state imaging element according to (5), in which the pixel array unit includes a plurality of pixels arranged in a matrix, in a case where the left vertical signal line of the two signal lines of each of the plurality of switch circuits included in the first selection unit is selected, a pixel in a first row is electrically connected, and in a case where the right vertical signal line of the two signal lines is selected, a pixel in a second row different from the first row is electrically connected.

(12)
The solid-state imaging element according to (5), in which the pixel array unit includes a plurality of pixels arranged in a matrix, in a case where the left vertical signal line of the two signal lines of each of the plurality of switch circuits included in the first selection unit is selected, a pixel in a first row and a pixel in a second row different from the first row are electrically connected, and in a case where the right vertical signal line of the two signal lines is selected, a pixel in a third row different from the first row and the second row and a pixel in a fourth row different from the first row, the second row, and the third row are electrically connected.

(13)

The solid-state imaging element according to (5), in which the pixel array unit includes a plurality of pixels arranged in a matrix, in a case where the left vertical signal line of the two signal lines of each of the plurality of switch circuits included in the first selection unit is selected, a pixel in a first row is electrically connected, in a case where the right vertical signal line of the two signal lines is selected, a pixel in a third row spaced one row apart from the first row is electrically connected, then, in a case where the left vertical signal line of the two signal lines is selected, a pixel in a second row adjacent to the first row is electrically connected, and then, in a case where the right vertical signal line of the two signal lines is selected, a pixel in a fourth row spaced one row apart from the second row is electrically connected.

(14)

The solid-state imaging element according to (5), in which the pixel array unit includes a plurality of pixels arranged in a matrix, in a case where the left vertical signal line of the two signal lines of each of the plurality of switch circuits included in the first selection unit is selected, pixels in first to fourth rows are electrically connected, and in a case where the right vertical signal line of the two signal lines is selected, pixels in fifth to eighth rows different from the first to fourth rows are electrically connected.

(15)

The solid-state imaging element according to (5), in which the pixel array unit includes a plurality of pixels arranged in a matrix, in a case where the left vertical signal line of the two signal lines of each of the plurality of switch circuits included in the first selection unit is selected, a pixel in a predetermined row among first to fourth rows is electrically connected, and in a case where the right vertical signal line of the two signal lines is selected, a pixel in a predetermined row among fifth to eighth rows different from the first to fourth rows is electrically connected.

(16)

The solid-state imaging element according to (1), in which the pixel array unit includes pixels arranged in a Bayer array.

(17)

The solid-state imaging element according to (1), in which the pixel array unit includes a plurality of pixels arranged in a matrix, and each of the plurality of pixels includes:

a photoelectric conversion element unit configured to generate a current corresponding to an amount of received light by means of photoelectric conversion;

a transfer transistor having a drain connected to a cathode of the photoelectric conversion element unit;

a reset transistor having a source connected to a source of the transfer transistor;

an amplification transistor having a gate connected to the source of the transfer transistor;

a floating diffusion connected to the gate of the amplification transistor; and a selection transistor having a drain connected to a source of the amplification transistor and having a source connected to any one of the first to fourth vertical signal lines.

(18)

The solid-state imaging element according to (5), in which the pixel array unit includes pixels arranged in a Bayer array, and each of the plurality of the vertical signal lines are electrically connected to a floating diffusion connected to four pixels constituting the Bayer array.

(19)

An electronic apparatus including:

the solid-state solid-state imaging element according to (1); and an optical system configured to cause light to enter the pixel array unit.

REFERENCE SIGNS LIST

1 Optical system
2 Image sensor (solid-state imaging element)
12, 12a, 12b, 12c First selection unit
14, 14a, 14b, 14c First AD conversion unit
16, 16a, 16b, 16c Second selection unit
18, 18a, 18b, 18c Second AD conversion unit
100 Electronic apparatus
ADC11 to 18, 21 to 28 AD converter
AMP Amplification transistor
FD Floating diffusion
PD Photodiode (photoelectric conversion element unit)
SEL11 to 18, 21 to 28 Selector (switch circuit)
SW1 Transfer transistor
SW2 Reset transistor
SW3 Selection transistor
VSL Vertical signal line

The invention claimed is:

1. A solid-state imaging element, comprising:

a first analog-to-digital conversion unit including a first analog-to-digital conversion circuit and a second analog-to-digital conversion circuit; and a second analog-to-digital conversion unit including a third analog-to-digital conversion circuit, wherein the first analog-to-digital conversion circuit is connected to a first vertical signal line and a second vertical signal line via a first switch circuit, the second analog-to-digital conversion circuit is connected to a third vertical signal line and a fourth vertical signal line via a second switch circuit, the third analog-to-digital conversion circuit is connected to the second vertical signal line and a different signal line other than the first vertical signal line, the second vertical signal line, and the fourth vertical signal line via a third switch circuit, the first switch circuit and the second switch circuit are connected to a first selection drive line, the third switch circuit is connected to a second selection drive line, and the first analog-to-digital conversion unit and the second analog-to-digital conversion unit are on a same end side of a pixel array unit.

2. The solid-state imaging element according to claim 1, wherein the different signal line corresponds to the third vertical signal line.

3. The solid-state imaging element according to claim 1, wherein the different signal line corresponds to a signal line through which a predetermined signal value is supplied.

4. The solid-state imaging element according to claim 1, further comprising:
a first selection unit connected to the first selection drive line; and
a second selection unit connected to the second selection drive line, wherein
the first selection unit includes a first plurality of switch circuits including the first switch circuit and the second switch circuit,
the second selection unit includes a second plurality of switch circuits including the third switch circuit,
the first analog-to-digital conversion unit includes a plurality of analog-to-digital conversion circuits including the first analog-to-digital conversion circuit and the second analog-to-digital conversion circuit, the plurality of analog-to-digital conversion circuits corresponding to the first plurality of switch circuits included in the first selection unit, and
the second analog-to-digital conversion unit includes a plurality of analog-to-digital conversion circuits including the third analog-to-digital conversion circuit, the plurality of analog-to-digital conversion circuits corresponding to the second plurality of switch circuits included in the second selection unit.

5. The solid-state imaging element according to claim 4, wherein
regarding a plurality of vertical signal lines including the first to fourth vertical signal lines and connected to the first selection unit and the second selection unit,
each of the first plurality of switch circuits included in the first selection unit is connected to two of the plurality of vertical signal lines in a predetermined order in accordance with an arrangement order of the plurality of switch circuits,
each of the second plurality of switch circuits included in the second selection unit is connected to two of the plurality of vertical signal lines in a predetermined order in accordance with an arrangement order of the plurality of switch circuits,
a left vertical signal line of the two of the plurality of vertical signal lines is a right vertical signal line of the two vertical signal lines of any one of the first plurality of switch circuits included in the first selection unit, and
a right vertical signal line of the two vertical signal lines is a left vertical signal line of the two vertical signal lines of any one of the plurality of switch circuits included in the first selection circuit.

6. The solid-state imaging element according to claim 5, wherein
the each of the first plurality of switch circuits included in the first selection unit is connected to two vertical signal lines including a (2n−1) ((n is 1 to M/2, and M is an even number)-th vertical signal line and a (2n)-th vertical signal line from left in accordance with the arrangement order of the first plurality of switch circuits, and the each of the second plurality of switch circuits included in the second selection unit is connected to two vertical signal lines including the (2n)-th vertical signal line and a (2n+1)-th vertical signal line from left in accordance with the arrangement order of the second plurality of switch circuits.

7. The solid-state imaging element according to claim 5, wherein
the each of the first plurality of switch circuits included in the first selection unit is connected to two vertical signal lines including a ((n−1)×8+m) ((n is 1 to M/4, M is a multiple of 8, and m is 1 to 4)-th vertical signal line and a ((n−1)×8+m+4)-th vertical signal line from left in accordance with the arrangement order of the first plurality of switch circuits, and
the each of the second plurality of switch circuits included in the second selection unit is connected to two vertical signal lines including the ((n−1)×8+m+4)-th vertical signal line and a (n×8+m)-th vertical signal line from left in accordance with the arrangement order of the second plurality of switch circuits.

8. The solid-state imaging element according to claim 5, wherein
the each of the first plurality of switch circuits included in the first selection unit is connected to two vertical signal lines including a ((n−1)×4+m) ((n is 1 to M/4, M is a multiple of 4, and m is 1 or 2)-th vertical signal line and a ((n−1)×4+m+2)-th vertical signal line from left in accordance with the arrangement order of the first plurality of switch circuits, and
the each of the second plurality of switch circuits included in the second selection unit is connected to two vertical signal lines including the ((n−1)×4+m+2)-th vertical signal line and a (n×4+m)-th vertical signal line from left in accordance with the arrangement order of the second plurality of switch circuits.

9. The solid-state imaging element according to claim 5, wherein
in a case where a difference image is captured,
the each of the first plurality of switch circuits included in the first selection unit alternately selects the left vertical signal line or the right vertical signal line of the two vertical signal lines, and
the each of the second plurality of switch circuits included in the second selection unit alternately selects the right vertical signal line or the left vertical signal line of the two vertical signal lines.

10. The solid-state imaging element according to claim 5, wherein
in a case where a normal image is captured,
each of the first plurality of switch circuits included in the first selection unit selects either the left vertical signal line or the right vertical signal line of the two vertical signal lines, and
each of the second plurality of switch circuits included in the second selection unit selects a vertical signal line of the two vertical signal lines on a same side as the vertical signal line selected by one of the first plurality of switch circuit included in the first selection unit.

11. The solid-state imaging element according to claim 5, wherein
the pixel array unit includes a plurality of pixels arranged in a matrix, in a case where the left vertical signal line of the two signal lines of each of the first plurality of switch circuits included in the first selection unit is selected, a pixel in a first row is electrically connected, and in a case where the right vertical signal line of the two signal lines is selected, a pixel in a second row different from the first row is electrically connected.

12. The solid-state imaging element according to claim 5, wherein the pixel array unit includes a plurality of pixels arranged in a matrix, in a case where the left vertical signal line of the two signal lines of the each of the first plurality of switch circuits included in the first selection unit is selected, a pixel in a first row and a pixel in a second row different from the first row are electrically connected, and in a case where the right vertical signal line of the two signal lines is selected, a pixel in a third row different from the first row and the second row and a pixel in a fourth row different from the first row, the second row, and the third row are electrically connected.

13. The solid-state imaging element according to claim 5, wherein the pixel array unit includes a plurality of pixels arranged in a matrix, in a case where the left vertical signal line of the two signal lines of each of the first plurality of switch circuits included in the first selection unit is selected, a pixel in a first row is electrically connected, in a case where the right vertical signal line of the two signal lines is selected, a pixel in a third row spaced one row apart from the first row is electrically connected, then, in a case where the left vertical signal line of the two signal lines is selected, a pixel in a second row adjacent to the first row is electrically connected, and then, in a case where the right vertical signal line of the two signal lines is selected, a pixel in a fourth row spaced one row apart from the second row is electrically connected.

14. The solid-state imaging element according to claim 5, wherein the pixel array unit includes a plurality of pixels arranged in a matrix, in a case where the left vertical signal line of the two signal lines of each of the first plurality of switch circuits included in the first selection unit is selected, pixels in first to fourth rows are electrically connected, and in a case where the right vertical signal line of the two signal lines is selected, pixels in fifth to eighth rows different from the first to fourth rows are electrically connected.

15. The solid-state imaging element according to claim 5, wherein the pixel array unit includes a plurality of pixels arranged in a matrix, in a case where the left vertical signal line of the two signal lines of each of the first plurality of switch circuits included in the first selection unit is selected, a pixel in a predetermined row among first to fourth rows is electrically connected, and in a case where the right vertical signal line of the two signal lines is selected, a pixel in a predetermined row among fifth to eighth rows different from the first to fourth rows is electrically connected.

16. The solid-state imaging element according to claim 1, wherein the pixel array unit includes pixels arranged in a Bayer array.

17. The solid-state imaging element according to claim 1, wherein the pixel array unit includes a plurality of pixels arranged in a matrix, and each of the plurality of pixels includes:
a photoelectric conversion element unit configured to generate a current corresponding to an amount of received light by means of photoelectric conversion;
a transfer transistor having a drain connected to a cathode of the photoelectric conversion element unit;
a reset transistor having a source connected to a source of the transfer transistor;
an amplification transistor having a gate connected to the source of the transfer transistor;
a floating diffusion connected to the gate of the amplification transistor; and
a selection transistor having a drain connected to a source of the amplification transistor and having a source connected to any one of the first to fourth vertical signal lines.

18. The solid-state imaging element according to claim 5, wherein the pixel array unit includes pixels arranged in a Bayer array, and each of the plurality of the vertical signal lines are electrically connected to a floating diffusion connected to four pixels constituting the Bayer array.

19. An electronic apparatus, comprising:
the solid-state solid-state imaging element according to claim 1; and
an optical system configured to cause light to enter the pixel array unit.

* * * * *